United States Patent
Ta et al.

(10) Patent No.: US 10,999,712 B2
(45) Date of Patent: *May 4, 2021

(54) NETWORK METHODS AND APPARATUS

(71) Applicant: M87, Inc., Bellevue, WA (US)

(72) Inventors: Tuan Ta, Seattle, WA (US); Vidur Bhargava, San Diego, TX (US)

(73) Assignee: M87, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,428

(22) Filed: Apr. 22, 2019

(65) Prior Publication Data
US 2019/0253844 A1    Aug. 15, 2019

Related U.S. Application Data

(63) Continuation of application No. 15/204,861, filed on Jul. 7, 2016, now Pat. No. 10,292,019.
(Continued)

(51) Int. Cl.
*H04W 4/06*    (2009.01)
*H04L 12/701*  (2013.01)
(Continued)

(52) U.S. Cl.
CPC ............... *H04W 4/06* (2013.01); *H04L 45/00* (2013.01); *H04L 45/02* (2013.01); *H04L 45/04* (2013.01);
(Continued)

(58) Field of Classification Search
None
See application file for complete search history.

(56) References Cited

U.S. PATENT DOCUMENTS 7,139,840 B1 * 11/2006 O'Toole ............ H04L 29/12009
709/245
7,742,497 B2    6/2010 Ganti et al.
(Continued)

OTHER PUBLICATIONS

Croft, "Wi-Fi Service Discovery over 802.11u Using Non-Native Generic Advertising Services (GAS-SD)" May 2014.
(Continued)

*Primary Examiner* — Gregory B Sefcheck
*Assistant Examiner* — Suk Jin Kang
(74) *Attorney, Agent, or Firm* — Knobbe, Martens, Olson & Bear, LLP

(57) ABSTRACT

Methods and apparatus for efficiently establishing communications connections, e.g., for a secondary application, are described. A device to device communications network has established routing paths, e.g., corresponding to a first application. Different segments of the network use different gateways. Individual communications devices within a segment of the network may have incomplete information on the routing within the segment. A wireless communications device advertises the gateway device which it uses for the first application. A first communications device seeking to establish a communications connection with a second communications device for a second application uses obtained gateway information to make transmission and/or routing decisions, e.g., identifying a third communications device which can bridge a routing path gap between two segments of the network.

24 Claims, 32 Drawing Sheets

Related U.S. Application Data

(60) Provisional application No. 62/189,660, filed on Jul. 7, 2015.

(51) Int. Cl.

| | | |
|---|---|---|
| *H04L 12/751* | (2013.01) | |
| *H04L 12/715* | (2013.01) | |
| *H04W 76/14* | (2018.01) | |
| *H04W 8/00* | (2009.01) | |
| *H04W 88/04* | (2009.01) | |
| *H04W 88/16* | (2009.01) | |
| *H04W 84/18* | (2009.01) | |
| *H04W 84/22* | (2009.01) | |

(52) U.S. Cl.
CPC ............ *H04W 76/14* (2018.02); *H04W 8/005* (2013.01); *H04W 84/18* (2013.01); *H04W 84/22* (2013.01); *H04W 88/04* (2013.01); *H04W 88/16* (2013.01)

(56) References Cited

U.S. PATENT DOCUMENTS

| | | | |
|---|---|---|---|
| 8,743,758 B1 | 6/2014 | Bhargava et al. | |
| 9,148,908 B2 | 9/2015 | Bhargava et al. | |
| 9,155,124 B2 | 10/2015 | Bhargava et al. | |
| 9,363,006 B2 | 6/2016 | Bhargava et al. | |
| 9,414,434 B2 | 8/2016 | Bhargava et al. | |
| 9,451,514 B1 | 9/2016 | Michel et al. | |
| 9,578,591 B2 | 2/2017 | Bhargava et al. | |
| 9,794,949 B2 | 10/2017 | Bhargava et al. | |
| 9,806,791 B2 | 10/2017 | Bhargava et al. | |
| 9,942,921 B2 | 4/2018 | Bhargava et al. | |
| 9,986,480 B2 | 5/2018 | Ta et al. | |
| 10,123,268 B2 | 11/2018 | Bhargava et al. | |
| 10,136,311 B2 | 11/2018 | Bhargava et al. | |
| 10,205,505 B2 | 2/2019 | Michel et al. | |
| 10,206,228 B2 | 2/2019 | Bhargava et al. | |
| 10,292,019 B2 | 5/2019 | Ta et al. | |
| 10,333,612 B2 | 6/2019 | Bhargava et al. | |
| 10,517,027 B2 | 12/2019 | Ta et al. | |
| 10,568,139 B2 | 2/2020 | Bhargava et al. | |
| 10,575,170 B2 | 2/2020 | Bhargava et al. | |
| 2004/0162871 A1* | 8/2004 | Pabla ...................... H04L 67/04 | 709/201 |
| 2006/0052099 A1 | 3/2006 | Parker | |
| 2007/0274271 A1* | 11/2007 | Jones .................... H04W 8/005 | 370/338 |
| 2009/0122724 A1* | 5/2009 | Rosenberg .............. H04L 45/02 | 370/255 |
| 2010/0278110 A1 | 11/2010 | Ozawa | |
| 2010/0303003 A1* | 12/2010 | Park ........................ H04L 67/04 | 370/328 |
| 2010/0322258 A1* | 12/2010 | Dynarski ............... H04W 88/16 | 370/401 |
| 2013/0181848 A1* | 7/2013 | Picard .................. H04W 56/002 | 340/870.03 |
| 2013/0229944 A1* | 9/2013 | Montemurro ......... H04W 8/005 | 370/254 |
| 2013/0295921 A1 | 11/2013 | Bhargava et al. | |
| 2013/0331141 A1* | 12/2013 | Montemurro ........... H04W 4/06 | 455/515 |
| 2013/0335528 A1 | 12/2013 | Vishwanath et al. | |
| 2014/0004865 A1* | 1/2014 | Bhargava .............. H04W 40/12 | 455/445 |
| 2014/0313975 A1* | 10/2014 | Berenberg ........... H04L 41/0806 | 370/328 |
| 2014/0370863 A1* | 12/2014 | Proctor, Jr. ......... G06Q 10/0875 | 455/414.3 |
| 2015/0148022 A1* | 5/2015 | Bhargava .............. H04W 88/04 | 455/418 |
| 2015/0373765 A1* | 12/2015 | Lee ........................ H04W 8/005 | 370/329 |
| 2016/0012431 A1* | 1/2016 | Proctor, Jr. ......... G06Q 30/0261 | 705/44 |
| 2016/0128043 A1* | 5/2016 | Shuman .............. H04W 72/044 | 370/331 |
| 2016/0269972 A1* | 9/2016 | Taneja ................... H04W 8/005 | |
| 2016/0278144 A1* | 9/2016 | Lee ...................... H04L 67/146 | |
| 2016/0315688 A1 | 10/2016 | Bhargava et al. | |
| 2017/0006117 A1* | 1/2017 | Kafle .................... H04B 17/318 | |
| 2017/0006456 A1* | 1/2017 | Lee ...................... H04L 67/104 | |
| 2017/0011425 A1* | 1/2017 | Proctor, Jr. ........... H04W 12/04 | |
| 2017/0071006 A1* | 3/2017 | Han ........................ H04W 4/06 | |
| 2017/0164264 A1* | 6/2017 | Kato ..................... H04W 28/14 | |
| 2017/0223610 A1* | 8/2017 | Qi ........................... H04W 4/80 | |
| 2018/0014311 A1 | 1/2018 | Bhargava et al. | |

OTHER PUBLICATIONS

Balraj, "Qualcomm Research San Diego: LTE Direct Overview", 2012.

International Search Report for International Application No. PCT/US2016/041360 dated Oct. 27, 2016.

Written Opinion for International Application No. PCT/US2016/041360 dated Oct. 27, 2016.

\* cited by examiner

| FIGURE 20A |
| FIGURE 20B |
| FIGURE 20C |

NETWORK METHODS AND APPARATUS

RELATED APPLICATIONS

The present application is a continuation of U.S. patent application Ser. No. 15/204,861 filed Jul. 7, 2016, published as patent publication US 2017-0013658 A1, which claims the benefit of U.S. Provisional Patent Application Ser. No. 62/189,660 filed Jul. 7, 2015, both of which are hereby expressly incorporated by reference in their entirety.

FIELD

Various embodiments relate to methods and apparatus establishing and/or using communications connections in networks, and more particularly, to efficiently establishing a new communications path, e.g. for a second application, using existing communication path information, e.g., corresponding to a first application.

BACKGROUND

There is an ever increasing demand for deploying and using device to device communications networks as more devices are produced to include communications capabilities, e.g., with multiple alternative interfaces, and new applications are offered. In addition, there are benefits in terms of cost, interference, and/or security to keeping signaling local and operating at low power levels.

Because of the dynamic nature of many device to device networks and the number of potential communications devices which may desire to have connections at a particular time, efficient routing can be problematic. It may not be practical for a communications device to download a full set of routing paths for a device to device network into the communications device, as the routing paths may change over time and/or the amount of information may be too large.

In some deployments, a set of routing path information may already exist for a first application implemented in a first network, e.g., with each routing path in the first network including a gateway device at one end which can be used to connect to another network, e.g., a cellular network. It would be beneficial if new methods and apparatus were developed which allow a second application to make use of the existing routing information and efficiently establish new connections for a second application, e.g., without the need for communicating large amount of overhead signaling related to connection establishment.

SUMMARY

Methods and apparatus for efficiently establishing communications connections, e.g., for a secondary application, are described. In various embodiments, connections/routing paths that are established for a primary application, e.g., an application used to connect a device via a hop to hop network to a cellular network, are used to establish connections/paths for various additional, e.g., secondary applications. In at least some embodiments, a device to device communications network has established routing paths, e.g., corresponding to a first application, e.g., an application which includes a gateway used to allow a device in the hop to hop network to connect to another network, e.g., a second network. The second network in some embodiments is a different type of network or uses a different frequency band than the first network. In some but not necessarily all embodiments the first network is a peer to peer network and the second network is a cellular network. In one such embodiment, while each connection includes a gateway, a full mesh network is not established between the peer to peer devices which use the hop to hop network. In such a system, different segments of a network may and often will use different gateways.

In order to limit the signaling overhead associated with connections, individual communications devices within a segment of the network may have incomplete information on the routing within the network segment in which the communications device is located. The communications device in at least some embodiments will have sufficient information to connect to and communicate with the gateway in the hop to hop network segment in which the device is located, but the communications device may not have information on how to reach devices in hop to hop network which correspond to a network segment which includes another different gateway. In one particular embodiment, to support a first application which is used to connect to a cellular network, a device in a segment of the hop to hop, e.g., direct device to device communications network, sometimes referred to as a peer to peer network will have information how to reach the gateway in the network segment in which it is located and will, at least in some embodiments, also have knowledge of connections to devices in the network segment which route communications through the device to reach the gateway. In one such embodiment a wireless communications device advertises the gateway device which it uses for the first application. In some embodiments a wireless communications device advertises a metric indicating the quality of a communication link the gateway has with a second network, e.g., a cellular network, and optionally an indication of the quality of the devices connection to the gateway. The advertised information can be used as part of the first application running on other devices to make decisions as to whether they want to connect to the cellular network via the advertising device's peer to peer connection to the gateway and the gateway's connection to the cellular network as opposed to connect directly to the cellular network or through another potential peer device with connectivity to the cellular network via the same or another gateway.

As should be appreciated, as part of the first application which is intended to provide an alternative to direct cellular communications for at least a portion of a communications path, connections to gateways and segments of a direct device to device network maybe established. It would be desirable if such connections and/or device advertisements regarding gateways and/or network connectivity could be leveraged to support additional applications and/or device to device communications. In particular, it would be desirable if communications could be established without having to traverse the gateways of network segments in all embodiments while still taking advantage of the gateway advertisements transmitted by devices as part of using the first application, e.g., communications application which supports connectivity to a cellular network.

In one exemplary embodiment, a first communications device seeking to establish a communications connection to a second communications device for a second applications communications session uses obtained gateway information to make transmission and/or routing decisions, e.g., identifying a third communications device which can be used to bridge a routing path gap between two segments of the network. The first communications device identifies a third communications device which uses the same gateway device as the second communications device (target device) to transmit a generated connection establishment request. A communications device receiving a connection establishment request for the second application makes forwarding decisions based on stored routing path information corresponding to the first application, e.g., deciding between forwarding toward the target device or forwarding toward the gateway. In some embodiments, while a connection is established for a second application using the path information previously established for the first application which includes a path extending through the gateway, the path establishment process for the second application avoids traversing the gateway of a segment if the available path information stored in nodes for purposes of the first application is sufficient to establish a path to a target node without having to traverse the gateway device used by the target node for the first communications application.

Thus advertisements by a device about the gateway being used by the device allows a listening device to determine, based on knowledge of the gateway being used by a target device, if the advertising device is on the same network segment as the target device. Once contacted, the advertising device which uses the same gateway as the target device can be used to establish communications with the target device thus allowing for bridging of the network segments corresponding to different gateway devices without, in many cases, having to traverse the gateway device. The routing the hop to hop network used to support the second application can be based on routing information stored in the contacted device to support the first application. The routing performed by the contacted device avoids communication through the gateway device to reach the target node when the target node is not the gateway device. When the target node is the gateway device, the routing will normally reach and terminate for the second application at the gateway device being contacted by the node of the other network segment. While the gateway device may be contacted, the contact may avoid traversing the second, e.g., cellular network thereby avoiding the use of cellular network resources.

The methods and apparatus of the present invention can be used to establish connections between devices on different segments of a peer to peer network based on advertisements of gateway devices being used by nodes in the peer to peer network. When an originating device initiating a communications with another peer to peer device, e.g. on a different segment of the peer to peer network, the originating device may determine from stored information, a database or advertisements received by the originating device information indicating the gateway device used by the target device. In one embodiment the advertisements by a device as to which gateway it is using are transmitted using LTE-Direct (LTED) beacon signals, WiFi beacon signals or other signals. While the originating device may receive information about which gateway the target device is using, e.g., for a first application which maybe and in some embodiments is a cellular network connection application, the originating device may not be within hop to hop range of the target device and maybe on a different network segment than the target device. To reach the target device in one such embodiment, the originating device monitors for signals indicating which gateway is being used by other hop to hop devices. When the originating device detects another device, e.g., an intermediate device advertising, e.g., via beacon signals transmitted for purposes of the first application, that the intermediate device uses the gateway known to be used by the target device, the originating device establishes a peer to peer connection to the intermediate device which then establishes based on routing information stored to support the first application a connection to the target device. The connection will avoid traversing the gateway device on the network segment of the target segment when the intermediate device is on a path to the gateway used by the target device. By taking advantage of advertisements and gateway information communicated for a first application, e.g., a cellular network connectivity application, devices seeking to establish communications between different segments of a peer to peer connection which are not directly connected can identify a node through which they can establish communications via the peer to peer network. Accordingly, by leveraging signaling transmitted for the first application various secondary applications such as applications which allow household devices to communicate with each other although not being on the same segments of the peer to peer network are made possible. For example, an alarm system, refrigerator or other household devices may communicate with another device on a different segment of a WiFi peer to peer network in a house without having to go through different cellular gateways used by an originating and target WiFi component which may use different cellular gateways even though the devices are located in the same house.

Numerous variations and embodiments are possible. While explained in the context of a cellular system the same or similar methods may be used for switches or other devices which may not form a complete mesh network and which may use advertisements, e.g., beacon or other advertisement signals transmitted at predictable intervals to advertise which gateway is being used by an advertising device. In the context of an Ethernet embodiment, devices may power down their receivers when they are not expecting beacon signals and do not have data to transmit or receive allowing for more efficient Ethernet implementations as compared to embodiments where the Ethernet devices normally keep their receivers on at all times.

An exemplary method of operating a first communications device, in accordance with some embodiments, includes: making a decision to establish a communications connection with a second communications device; identifying a first gateway device used by said second communications device; identifying a third communications device which uses said first gateway device; and transmitting a first connection establishment request to said third communications device, said first connection establishment request including a first device identifier identifying the first communications device and a second device identifier identifying the second communications device. A first communications device, in accordance with some embodiments, includes: a connection establishment decision module configured to make a decision to establish a communications connection with a second communications device; a gateway identification module configured to identify a first gateway device used by said second communications device; a device identification module configure to identify a third communications device which uses said first gateway device; and a first transmitter module configured to transmit a first connection establishment request to said third communications device, said first connection establishment request including a first device identifier identifying the first communications device and a second device identifier identifying the second communications device.

An exemplary method of operating a second communications device, in accordance with some embodiments, includes: receiving a first connection establishment request including a first device identifier identifying a first communications device which is the source of the first connection establishment request and a third device identifier identifying a target communications device with which a connection is to be established; determining if information on a path to the target communications device, wherein said path does not traverse a first gateway device used by the second communications device and the target communications device, is known to the second communications device; when information on said path to the target communications device is known to the second communications device, forwarding said first connection establishment request towards the target communications device; and when information on said path to the target communications device is not known to the second communications device, forwarding said first connection establishment request towards said first gateway device. An exemplary second communications device, in accordance with some embodiments, includes: a connection establishment receive module configured to receive a first connection establishment request including a first device identifier identifying a first communications device which is the source of the first connection establishment request and a third device identifier identifying a target communications device with which a connection is to be established; a path knowledge determination module configured to determine if information on a path to the target communications device, wherein said path does not traverse a first gateway device used by the second communications device and the target communications device, is known to the second communications device; a connection establishment request forwarding module configured to: forward said first connection establishment request towards the target communications device when information on said path to the target communications device is determined to be known to the second communications device; and forward said first connection establishment request towards said first gateway device, when information on said path to the target communications device is determined to be not known to the second communications device.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

DETAILED DESCRIPTION

Figure 1:
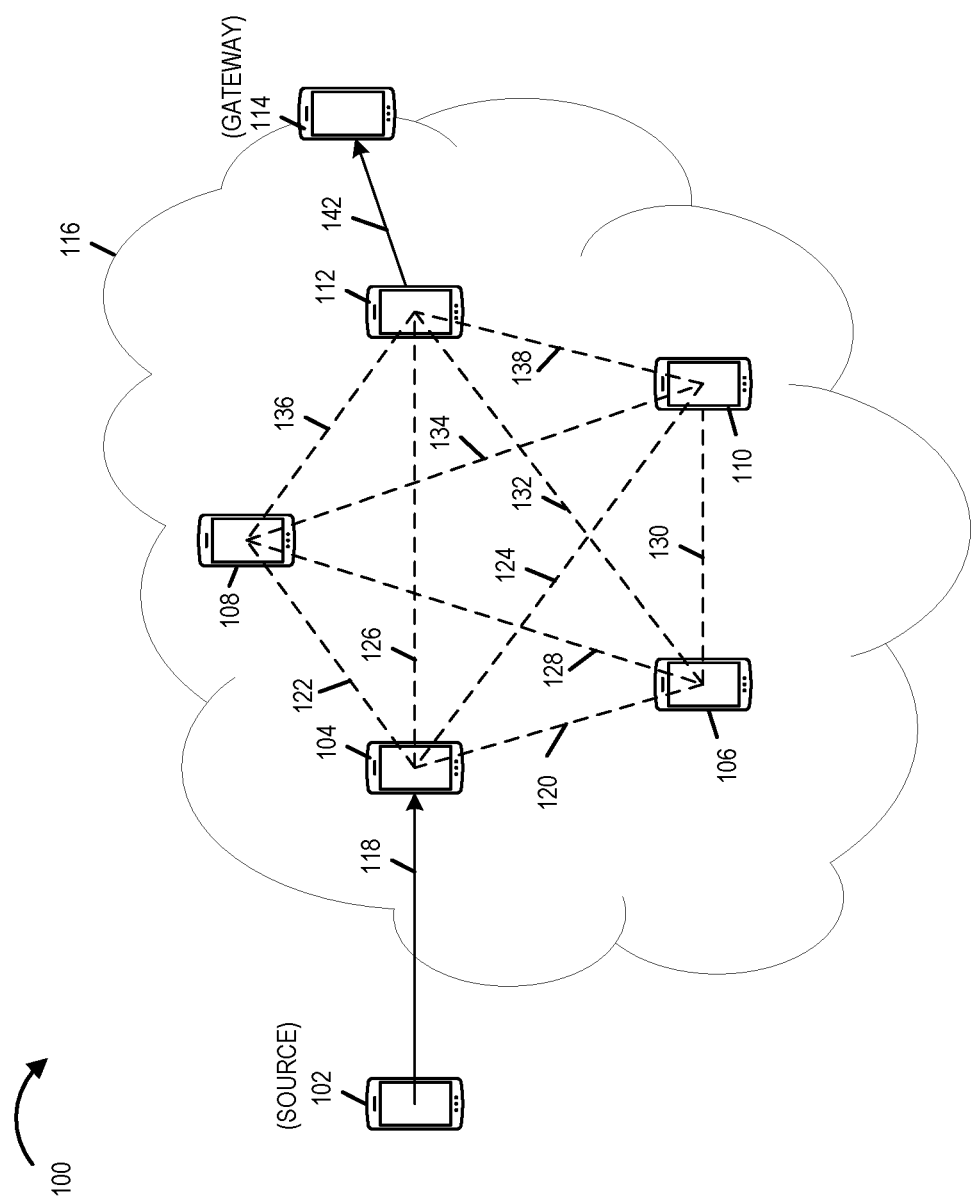
FIG. 1 is a drawing of an exemplary communications system illustrating a transactional view of a network in accordance with an exemplary embodiment.

FIG. 1 is a drawing of an exemplary communications system 100 in accordance with an exemplary embodiment. Exemplary system 100 includes a plurality of exemplary devices (102, 104, 106, 108, 110, 112, 114) coupled together. In this example, each of the devices (102, 104, 106, 108, 110, 112, 114) includes a radio interface. The exemplary devices (102, 104, 106, 108, 110, 112, 114) are, e.g., smart phones, smart meters, and/or any Internet of Things devices. The exemplary devices (102, 104, 106, 108, 110, 112, 114) may, and sometimes do, belong to multiple communications networks, e.g., including one or more peer to peer networks. Some of the peer to peer networks may use cellular spectrum while other peer to be networks may use unlicensed spectrum. Different peer to peer communications networks may have different communications ranges, e.g., for a single hop.

Communications system 100 includes an exemplary network 116. Network 116 includes devices (104, 106, 108, 110, 112). Network 116 is, e.g., a device to device network. In this example, each of the devices in network 116 may be, and sometimes are, connected, to each of the other devices in network 116. However, devices (104, 106, 108, 110, 112) in the network 116 (represented by the cloud) are not necessary fully connected, e.g., at a given time. Exemplary links, e.g., wireless links, in the network 116 include optional links (120, 122, 124, 126, 128, 130, 132, 134, 136, 138) corresponding to device pairs ((104, 106), (104, 108), (104, 110), (104, 112), (106, 108), (108, 110), (108, 112), (110, 112)), respectively. Some or all of the optional links (120, 122, 124, 126, 128, 130, 132, 134, 136, 138) may be present within the network 116 at a given time. At different times there may be different routes within the network 116. In some embodiments, session establishment/response signaling is utilized as a part of a mechanism which is used to keep track of the routes, e.g., current routes, within the network 116. Other alternative may be, and in some embodiments are, used to keep track of the routes in the network 116.

FIG. 1 illustrates a transactional view of exemplary network 116. For each transaction, there are 2 devices with special role: the source 102 which seeks some information/capability from the network 116, and the gateway 114 which provides the information/capability. In various embodiments, the source 102 discovered the gateway 114 through a chain of beacons in the network 116. In some embodiments, for a transaction to happen, the connection between the source 102, through the network 116, to the gateway 114 has already been established.

The network 116 can be abstracted out as the connectivity provider for a number of applications. Devices (104, 106, 108, 110, 112) in the network (represented by the cloud) are not necessary fully connected. The number of devices in between the source (originating) device 102 and the sink (gateway) device 114 can be 0 (single-hop) or any positive number (multi-hop).

The connection between the source device 102 and network 116 (cloud) can be single, i.e. the source connects to only 1 other device, or multiple, i.e. the source connects to more than 1 devices, during the transaction. In the example of FIG. 1, the source 102 is shown connected to single device 104 in network 116, via link 118.

The connection between the gateway device 114 and the network 116 (cloud) can be single, i.e. the gateway connects to only 1 other device, or multiple, i.e. the gateway connects to more than 1 devices, during the transaction. In this example, gateway device 114, which is situated on the network boundary, is shown connected to single device 112 in network 116 via link 142. In various embodiments, the gateway device 114, which sits on the boundary of the network 116 is considered part of the network. The gateway device 114 may couple device in the network 116 to other networks and/or nodes, e.g., an infrastructure network node.

Figure 2:
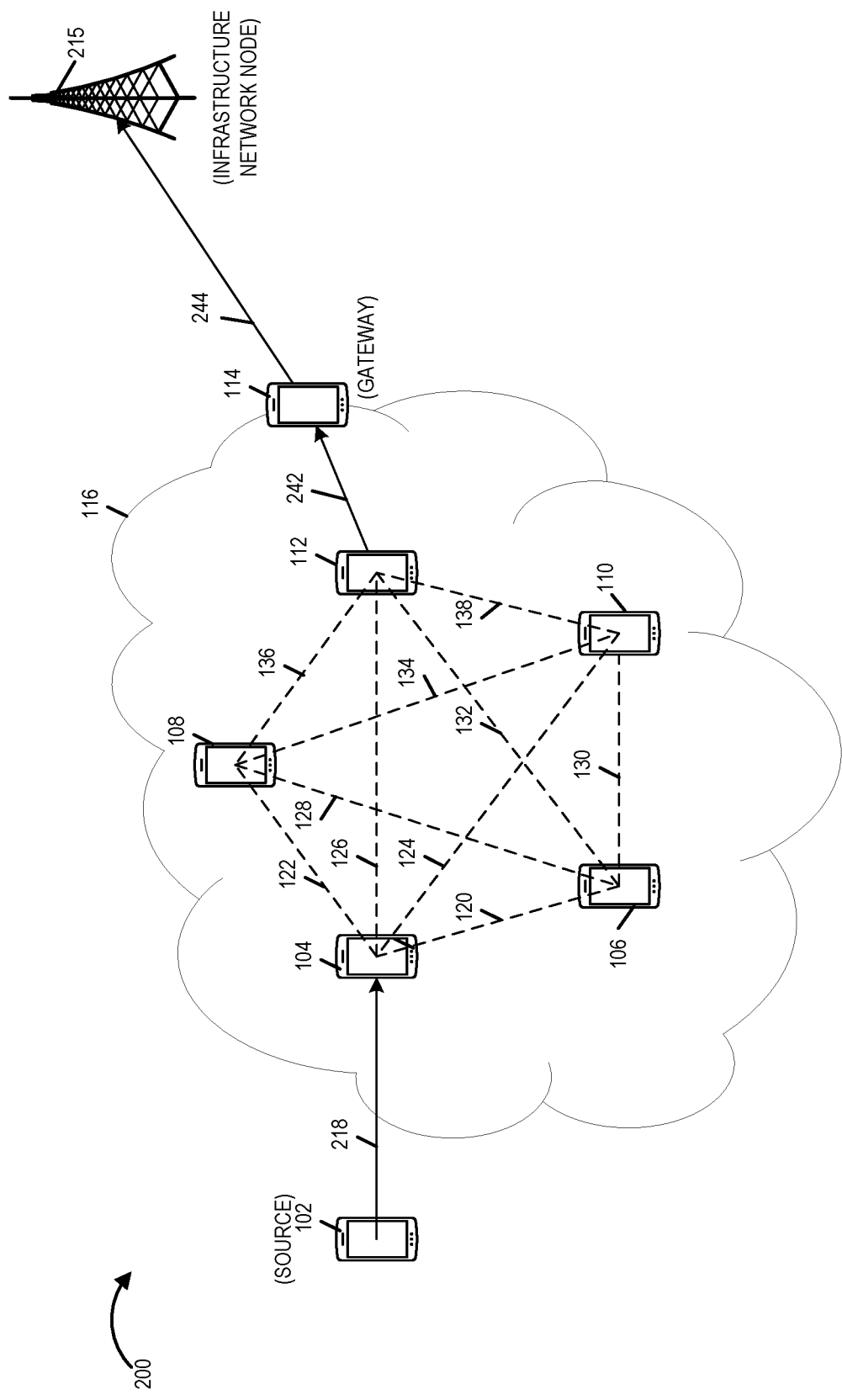
FIG. 2 is a drawing of an exemplary communications system illustrating a transactional view of a SON system in accordance with an exemplary embodiment.

FIG. 2 is a drawing of an exemplary communications system 200 which includes the exemplary communications devices (102, 104, 106, 108, 110, 112, 114) and exemplary network 116 of FIG. 1 and further including a base station 215, coupled to gateway device 114, via link 244, in accordance with an exemplary embodiment. FIG. 2 may be used to illustrate a transactional view of a SON network in which wireless terminals, e.g., user equipment devices such as cell phones or other mobile devices, may actively participate in the self organization of the network and establishment of network connections. In some embodiments, the source 102, gateway 114, and/or base station 215 are included as part of the network 116.

Figure 3:
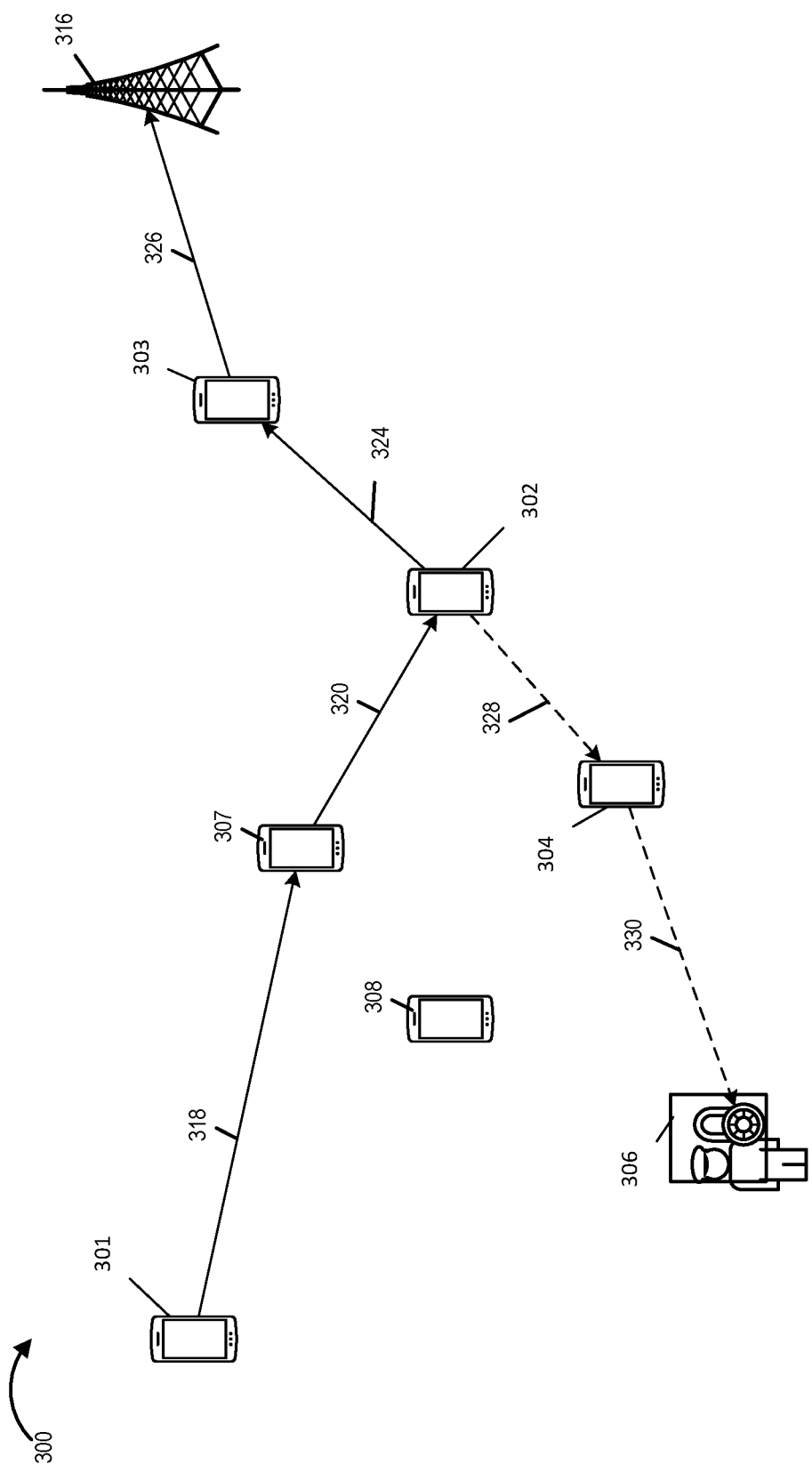
FIG. 3 illustrates a drawing of an exemplary communications network with two concurrent applications: a SON application and a public safety application.

FIG. 3 illustrates a drawing of an exemplary communications system 300 including a communications network with 2 concurrent applications: a SON application and a public safety application. The SON application may be used to establish connections in a SON network or SON network segments with the second application, e.g., public safety application then be able to subsequently take advantage of the established connections for other purposes, e.g., communication of public safety related messages. The exemplary system 300 includes a plurality of devices (301, 302, 303, 304, 306, 307, 308) each including a radio interface and an exemplary cellular base station 316. The exemplary devices (301, 302, 303, 304, 306, 307, 308) are, e.g., smart phones, smart meters, and/or any Internet of Things devices. The exemplary devices (301, 302, 303, 304, 306, 307, 308) may, and sometimes do, belong to multiple communications networks, e.g., including one or more peer to peer networks. Some of the peer to peer networks may use cellular spectrum while other peer to be networks may use unlicensed spectrum. Different peer to peer communications networks may have different communications ranges, e.g., for a single hop.

Device 301 is a source device implementing a SON application. In some embodiments, the cellular base station 316 is part of a network, and the cellular base station 316 is the gateway with regard to the network and the SON application. In some other embodiments, the cellular base station 316 is not part of the network, and device 303 is the gateway with regard to network and the SON application. In one example, the route for the SON application includes exemplary links (318, 320, 324, 326) between devices ((301, 307), (307, 302), (302, 303), (303, 316)), respectively. In another example, the route for the SON application includes exemplary links (318, 320, 324) between devices ((301, 307), (307, 302), (302, 303)), respectively.

Exemplary device 302 is the source of Public Safety application. In some embodiments, the public safety officers device 306 is part of the network, and device 306 is the gateway with regard to the network and the Public Safety application. In some other embodiments, the public safety officers device 306 is not part of the network and device 304 is the gateway with regard to the network and the Public Safety application. In one example, the route for the Public Safety application includes exemplary links (328, 330) between devices ((302, 304), (304, 306)), respectively. Notice that device 302 takes part in both the SON application and the Public Safety application. In various embodiments, any device in the network can takes any role at any given time, subject to device limitations and/or implemented policy.

Figure 4A:
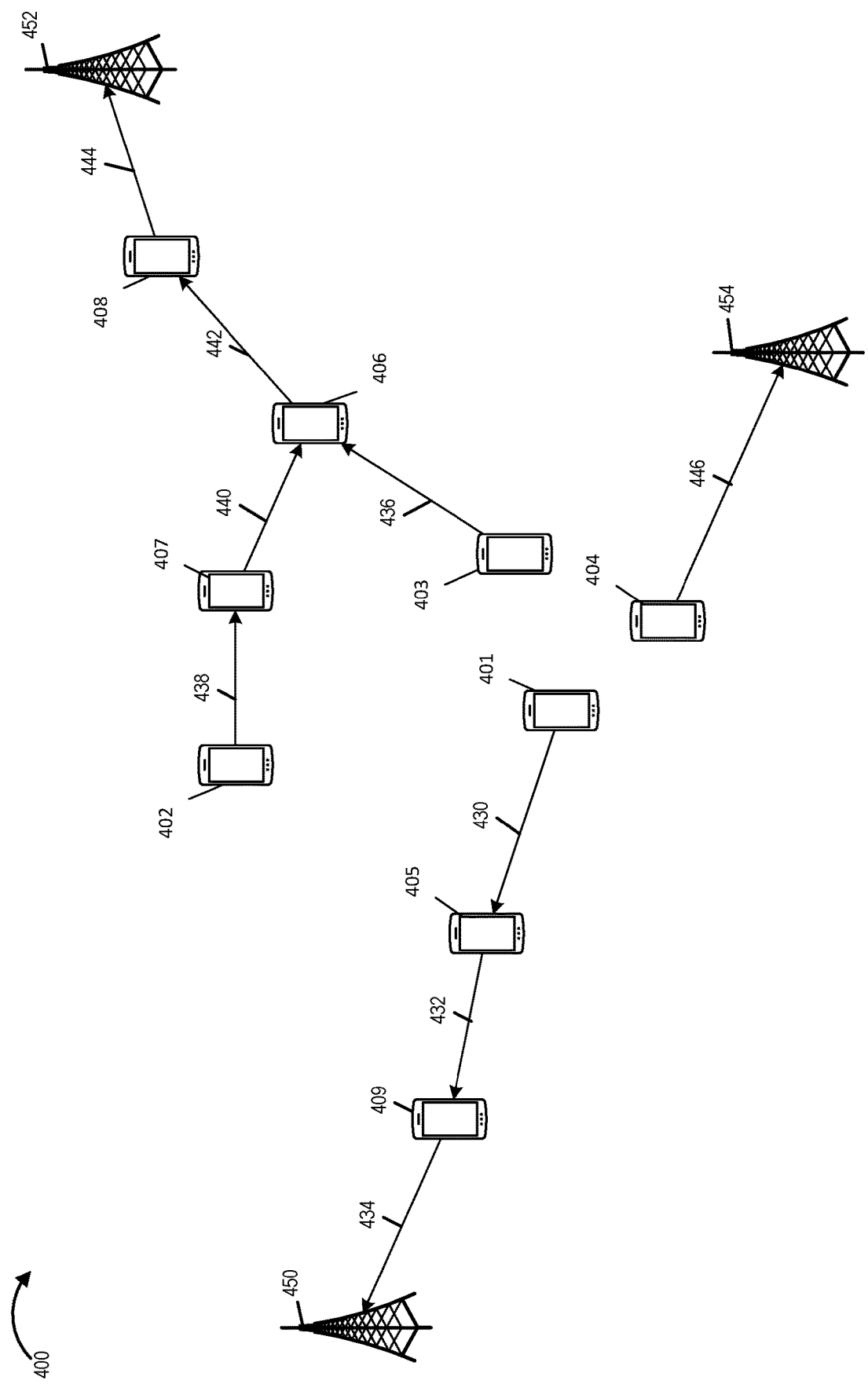
FIG. 4A illustrates exemplary routes created in a network by a first application, e.g., a SON application which may be executed by one or more wireless terminals.

Drawing 400 of FIG. 4A shows exemplary routes created in a network by a first application, e.g., a SON application. In one embodiment, the exemplary network includes devices (401, 402, 403, 404, 405, 407, 408, 409) each including a wireless interface. Exemplary cellular base stations (450, 452, 454), are coupled to the network via devices (409, 408, 404), respectively, which serve as gateways. The exemplary devices (401, 402, 403, 404, 405, 407, 408, 409) are, e.g., smart phones, smart meters, and/or any Internet of Things devices.

A first route, which ends at base station 450, includes connections (430, 432, 434) between devices ((401, 405), (405, 409), and (409, 450), respectively. A second route, which ends at a base station 452 includes connections (436, 442, 444) between devices ((403, 406),(406, 408), and (408, 452), respectively. A third route, which ends at base station 452, includes connections (438, 440, 442, 444) between devices ((402, 407),(407, 406), (406, 408) and (408, 452), respectively. A fourth route, which ends at base station 454, includes connection 446 between devices (404, 454).

A first route, which ends at gateway 409, includes connections (430, 432) between devices ((401, 405), and (405, 409), respectively. A second route, which ends at a gateway 408 includes connections (436, 442) between devices ((403, 406), and (406, 408)), respectively. A third route, which ends at gateway 408, includes connections (438, 440, 442) between devices ((402, 407),(407, 406), and (406, 408), respectively. Device 404 is a gateway.

The network can be considered to have three segments or branches, each segment with routing paths ending at a different gateway or different base station. In this example each of the communications devices is associated with one segment of the network. Communications devices (401, 405, 409) are associated with a second segment of the network. Communications device 404 is associated with a third segment of the network. Devices with a particular segment of the network have routing information regarding that particular segment. Different devices within a segment of the network have different amounts of routing information, e.g., depending upon the location of the device within the segment.

Figure 4B:
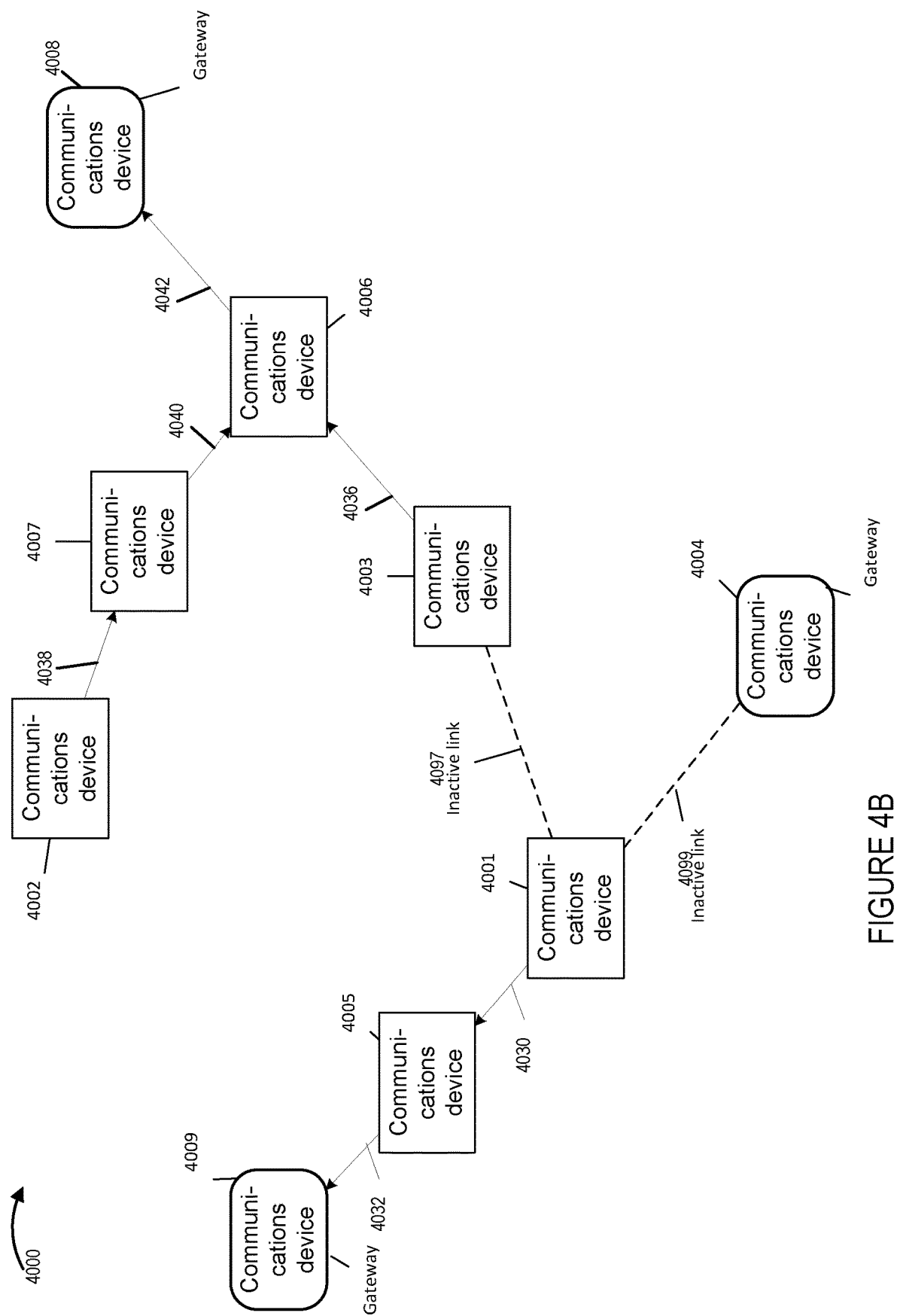
FIG. 4B illustrates exemplary routes created in a network by a first application.

Drawing 4000 of FIG. 4B shows exemplary routes created in a network by a first application. The first application may be any one of a variety of applications. The first application is usually but not necessarily a more popular or more widely distributed application than the second application. In one embodiment the first application is an application which establishes connections or communications paths between a wireless communications device and another device in the network based on physical proximity and/or communications connectivity to i) LANs/WANs/MANs; ii) group leaders, iii) medics, iv) users with a large number of connections in a social network, v) users with a large number of followers in a social network, vi) injured soldiers, vii) moving tanks, viii) merchant(s) of interest, ix) merchandise of interest, content of interest, x) users with similar interests, and/or xi) users with similar personality profiles). In one embodiment, the exemplary network includes communications devices (4001, 4002, 4003, 4004, 4005, 4006, 4007, 4008, 4009). Communications devices 4004, 4008, an 4009 are gateways. A first route includes connections (4030, 4032) between devices ((4001, 4005), (4005, 4009), respectively. A second route includes connections (4036, 4042) between devices ((4003, 4006), (4006, 4008), respectively. A third route includes connections (4038, 4040, 4042) between devices ((4002, 4007),(4007, 4006), and (4006, 4008), respectively. In addition there are inactive links (4097, 4099) between communications devices ((4001, 4003), (4001, 4004)), respectively. Devices (4002, 4003, 4006, 4007, 4008) may be considered to be included as part of a first segment of the network. Devices (4001, 4005, 4005) may be considered to be included as part of a second segment of the network. Device 4004 may be considered to be included as part of a third segment of the network.

Figure 4C:
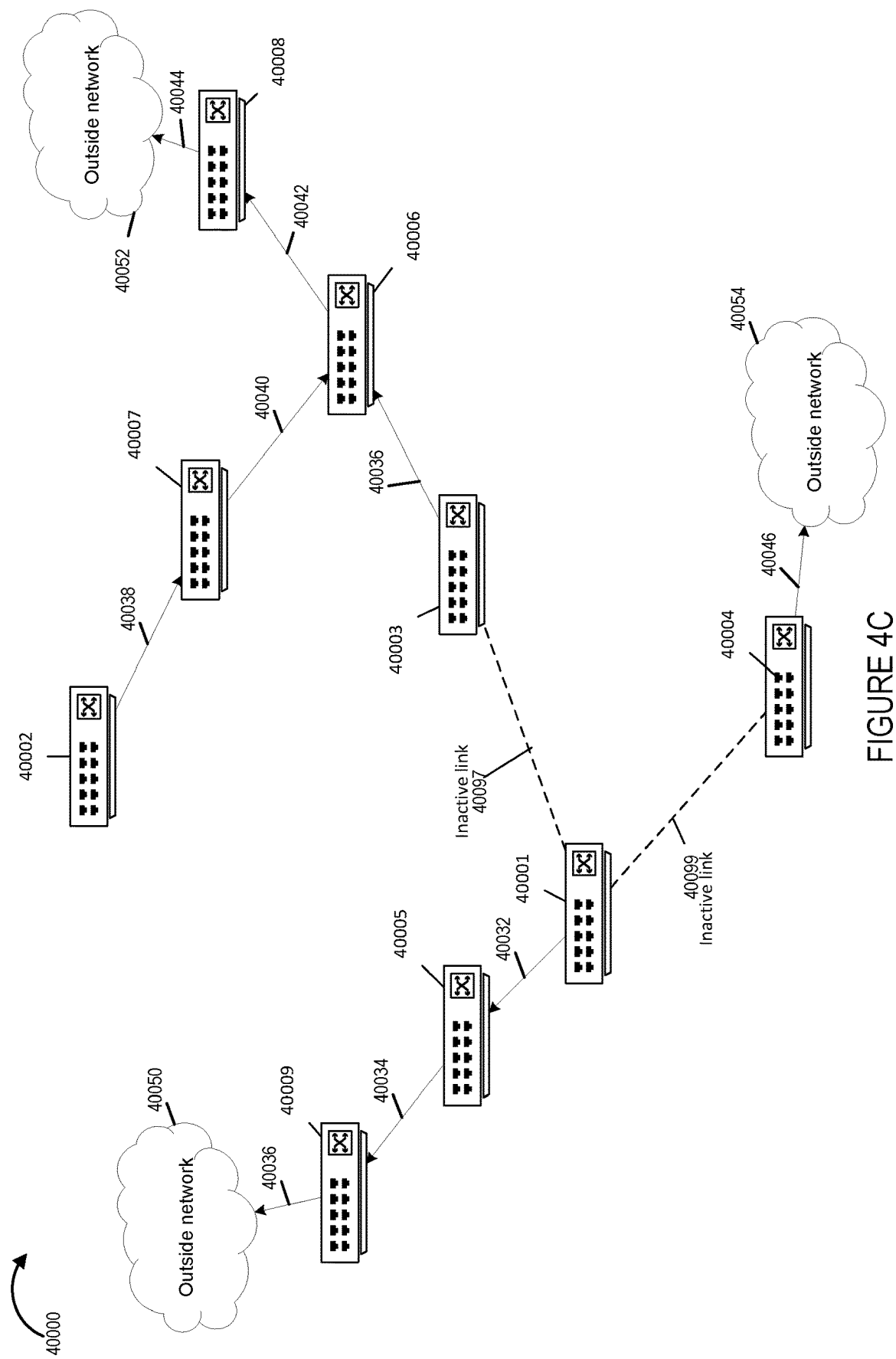
FIG. 4C illustrates exemplary routes created in a network by a first application with Ethernet switches.

Drawing 40000 of FIG. 4C shows exemplary routes created in a network by a first application with Ethernet switches. In one embodiment, the exemplary network includes communications devices (40001, 40002, 40003, 40004, 40005, 40006, 40007, 40008, 40009) each including a Ethernet switch. Exemplary outside networks (40050, 40052, 40054), are coupled to the network via devices (40009, 40008, 40004), respectively, which serve as gateways. A first route includes connections (40030, 40032, 40034) between entities ((40001, 40005),(40005, 40009), and (40009, 40050), respectively. A second route includes connections (436, 442, 444) between entities ((40003, 40006),(40006, 40008), and (40008, 40052), respectively. A third route includes connections (40038, 40040, 40042, 40044) between entities ((40002, 40007),(40007, 40006), (40006, 40008) and (40008, 45002), respectively. A fourth route includes connection 40046 between entities (40004, 40054). In addition there are inactive links (40097, 40099) between communications devices ((40001, 40003), (40001, 40004)), respectively.

If the routes are considered to end at gateways; a first route includes connections (40030, 40032) between devices ((40001, 40005), and (40005, 40009), respectively; a second route includes connections (436, 442) between devices ((40003, 40006), and (40006, 40008), respectively; a third route includes connections (40038, 40040, 40042) between devices ((40002, 40007),(40007, 40006), and (40006, 40008), respectively; and device 40004 is a gateway with no active link connections to other devices in the network.

Devices (40001, 40005, 40009) may be considered to be included as part of a first segment of the network. Devices (40002, 40003, 40006, 40007 and 40008) may be considered to be included as part of a second segment of the network. Device 40004 may be considered to be included as part of a third segment of the network.

Figure 5:
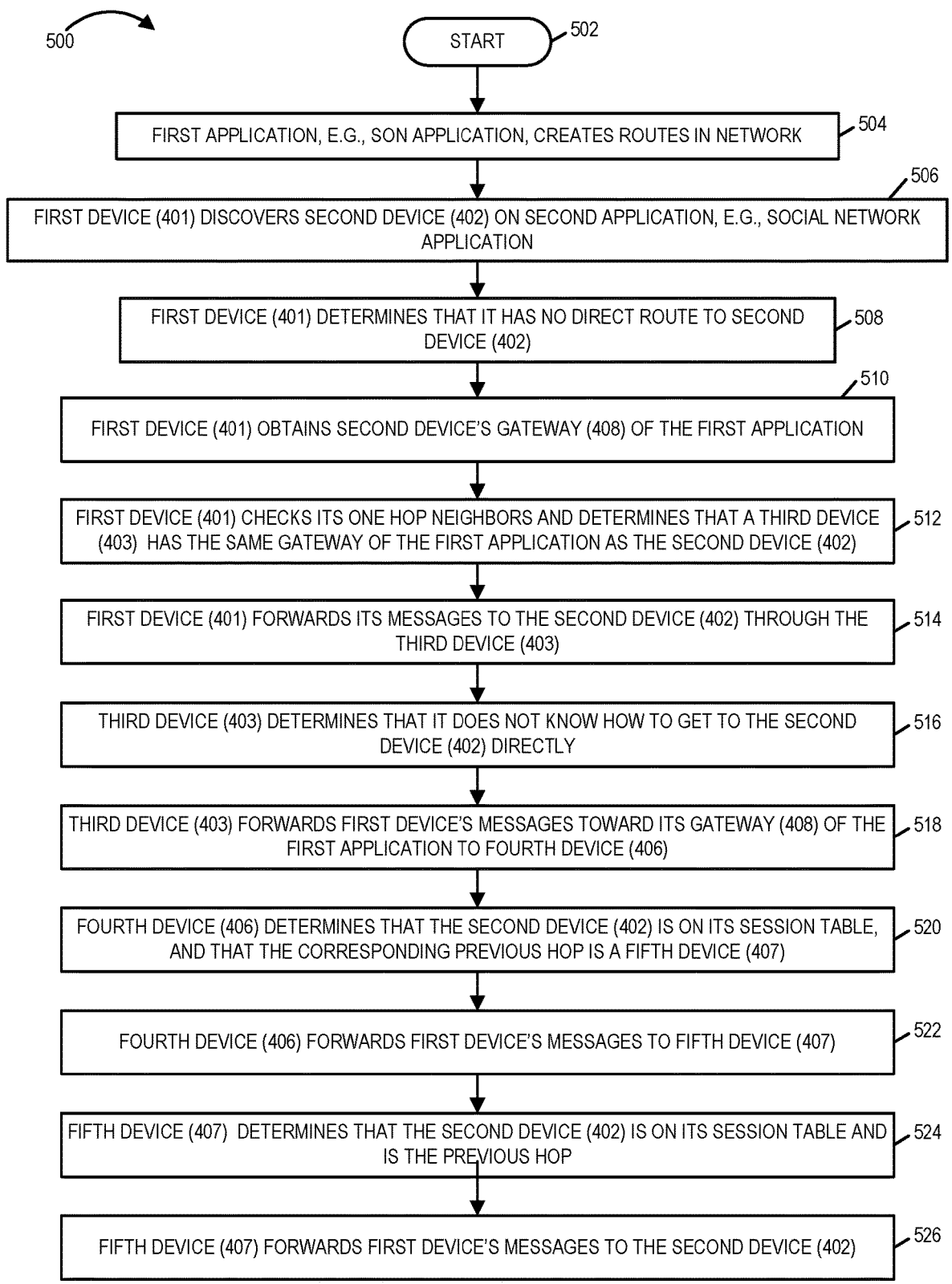
FIG. 5 is a flowchart of an exemplary method of a procedure for route establishment for a second application in a network in accordance with an exemplary embodiment.

FIG. 5 is a flowchart 500 of an exemplary method of a procedure for route establishment for a second application in a network in accordance with an exemplary embodiment. Operation of the exemplary method starts in step 502 in which devices of the network are powered on and initialized. Operation proceeds from start step 502 to step 504. In step 504 the first application, e.g., a SON application, creates routes in the network. Drawing 400 of FIG. 4A illustrates exemplary routes created in a network by a first application. Operation proceeds from step 504 to step 506.

In step 506, a first device, e.g., device 401, discovers a second device, e.g., device 402, on a second application, e.g., a social network application. Operation proceeds from step 506 to step 508.

In step 508, the first device, e.g., device 401, determines that it has no direct route to the second device, e.g., device 402, e.g., based on stored first application created route information. Operation proceeds from step 508 to step 510. In step 510, the first device, e.g., device 401 obtains the second device's gateway, e.g., device 408, of the first application. Operation proceeds from step 510 to step 512.

In step 512 the first device, e.g., device 401, checks its one hop neighbors and determines that a third device, e.g., device 403, has the same gateway of the first application as the second device, e.g., device 403. Exemplary one hop neighbors which are checked in step 512 include, e.g., device 405, device 403 and device 404. In some embodiments, the devices (405, 403, 404) transmit beacons which are received by device 401 and used to identify one hop neighbors. Note device 402 and device 403 both use gateway 408 for the first application as shown in the routing of FIG. 4A. Operation proceeds from step 512 to step 514.

In step 514 the first device, e.g., device 401, forwards its messages to the second device, e.g., device 402 through the third device, e.g., device 403. Operation proceeds from step 514 to step 516. In step 516 the third device, e.g., device 403, determines that it does not know how to get to the second device 402 directly. Operation proceeds from step 516 to step 518.

In step 518 the first device forwards first device messages toward its gateway, e.g., gateway 408, of the first application to fourth device 406. Operation proceeds from step 518 to step 520. In step 520 the fourth device, e.g., device 406, determines that the second device, e.g., device 402, is on its session table, and that the corresponding previous hop is a fifth device, e.g., device 407. Operation proceeds from step 520 to step 522, in which the fourth device, e.g., device 406, forwards, the first device's messages, to the fifth device, e.g., device 407. Operation proceeds from step 522 to step 524.

In step 524 the fifth device, e.g., device 407, determines that the second device, e.g., device 402, is on its session table, and that the corresponding previous hop is second device, e.g., device 402. Operation proceeds from step 524 to step 526, in which the fifth device, e.g., device 407, forwards, the first device's messages, to the second device, e.g., device 402. The second device, e.g., device 402, receives and recovers the first device's messages.

Figure 6:
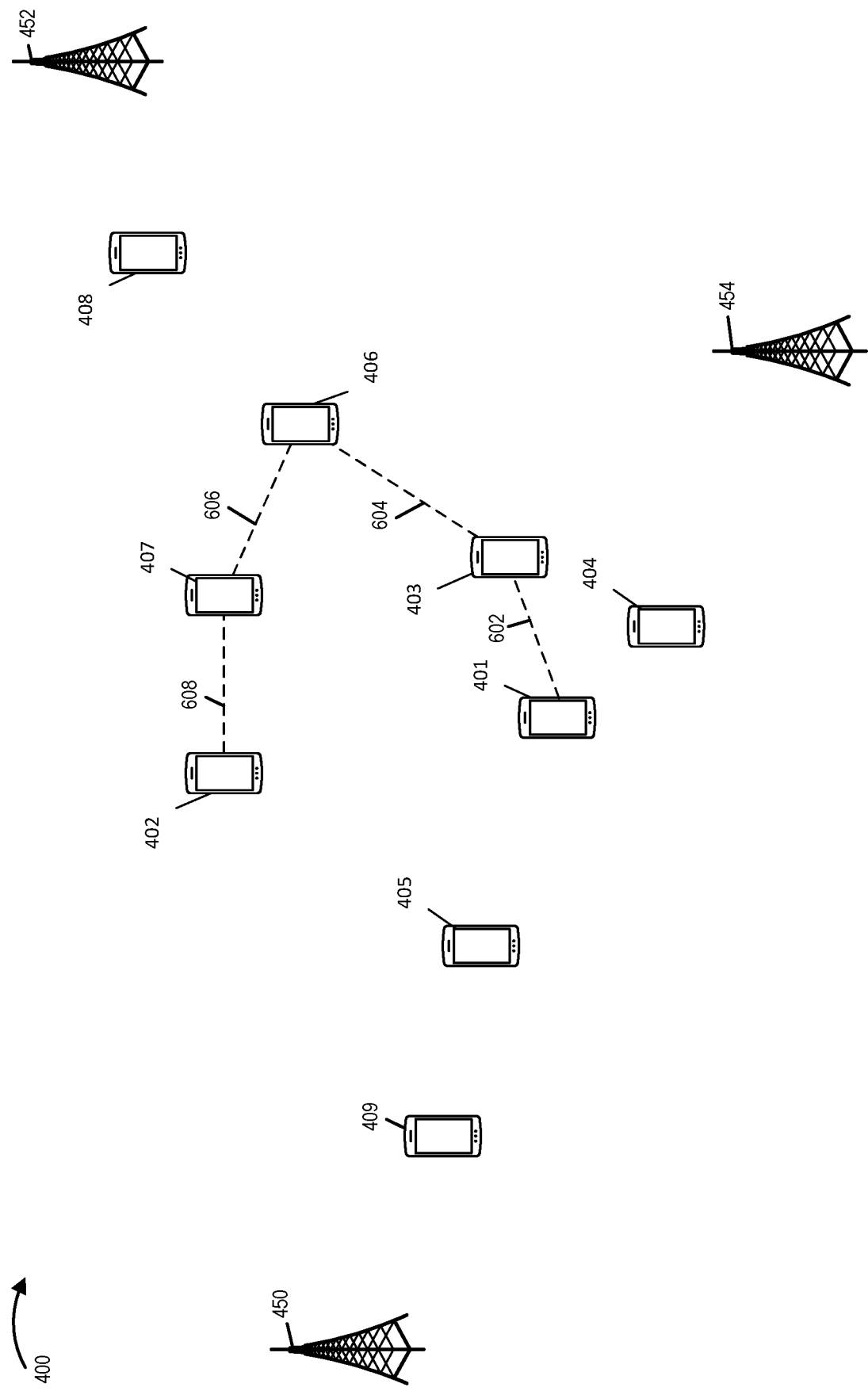
FIG. 6 illustrates an exemplary route created for a second application, e.g., corresponding to the method of flowchart of FIG. 5 and the exemplary created first application routes of FIG. 4A.

Drawing 600 of FIG. 6 illustrates an exemplary route created for a second application, e.g., corresponding to the method of flowchart 500 of FIG. 5 and the exemplary created first application routes of FIG. 4A. The second application is different from the first application but can be similar in that it may be used to establish connections or communications paths between a wireless communications device and another device in the network based on physical proximity and/or communications connectivity to i) LANs/ WANs/MANs; ii) group leaders, iii) medics, iv) users with a large number of connections in a social network, v) users with a large number of followers in a social network, vi) injured soldiers, vii) moving tanks, viii) merchant(s) of interest, ix) merchandise of interest, content of interest, x) users with similar interests, and/or xi) users with similar personality profiles). The second application can take advantage of communications paths, connections and/or routing information established by one or more devices to support the first application to facilitate the second application. Thus, while the first and second applications are different and maybe used to communicate or obtain access to different information or individuals, they may both be communications applications. Exemplary second application route includes connections (602, 604, 606, 608) between devices ((401, 403), (403, 406), (406, 407), (407, 402)), respectively.

In some exemplary networks, there can be, and sometimes are, multiple applications. In some such embodiments, each application forms a set of routes. When a first device, e.g., device 401, discovers a second device, e.g., device 402, the first device can use routes from any application that it has in common with the second device, providing that at least one of the first device's one-hop neighbors share the same gateway with the second device on that application. The discovery of second application can be from any of various possible alternative sources, e.g., LTE-D beacons, internet-based, SMS, etc.

In some embodiments, the first device, e.g., device 401, cannot establish a route to the second device, e.g. device 402, unless at least one of the first device's one-hop neighbors share the same gateway with second device on at least one application.

Figure 7:
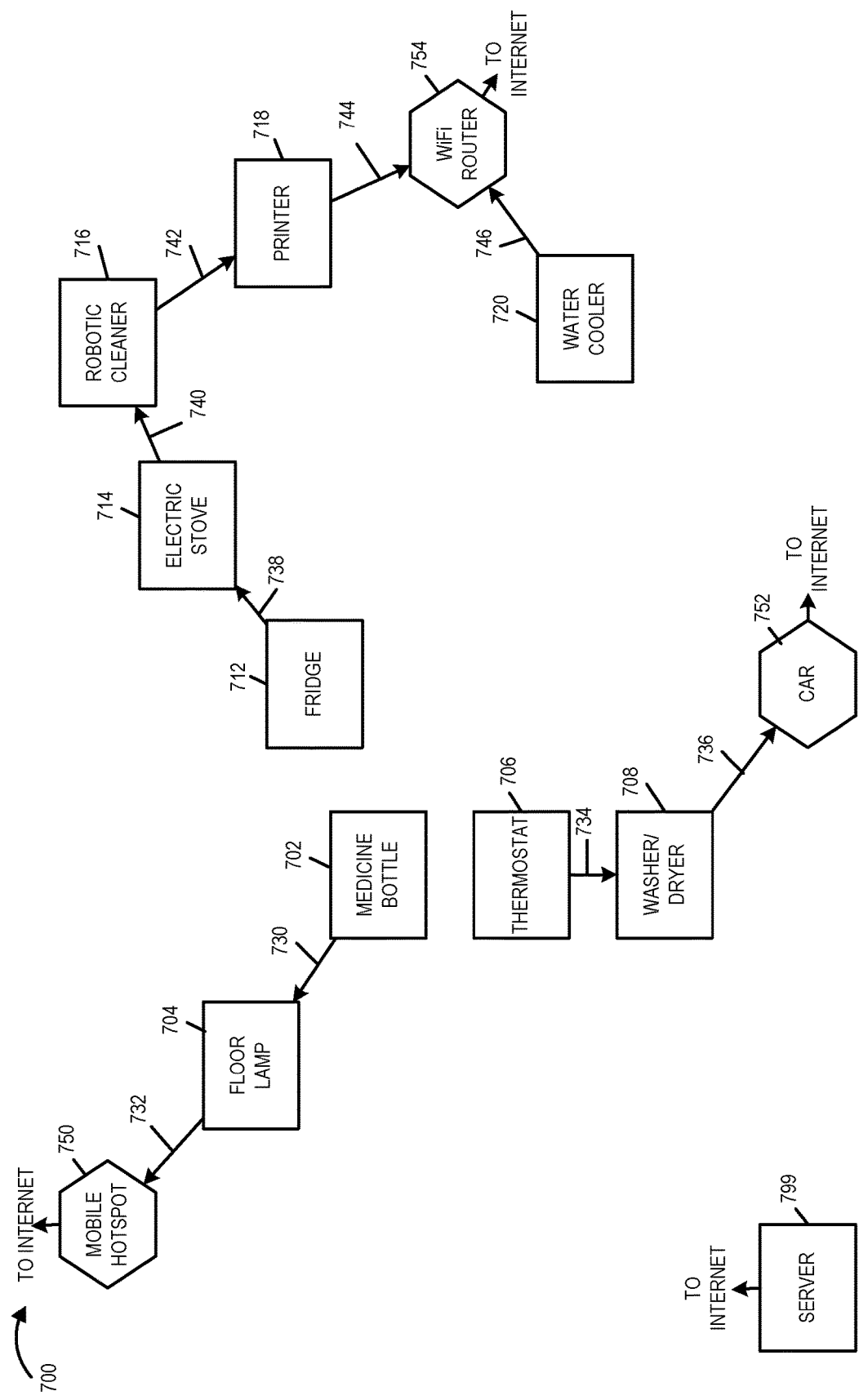
FIG. 7 is a drawing of a smart home example of route creation for a first application in accordance with an exemplary embodiment.

FIG. 7 is a drawing 700 of a smart home example of route creation for a first application in accordance with an exemplary embodiment. The exemplary communications system of FIG. 7 includes a plurality of smart Internet of Things devices (medicine bottle 702, a floor lamp 704, a thermostat 706, a washer/dryer 708, a fridge 712, an electric stove 714, a robotic cleaner 716, a printer 718, and a water cooler 720). In various embodiments, each of the Internet of Things devices (708, 710, 712, 714, 716, 718, 720) includes a wireless interface. The exemplary system of FIG. 7 further includes a mobile hotspot 750, a car 752, and a WiFi router 754, each of which provide an interface to the Internet and/or a cellular network. In various embodiments, the smart devices (708, 710, 712, 714, 716, 718, 720) and the gateway devices (750, 752 and 754) are included as part of a home network implemented in accordance with features of the present invention. The exemplary system of FIG. 7 further includes a server 799, e.g., at a remote location, coupled to the Internet.

Smart devices (702, 704, 706, 708, 712, 714, 716, 718, 720) each have a radio interface. The gateways (750, 752, 754) have an Internet connection.

An exemplary first route created for a first application includes connections (730, 732) corresponding to devices ((702, 704), (704, 750)), respectively. An exemplary second route created for the first application includes connections (734, 736) corresponding to devices ((706, 708), (708, 752)), respectively. An exemplary third route created for the first application includes connections (738, 740, 742, 744) corresponding to devices ((712, 714), (714, 716), (716, 718), (718, 754), respectively. An exemplary fourth route created for the first application includes connections 746 corresponding to devices (720, 754).

The exemplary network may be considered to have 3 segments, each segment including a gateway device (750, 752, 754).

For security/privacy reasons, some devices have one or more restrictions on the type of information they can send over the Internet. For example, in some embodiments, the medicine bottle 702 cannot send medical information over the Internet.

Figure 8:
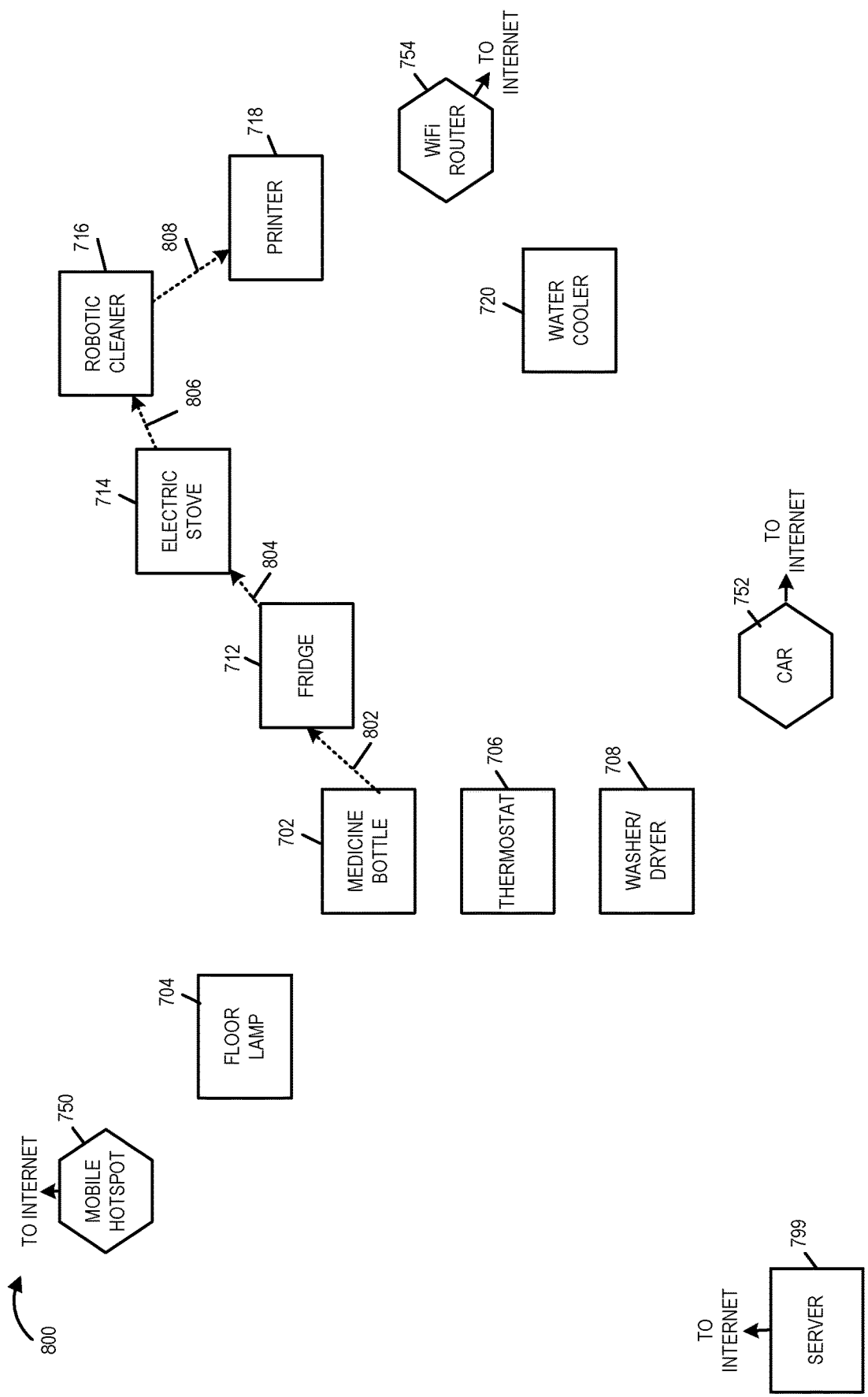
FIG. 8 illustrates an example of route creation for a second application of the smart home example of FIG. 7.

FIG. 8 illustrates an example of route creation for a second application of the smart home example of FIG. 7. When the medicine bottle 702 detects that some medicine is running low, e.g., based on a sensor included in the medicine bottle, the medicine bottle 702 tries to find the printer 718 to print out the name, quantity, doctor instructions for these medicine. The medicine bottle 718 asks a remote server 799 what the printer's 718 gateway is. The server 799 responds that the printer's gateway is the wifi router 754. The medicine bottle 702 senses that the fridge 712 is within its wifi/zigbee range, and is advertising the wifi router 754 as its gateway, e.g., based on received wireless signals, e.g., beacons, e.g., WiFi beacons, from the fridge 712. The medicine bottle 702 sends its data, which is to be delivered to the printer 718, to the fridge 712. The fridge determines that the printer 718 is on its session table, and that the corresponding next hop is electric stove 714. The fridge forwards the medicine bottle's messages, to the electric stove 714. The electric stove 714 determines that the printer 718 is on its session table, and that the corresponding next hop is robotic cleaner 716. The electric stove forwards the medicine bottle's messages, to the robotic cleaner 716. The robotic cleaner 716 determines that the printer 718 is on its session table, and that the corresponding next hop is printer 718. The robotic cleaner 716 forwards the medicine bottle's messages, to the printer 718. The printer 718 receives and recovers the medicine bottle's messages, and the printer 718 prints out the name, quantity, doctor instructions for these medicine in accordance with the information in the received messages. This example of FIG. 7 and FIG. 8 assumes each of the appliances (702, 704, 706, 708, 712, 714, 716, 718, 720) in the home are trustworthy and potential threats are only from outside.

FIG. 8 illustrates an exemplary created route for a second applications including connections (802, 804, 806, 808) corresponding to devices ((702, 712), (712, 714), (714, 716), (716, 718)), respectively.

Figure 9:
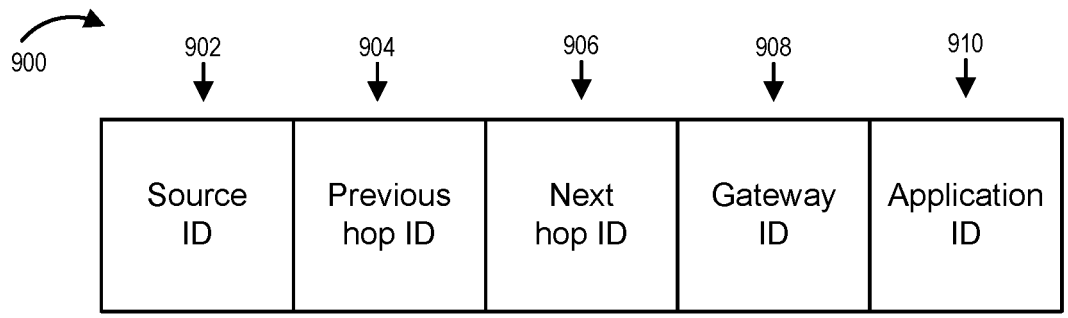
FIG. 9 is a drawing illustrating exemplary address fields associated with a session in accordance with various exemplary embodiments.

FIG. 9 is a drawing 900 illustrating exemplary address fields associated with a session in accordance with various embodiments. In some embodiments, the address fields associated with a session includes a source ID field 902, a previous hop ID field 904, a next hop ID field 906, a gateway ID field 908, and an application ID field 910.

Figure 10:
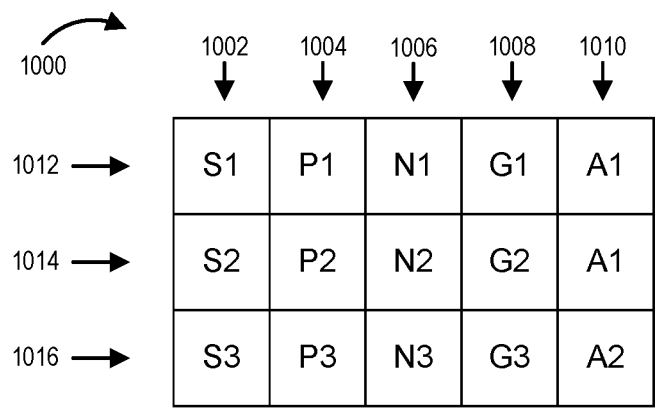
FIG. 10 illustrates an exemplary session table at a device in accordance with an exemplary embodiment.

FIG. 10 illustrates an exemplary session table 1000 at a device in accordance with an exemplary embodiment. First column 1002 includes the source ID; second column 1004 includes the previous hop ID; third column 1006 includes the next hop ID; fourth column 1008 includes the gateway ID; and fifth column 1010 includes the application ID. First row 1012 indicates that for source device identified with source ID=S1, the previous hop is identified by ID=P1, the next hop is identified by ID=N1, the gateway is identified by ID=G1, and the application is identified by ID=A1. Second row 1014 indicates that for source device identified with source ID=S2, the previous hop is identified by ID=P2, the next hop is identified by ID=N2, the gateway is identified by ID=G2, and the application is identified by ID=A1. Third row 1016 indicates that for source device identified with source ID=S3, the previous hop is identified by ID=P3, the next hop is identified by ID=N3, the gateway is identified by ID=G3, and the application is identified by ID=A2.

Figure 11:
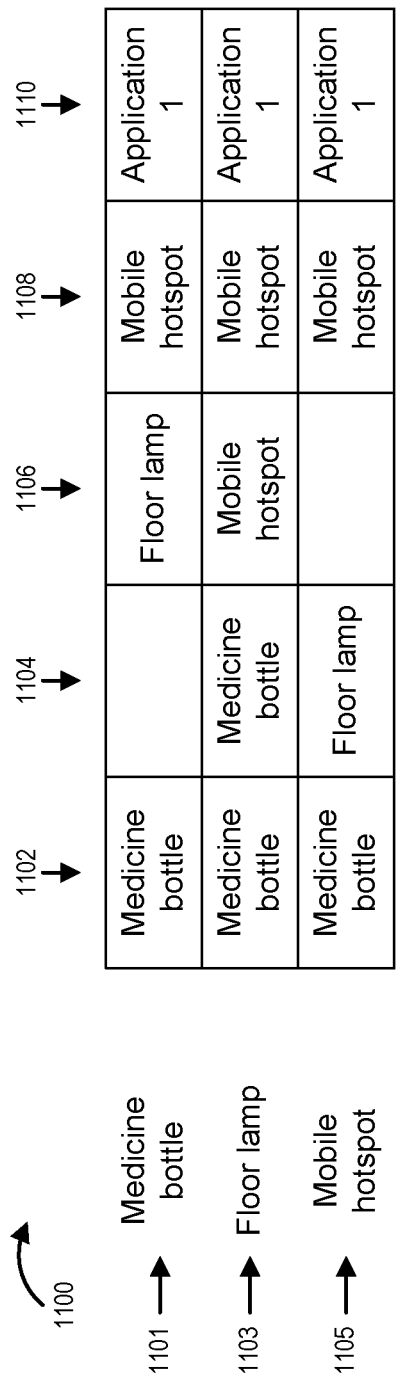
FIG. 11 illustrates an exemplary routing table for a medicine bottle communications device—mobile hotspot communication device session for exemplary application 1 corresponding to the example of FIG. 7.

FIG. 11 illustrates an exemplary routing table 1100 for (medicine bottle 702—mobile hotspot 750) session for exemplary application 1 corresponding to the example of FIG. 7. First column 1102 identifies the source; second column 1104 identifies the previous hop; third column 1106 identifies the next hop; fourth column 1108 identifies the destination; and fifth column 1110 identifies the application. First row 1101 indicates that for the medicine bottle 702, the source is the medicine bottle, there is no previous hop; the next hop is the floor lamp, the destination is mobile hotspot; and the application is application 1. Second row 1103 indicates that for the floor lamp 704, the source is the medicine bottle, the previous hop is the medicine bottle; the next hop is the mobile hotspot, the destination is mobile hotspot; and the application is application 1. Third row 1105 indicates that for the mobile hotspot 750, the source is the medicine bottle, the previous hop is the floor lamp; there is no next hop; the destination is mobile hotspot; and the application is application 1.

Figure 12:
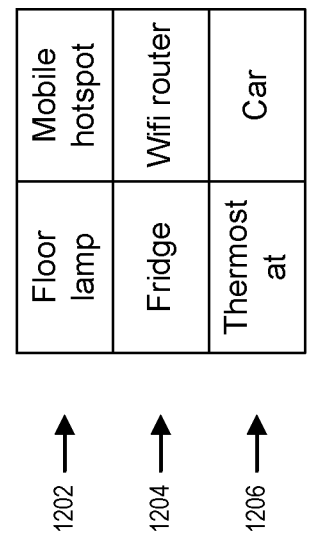
FIG. 12 illustrates one-hop devices and their gateways for application 1 from the medicine bottle communications device point of view in accordance with the example of FIG. 7.

FIG. 12 illustrates one-hop devices and their gateways for application 1 from the medicine bottle 702 point of view in accordance with the example of FIG. 7. First row 1202 indicates that, from the perspective of medicine bottle 702, floor lamp 704 is a one-hop device and floor lamp 704 uses mobile hotspot 750 as its gateway for application 1. Second row 1204 indicates that, from the medicine bottle 702 point of view, fridge 738 is a one-hop device and fridge 738 uses mobile hotspot 750 as its gateway for application 1. Third row 1206 indicates that, from the medicine bottle 702 point of view, thermostat 706 is a one-hop device and thermostat 706 uses car 752 as its gateway for application 1.

Figure 13:
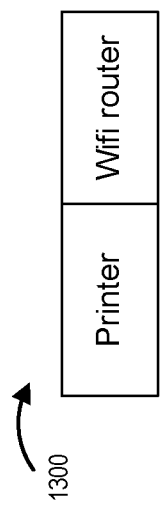
FIG. 13 illustrates a table identifying a target device for application 2 and its gateway for application 1 from the medicine bottle communications device point of view corresponding to the example of FIG. 8.

Drawing 1300 of FIG. 13 illustrates a target device for application 2 and its gateway for application 1 from the medicine bottle point of view corresponding to the example of FIG. 8. The target device is printer 718 which uses WiFi router 752 as its gateway for application 1.

Figure 14:
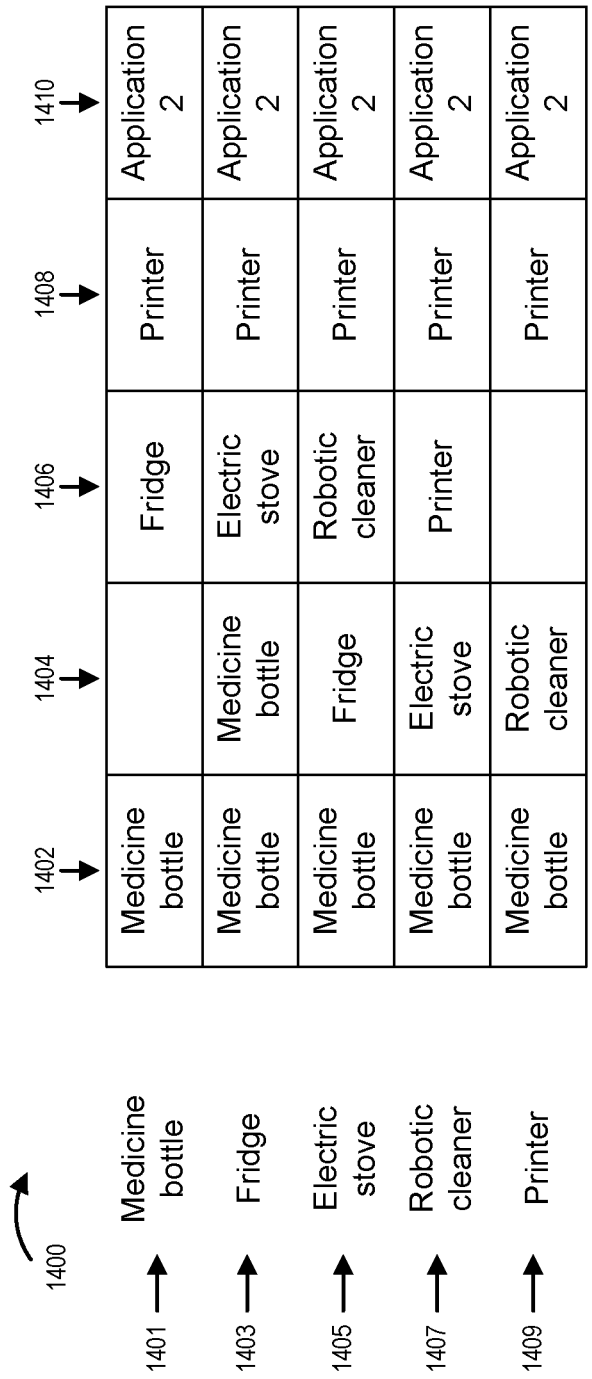
FIG. 14 illustrates an exemplary routing table for medicine bottle communications device—printer communications device session for exemplary application 2 corresponding to the example of FIG. 8.

FIG. 14 illustrates an exemplary routing table 1400 for (medicine bottle 702—printer 718) session for exemplary application 2 corresponding to the example of FIG. 8. First column 1402 identifies the source; second column 1404 identifies the previous hop; third column 1406 identifies the next hop; fourth column 1408 identifies the destination; and fifth column 1410 identifies the application. First row 1401 indicates that for the medicine bottle 702, the source is the medicine bottle, there is no previous hop; the next hop is the fridge, the destination is the printer; and the application is application 2. Second row 1403 indicates that for the fridge 712, the source is the medicine bottle, the previous hop is the medicine bottle; the next hop is the electric stove, the destination is the printer; and the application is application 2. Third row 1405 indicates that for the electric stove 714, the source is the medicine bottle, the previous hop is the fridge; the next hop is the robotic cleaner; the destination is the printer; and the application is application 2. Fourth row 1407 indicates that for the robotic cleaner 716, the source is the medicine bottle, the previous hop is the electric stove; the next hop is the printer; the destination is the printer; and the application is application 2. Fifth row 1409 indicates that for the printer 718, the source is the medicine bottle, the previous hop is the robotic cleaner; there is no next hop; the destination is the printer; and the application is application 2.

In some embodiments, a session ID, e.g., a randomly generated session ID, can be, and in some embodiments is, used in the response together with or instead of source and intermediate hops ID. In various embodiments, each source/gateway pair can have more than one session at a time. In some embodiments, among these multiple sessions, one can be used at a time, with the others acting in a redundancy capacity. Alternatively, multiple sessions can be used concurrently to deliver better performance (e.g. improve throughput, reduce error rate).

In a multiple sessions per source/gateway pair case, there can be, and sometimes is, a limit to the number of such sessions at each node. In various embodiments, this limit can further depend on the distance (hop count) from the node to the source, and/or from the node to the gateway. Use of this limit prevents the number of sessions from exploding.

In some embodiments, when the above-mentioned session number limit is enforced, an intermediate node receiving a session establishment request only forwards such request (after adding its own ID) to the best next hops for this gateway while staying under the limit. Here the comparison between routes uses a route quality metric. In some embodiments, an intermediate node can, and sometimes does, also perform load balancing, based on its view of the network, and selects which next hops to forward the route establishment request to.

Sessions in multiple-app context will be described below. In some embodiments, for each source-destination pair, each app can have its own session. This way quality of service (QoS) is easily maintained.

| S1 | P1 | N1 | G1 | A1 |
|----|----|----|----|----|

In another embodiment, multiple apps (or all apps) share a common session. Data is split up on a higher layer (IP, transport, or application).

| S1 | P1 | N1 | G1 | A1, A2 |
|----|----|----|----|--------|

ID can be universal or application-specific. In some embodiments, for application-specific IDs, a gateway ID is always associated with an application ID—i.e. (G,A) pair, the (gateway ID, application ID) pair.

A session establishment starts with a device, called the source S, which wants to connect to another device, called the destination D. Additional information about D that S must know: (G,A) pair. App ID A can be omitted if There is a default app
ID is universal and devices can use routes from any app-context
For example, device X has the following session table

| S1 | P1 | N1 | G1 | A1 |
|----|----|----|----|----|
| S2 | P2 | N2 | G2 |    |
| S3 | P3 | N3 | G3 | A2 |

Device Y tries to establish a connection to device Z with (G,A). The session establishment request is received at device X, which is not the final destination device Z. Device X will forward the session establishment request if:
  Z is Si (i=1, 2, 3). Device X forwards the request to Pi
  G is Gi (i=1, 2, 3). Device X forwards the request to Ni
This example applies to the initial session establishment for first application as well. In this case, Z is G.

Two embodiments based on action at device Y are described below.

Figure 15:
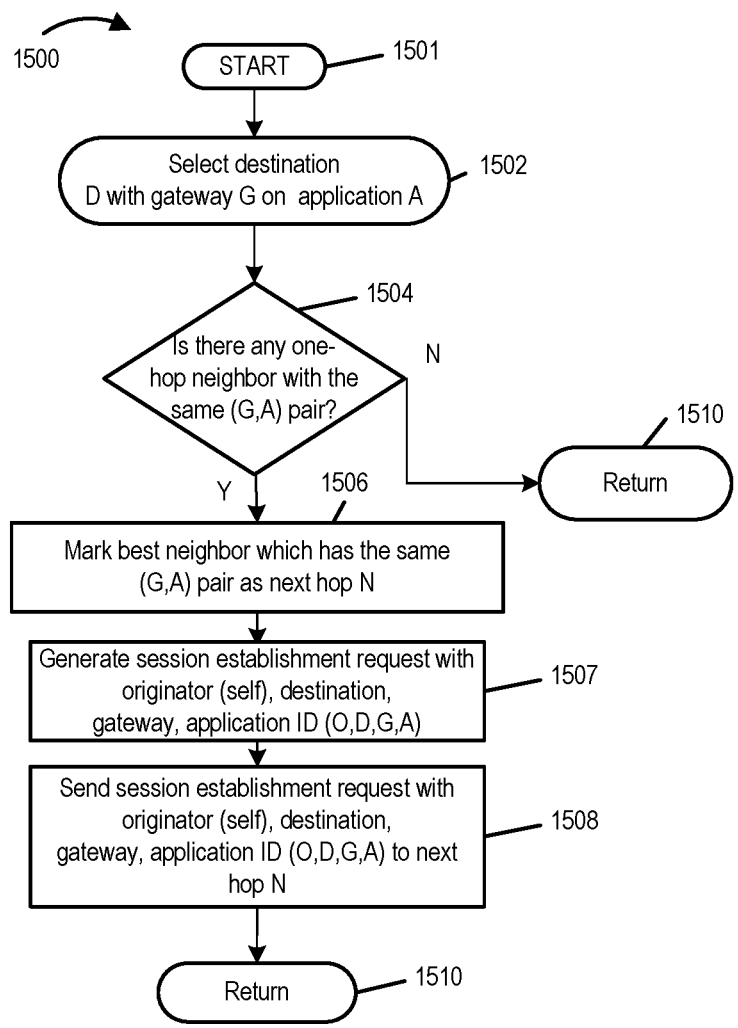
FIG. 15 is a flowchart of an exemplary method of operating a communications device, e.g., a source device, to generate and send a session establishment request in accordance with an exemplary embodiment.

In one embodiment, device Y only sends out a session establishment request if at least one of its one-hop neighbors is advertising (G,A).
  This method guarantees that each of the session establishment requests will be successful, in the sense that the route information is already available in the network (barring packet drops, device malfunctions etc.)
In another embodiment device Y sends out session establishment request regardless of its neighbors
  This method can find more routes, as device Y neighbors may have route to device Z on applications that are not advertised. In some embodiments, advertisement can be done through beacons and/or online database. For example device X is device Y's neighbor. Device X is advertising (G1,A1). Device Z is S3.
  This method cannot guarantee that each of the session establishment requests will be successful, in the sense that the route information is already available in the network FIG. 15 is a flowchart 1500 of an exemplary method of operating a device, e.g., a source device, to generate and send a session establishment request in accordance with an exemplary embodiment. Operation starts in step 1501 and proceeds to step 1502. In step 1502 the device selects destination D with gateway G on application A. Operation proceeds from step 1502 to step 1504. In step 1504 the device determines if there is any one-hop neighbor with the same (G,A) pair. If the determination of step 1504 is that there is not a one-hop neighbor with the same (G,A) pair, then operation proceeds from step 1504 to return step 1510. However, if the determination of step 1504 is that there is at least one one-hop neighbor with the same (G,A) pair, then operation proceeds from step 1504 to step 1506.

In step 1506 the device marks the best neighbor which has the same (G,A) pair as the next hop N. Operation proceeds from step 1506 to step 1507. In step 1507 the device generates a session establishment request with the originator (self), destination, gateway, application ID (O, D, G, A). Operation proceeds from step 1507 to step 1508. In step 1508 the device sends the generated session establishment request including the originator (self), destination, gateway, application ID (O, D, G, A) to the next hop N. Operation proceeds from step 1508 to return step 1510.

Figure 16:
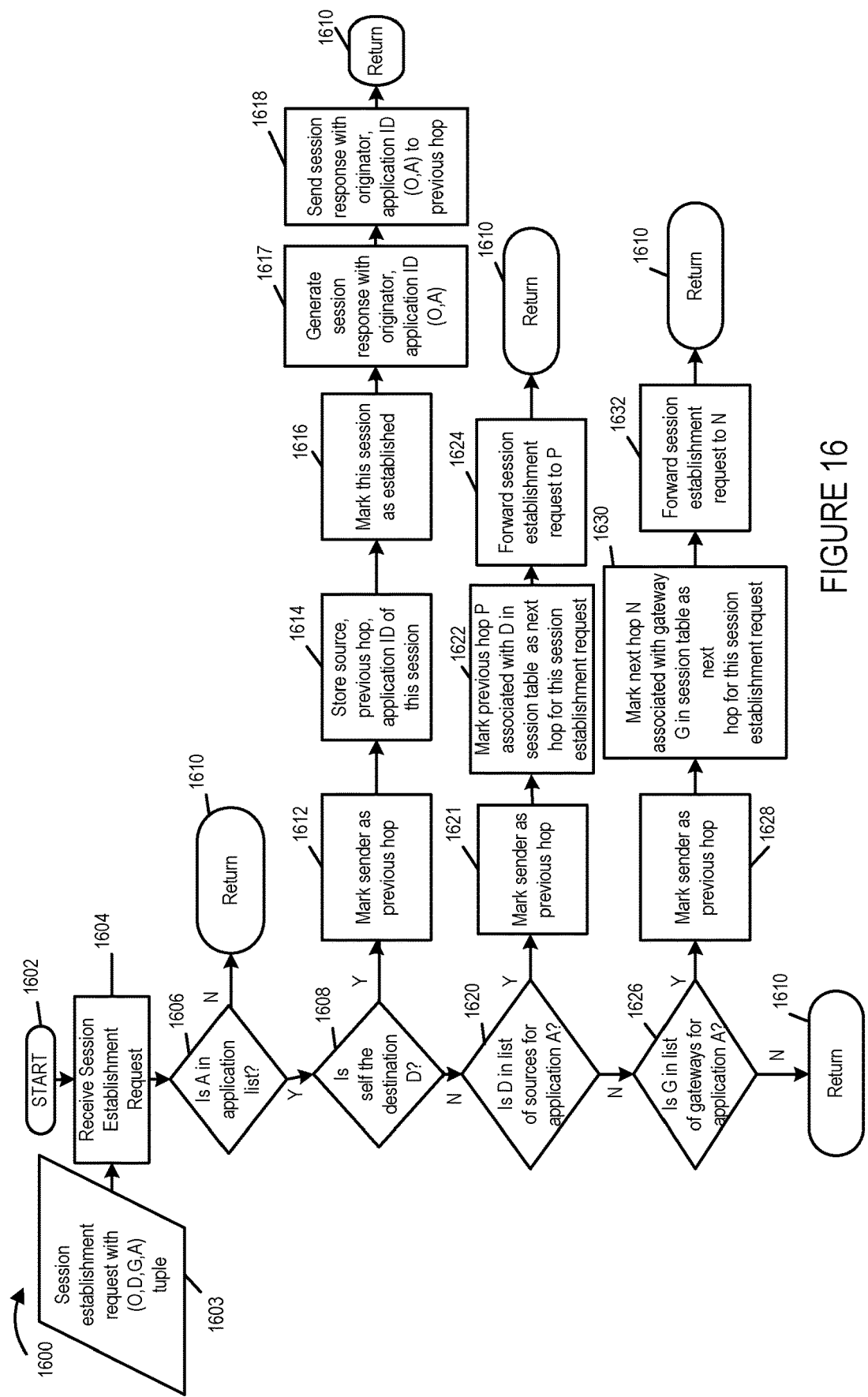
FIG. 16 is a flowchart of an exemplary method of operating a communications device to receive and process a session establishment request in accordance with an exemplary embodiment.

FIG. 16 is a flowchart 1600 of an exemplary method of operating a device to receive and process a session establishment request in accordance with an exemplary embodiment. Operation of the exemplary method starts in step 1602 and proceeds to step 1604. In step 1604, the device receives session establishment request 1603. The received session establishment request includes an (O, D, G, A) ID tuple identifying the originator (source) of the request, the destination, the gateway, and application. Operation proceeds from step 1604 to step 1606.

In step 1606 the device determines if A is in its application list. If A is not in its application list, then operation proceeds from step 1606 to return step 1610. However, if A is determined to be in the application list, then operation proceeds from step 1606 to step 1608.

In step 1608 the device determines whether or not the device itself is the destination D. If the determination of step 1608 is that the device itself is the intended destination D, then operation proceeds from step 1608 to step 1612; otherwise, operation proceeds from step 1608 to step 1620. In step 1612 the device marks the sender as the previous hop. Operation proceeds from step 1612 to step 1614. In step 1614 the device stores the source, previous hop, application ID of this session. Operation proceeds from step 1614 to step 1616. In step 1616, the device marks this session as established. Operation proceeds from step 1616 to step 1617. In step 1617 the device generates a session response with the originator and application ID (O,A). Operation proceeds from step 1617 to step 1618. In step 1618 the device sends the generated session response including the originator and application ID (O,A) to the previous hop. Operation proceeds from step 1618 to return step 1610.

In step 1620 the device checks if destination D is in a list of sources for application A. If the determination is that D is in the list of sources for application A, then operation proceeds from step 1620 to step 1621; otherwise, operation proceeds from step 1620 to step 1626. In step 1621 the device marks the sender as the previous hop. Operation proceeds from step 1621 to step 1622. In step 1622 the device marks the previous hop P associated with D in the session table as the next hop for this session establishment request. Operation proceeds from step 1622 to step 1624. In sep 1624 the device forwards the session establishment request to P. Operation proceeds from step 1624 to return step 1610.

In step 1626, the device determines if gateway G is in the list of gateways for application A. If the determination is that G is in the list for application A, then operation proceeds from step 1626 to step 1628, in which the device marks the sender as the previous hop; otherwise operation proceeds from step 1626 to return step 1610. Operation proceeds from step 1628 to step 1630. In step 1630 the device marks the next hop N associated with the gateway G in the session table as the next hop for this session establishment request. Operation proceeds from step 1630 to step 1632. In step 1632 the device forwards the session establishment request to N. Operation proceeds from step 1632 to return step 1610.

Figure 17:
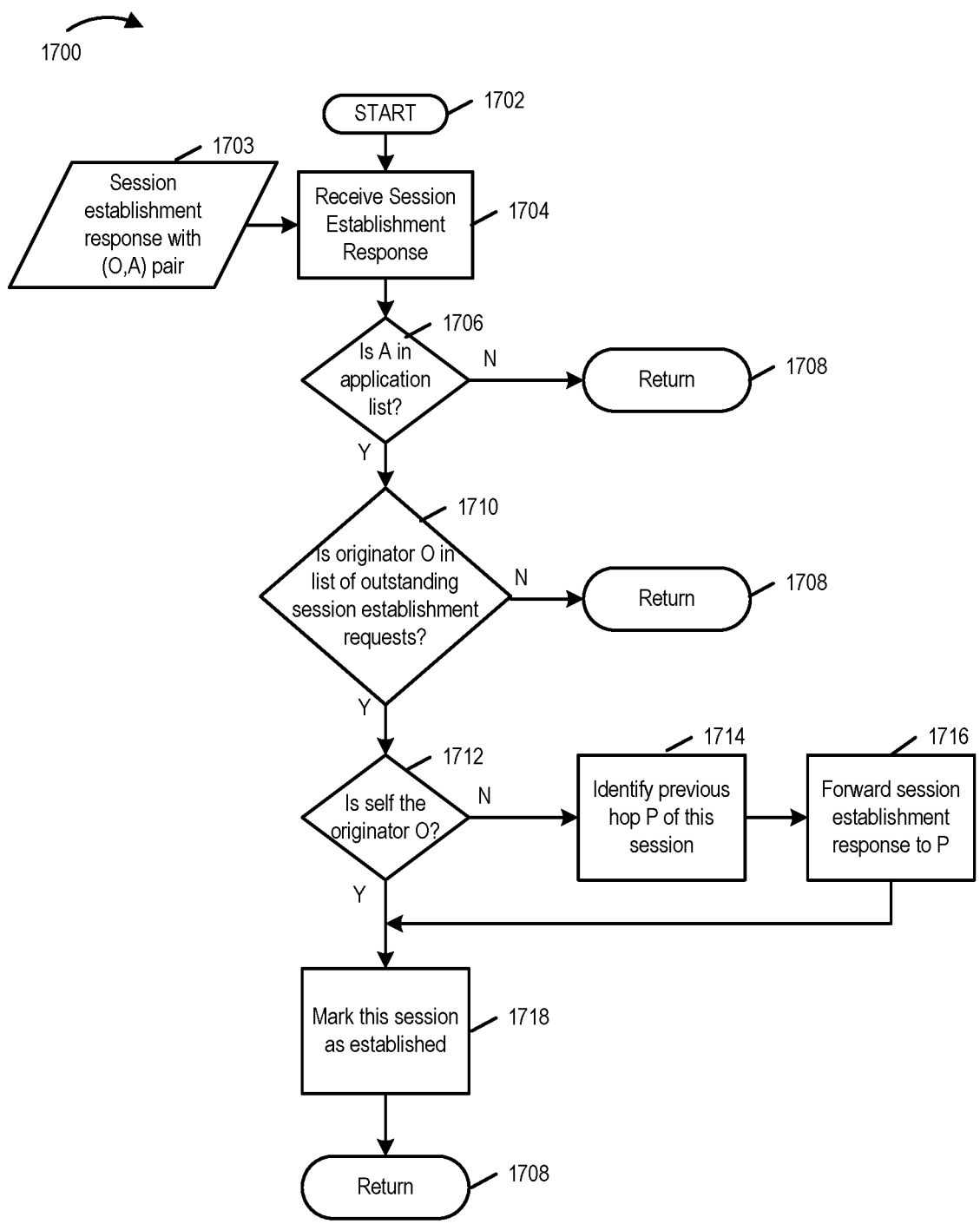
FIG. 17 is a flowchart of an exemplary method of operating a communications device to receive and process a session establishment response.

FIG. 17 is a flowchart 1700 of an exemplary method of operating a device to receive and process a session establishment response. Operation starts in step 1702 and proceeds to step 1704. In step 1704 the device receives session establishment response 1703, the session establishment response including a originator, application identifier pair (O, A) pair. Operation proceeds from step 1704 to step 1706.

In step 1706 the device determines if application A is in the application list. If application A is in the application list, then operation proceeds from step 1706 to step 1710; otherwise, operation proceeds from step 1706 to return step 1708. In step 1710 the device determines if the originator O is in a list of outstanding session establishment requests. If the device determines that the originator O is in the list of outstanding session establishment requests, then operation proceeds from step 1710 to step 1712; otherwise, operation proceeds from step 1710 to return step 1708.

In step 1712, the device determines if the device itself is the originator O. If the determination is that the device itself is the originator O, then operation proceeds from step 1712 to step 1718; otherwise, operation proceeds from step 1712 to step 1714. In step 1714 the device identifies the previous hop P of this session. Operation proceeds from step 1714 to step 1716. In step 1716 the device forwards the session establishment response to P. Operation proceeds from step 1716 to step 1718. In step 1718 the device marks the session as established. Operation proceeds from step 1718 to return step 1708.

Figure 18:
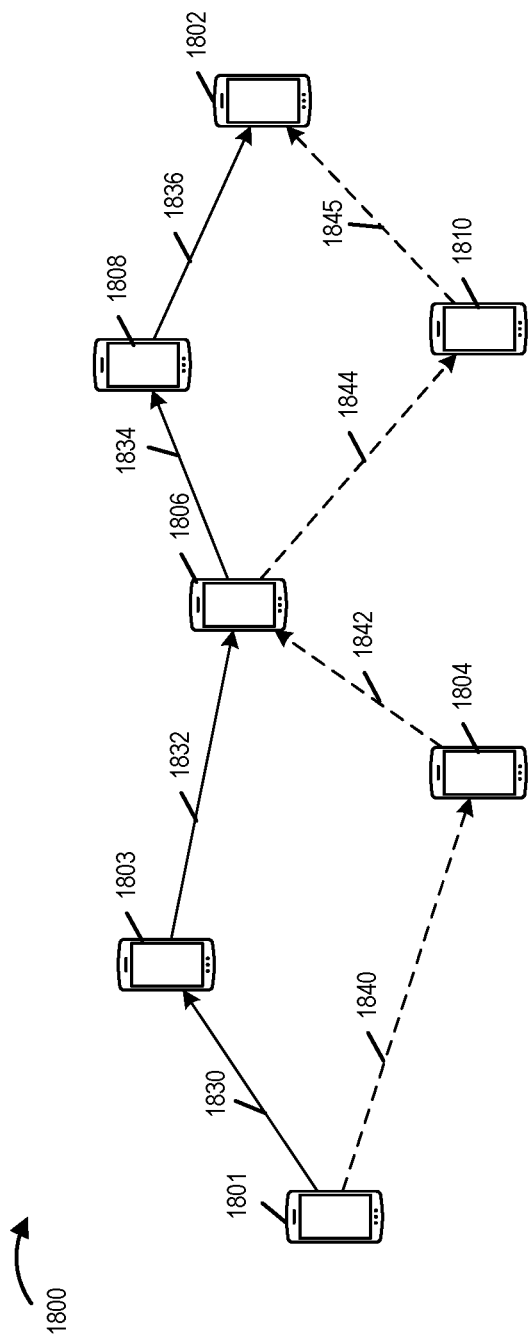
FIG. 18 is a drawing illustrating an example in which two sessions have been established for a source gateway pair in accordance with an exemplary embodiment.

FIG. 18 is a drawing 1800 illustrating an example in which two sessions have been established for a source gateway pair in accordance with an exemplary embodiment. The exemplary system includes a plurality of devices including a wireless interface (device 1801, device 1802, device 1803, device 1804, device 1806, device 1808, device 1810). Routing for a first session includes links 1830, 1832, 1834, 1836, as indicated by solid line arrows. Routing for a second session including links 1840, 1842, 1844, 1845, as indicated by dashed line arrows.

Figure 19A:
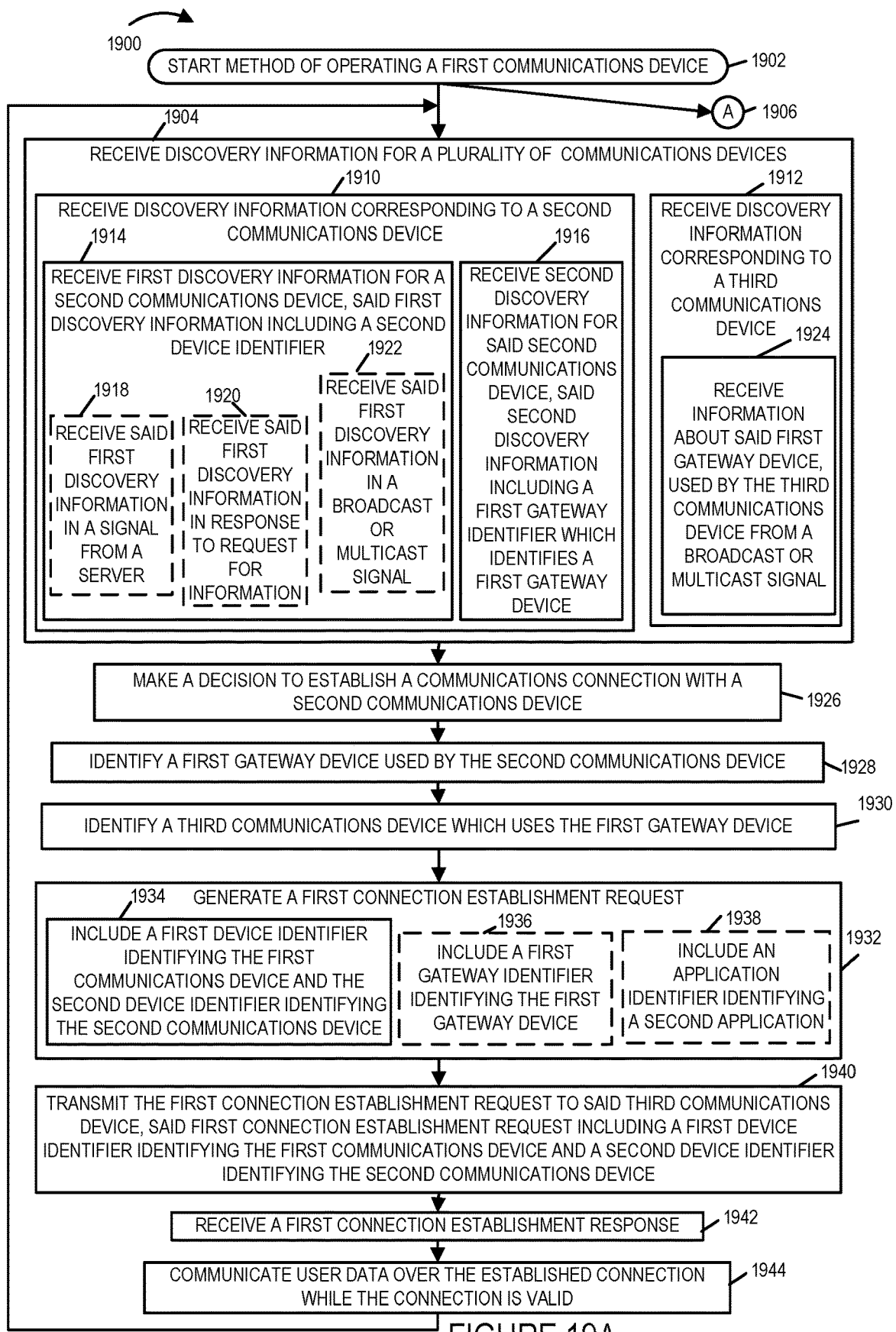
FIG. 19A is a first part of a flowchart of an exemplary method of operating a first communications device, in accordance with an exemplary embodiment.
Figures 19, 19A, 19B:
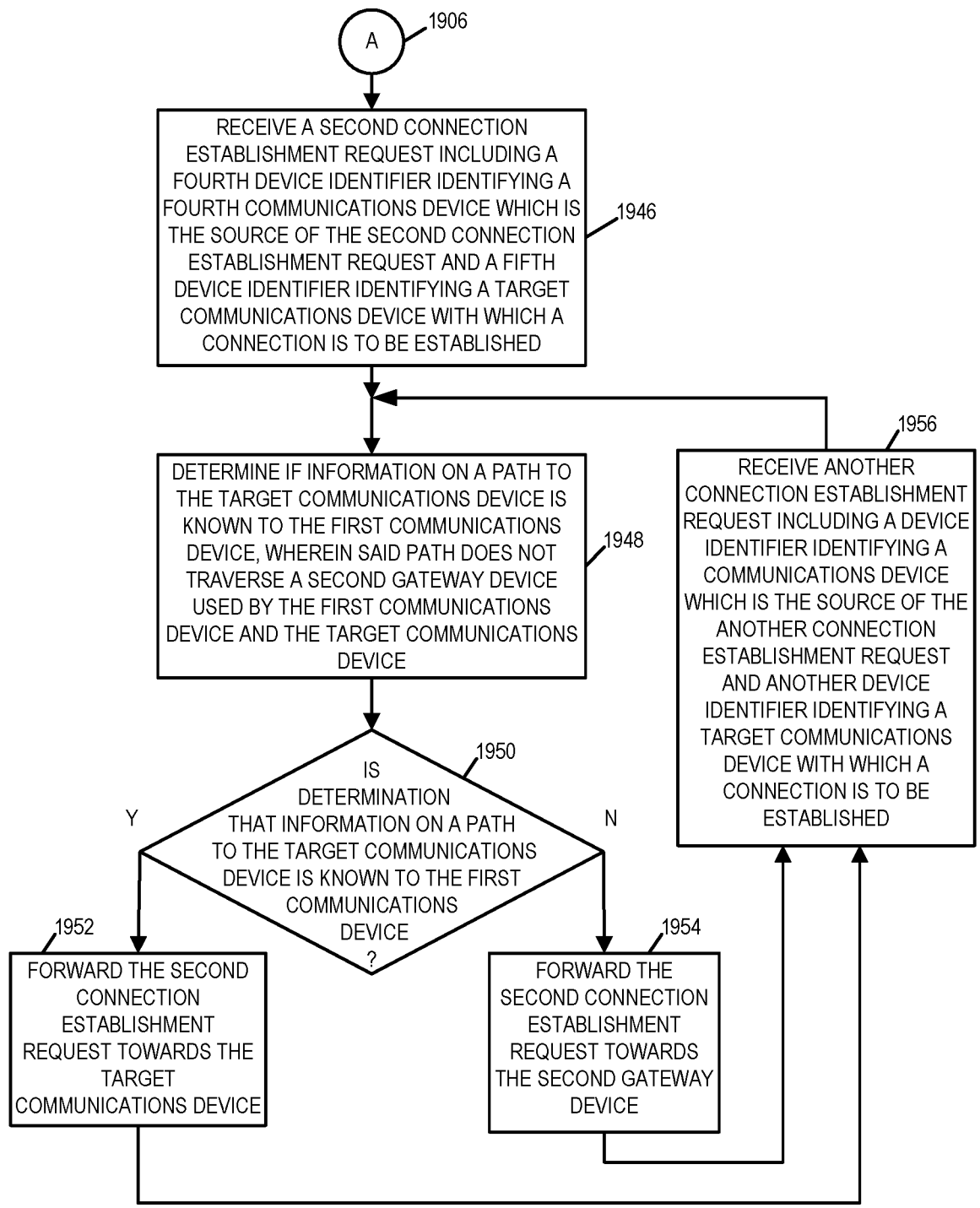
FIG. 19B is a second part of a flowchart of an exemplary method of operating a first communications device, in accordance with an exemplary embodiment.
FIG. 19 comprises the combination of FIG. 19A and FIG. 19B.

FIG. 19, comprising the combination of FIG. 19A and FIG. 19B, is a flowchart 1900 of an exemplary method of operating a first communications device, in accordance with an exemplary embodiment. Operation starts in step 1902, in which the first communications device is powered on and initialized. Operation proceeds from step 1902, to step 1904 and step 1946, via connecting node A 1906.

In step 1904 the first communications device receives discovery information for a plurality of communications devices. Step 1904 includes step 1910 and step 1912. In step 1910 the first communications device receives discovery information corresponding to a second communications device. In step 1912 the first communications device receives discovery information corresponding to a third communications device.

Step 1910 includes step 1914 and step 1916. In step 1914 the first communications device receives first discovery information for a second communications device, said first discovery information including a second device identifier. In step 1916 the first communications device receives second discovery information for said second communications device, said second discovery information including a first gateway identifier which identifies a first gateway device. The first gateway device is used by the second communications device.

In various embodiments, step 1914 includes one or more or all of steps 1918, 1920 or 1922. In step 1918 the first communications device receives said first discovery information in a signal from a server, e.g., a push. In step 1920 the first communications device receives said first discovery information in response to a request for information, e.g., response information obtained from a database lookup in response to a request. In step 1922 the first communications device receives said first discovery information in a broadcast or multicast signal, e.g., a beacon signal, e.g., a LTED beacon.

In some embodiments, the first communications device receives said second discovery information in a signal from a server, e.g., a push. In some embodiments, the first communications device receives said second discovery information in response to a request for information, e.g., response information obtained from a database lookup in response to a request. In some embodiments, the first communications device receives said second discovery information in a broadcast or multicast signal, e.g., a beacon signal, e.g., a LTED beacon.

In some embodiments, the first discovery information and second discovery information are part of multiple beacons, pushes, or responses. For example, the first discovery information and the second discovery information may be communicated in different beacons, e.g., different LTED beacons from the second communications device. In another embodiment, the first discovery information including a device identifier may be communicated in an LTED beacon from the second communications device and the second discovery information including a gateway identifier identifying the gateway used by the second communication device may be communicated in response to request message from the first communications device to a server or database or as part of a discovery information push from a server or database.

In some embodiments, the first discovery information and second discovery information are part of one beacon or one push or one request response. In one embodiment, the first discovery information and the second discovery information are communicated in the same message, e.g., the same beacon message or the same push message or the same response message. Thus in some embodiments, the first discovery information and the second discovery information are received in the same message.

Step 1912 includes step 1924 in which the first communications device receives information about the first gateway device, used by the third communications device, from a broadcast or multicast signal. In some such embodiments, the broadcast or multicast signal is transmitted by the third communications device, i.e., the third communications device advertises the gateway device it uses, which in this case is the first gateway device. In some embodiments, the advertisement is via a beacon signal, e.g., a WiFi beacon signal. In some embodiments, the broadcast or multicast signal, e.g., a beacon signal is associated with a segment of a network, e.g., a segment of a device to device network, by including a gateway identifier of a gateway included in the network segment in said broadcast or multicast signal. Operation proceeds from step 1904 to step 1926.

In step 1926, the first communications device makes a decision to establish a communications connection, e.g., set up a path which an application can then use, with a second communications device. In some embodiments, the communications connection uses wireless interface. In some other embodiments, the communications connection uses power line interface. In still other embodiments, the communications connection use Ethernet interface.

Operation proceeds from step 1926 to step 1928, in which the first communications device identifies a first gateway device used by the second communications device. In some embodiments, the first gateway device is a device which serves as a gateway between one or more peer to peer devices and an infrastructure network node. In various embodiments, the first gateway identifier, e.g., received in step 1916, is used identifying said first gateway device to identify the first gateway device. Operation proceeds from step 1928 to step 1930.

In step 1930 the first communications device identifies a third communications device which uses the first gateway device. Thus, the first communications device searches for and identifies a third communications device, e.g., in one hop WiFi device to device communications range of the first communications device, which uses the same gateway device as is being used by the second communications device. In some embodiments, the third communications device uses the first gateway device for a first application and the decision to establish a communications session is performed by a second application which is different from said first application. For example, the first, e.g., primary, application is a SON application which resulted in session connections being established with the first gateway device for purposes of first, e.g., primary, application communication, and the second, e.g. secondary purpose, application takes advantage of communications routes formed and/or established for the first, e.g., primary, application. Operation proceeds from step 1930 to step 1932.

In step 1932 the first communications device generates a first connection establishment request. Step 1932 includes step 1934, and in some embodiments, includes one or both of steps 1936 and 1938. In step 1932 the first communications device includes a first device identifier identifying the first communications device, e.g., the source device, and the second device identifier identifying the second communications device, e.g., the target destination device, in the first connection establishment request. In step 1936 the first communications device includes a first gateway identifier identifying the first gateway device in the first connection establishment request. In step 1938 the first communications device includes an application identifier identifying a second application, e.g., identifying the application for which the session is being established, in the first connection establishment request. Operation proceeds from step 1932 to step 1940.

In step 1940 the first communications device transmits the generated first connection establishment request to said third communications device, said first connection establishment request including a first device identifier identifying the first communications device, and a second device identifier identifying the second communications device. In some embodiments the first connection establishment request further includes one or both of the first gateway identifier and the second application identifier. In various embodiments, the first connection establishment request is a device to device request. In one embodiment, the first connection establishment request is communicated from the first communications device to the third communications device using a WiFi device to device signaling protocol.

In some embodiments, the communications connection uses wireless interface. In some other embodiments, the communications connection uses Ethernet interface. In still other embodiments, the communications connection uses power line interface. In some embodiments, the first discovery information and the second discovery information are communicated using a first communications protocol which is different from a second communications protocol used to communicate said first connection establishment request. In some embodiments, the first communications protocol is a LTED protocol or long range white space protocol, and the second communications protocol is a WiFi protocol. In some embodiments, the first communications protocol has a longer discovery range than the second communications protocol.

In various embodiments, the first discovery information is communicated using a first frequency band which is different from a second frequency band used to communicate the first connection establishment request. In some such embodiments, the second discovery information is communicated using the second frequency band Operation proceeds from step 1940 to step 1942 in which the first communications device receives a first connection establishment response. Operation proceeds from step 1942 to step 1944 in which the first communications device communicates user data, e.g., second application user data, over the established connection while the connection is valid.

Operation proceeds from step 1944 to step 1904, in which the above described method may be repeated to establish and subsequently use another connection, e.g., with another second device. In this subsequent iteration different communications devices may take on the roles of the second communications device (destination target of another generated connection establishment message), third communications device (next hop device to send the connection establishment request message), and first gateway (gateway common to destination target and next hop device).

Retuning to step 1946, in step 1946 the first communications device receives a second connection establishment request including a fourth device identifier identifying a fourth communications device which is the source of the second connection establishment request and a fifth device identifier identifying a target communications device with which a connection is to be established. Operation proceeds from step 1946 to step 1948. In step 1948 the first communications device determines if information on a path to the target communications device is known to the first communications device, wherein said path does not traverse a second gateway device used by the first communications device and the target communications device. In various embodiments, traverse includes passing through the node, e.g., the second gateway device may be the target in which case the path terminates at the second gateway device rather than passes through the second gateway device. Operation proceeds from step 1948 to step 1950.

In step 1950, if the determination is that information on a path to the target communications device is known to the first communications device, then operation proceeds from step 1950 to step 1952, in which the first communications device forwards the second connection establishment request toward the target communications device. However, in step 1950, if the determination is that information on a path to the target communications device is not known to the first communications device, then operation proceeds from step 1950 to step 1954 in which the first communications device forwards the second connection establishment request toward the second gateway device.

Operation proceeds from step 1952 or step 1954 to step 1956. In step 1956 the first communications device receives another connection establishment request including a device identifier identifying a communications device which the source of the another connection establishment request and another device identifier which identifies a target communications device with which a connection is to be established. Operation proceeds from step 1956 to step 1948.

Figures 20, 20A:
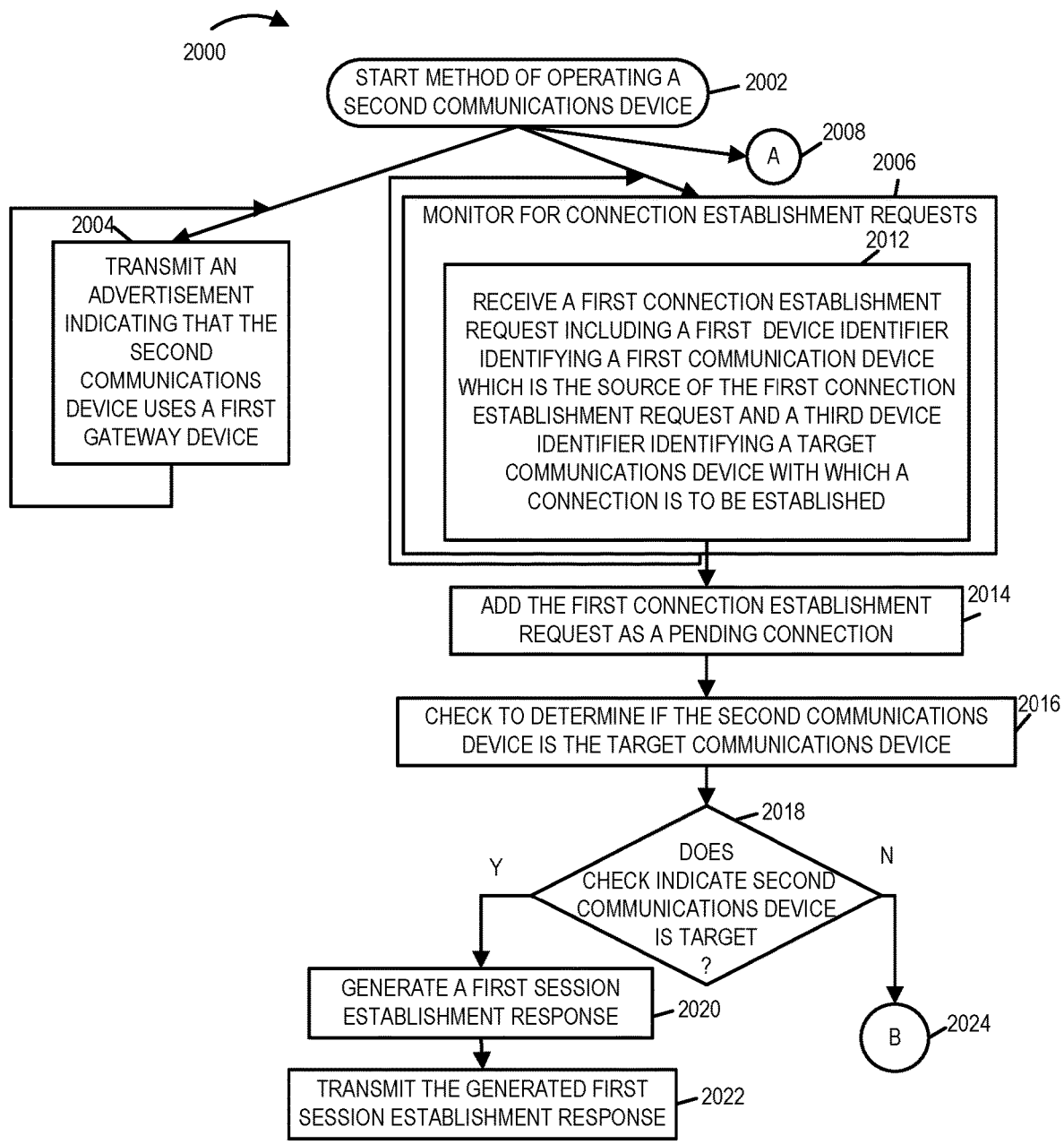
FIG. 20A is a first part of a flowchart of an exemplary method of operating a second communications device in accordance with an exemplary embodiment.
FIG. 20 comprises the combination of FIG. 20A, FIG. 20B and FIG. 20C.
Figure 20B:
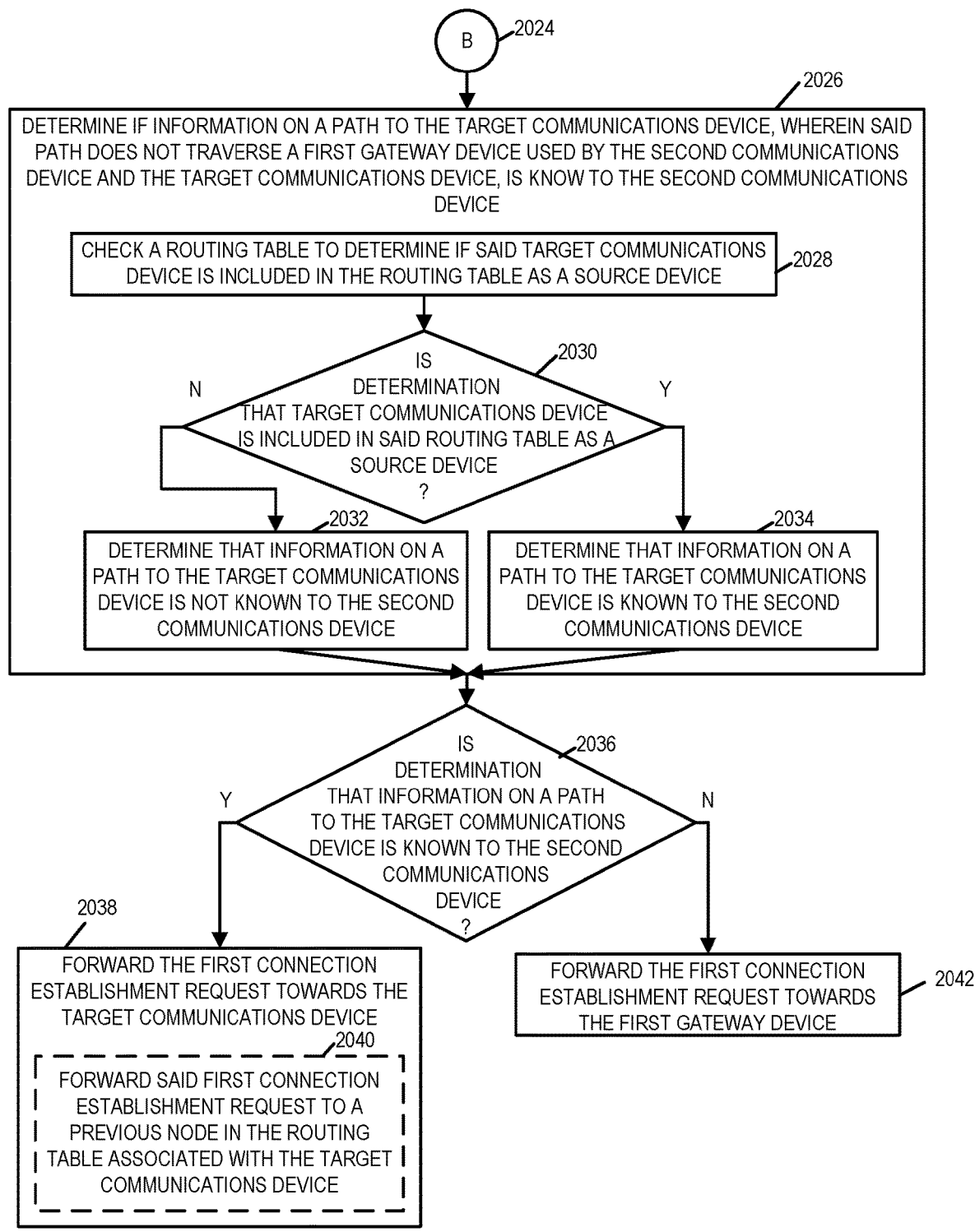
FIG. 20B is a second part of a flowchart of an exemplary method of operating a second communications device in accordance with an exemplary embodiment.
Figure 20C:
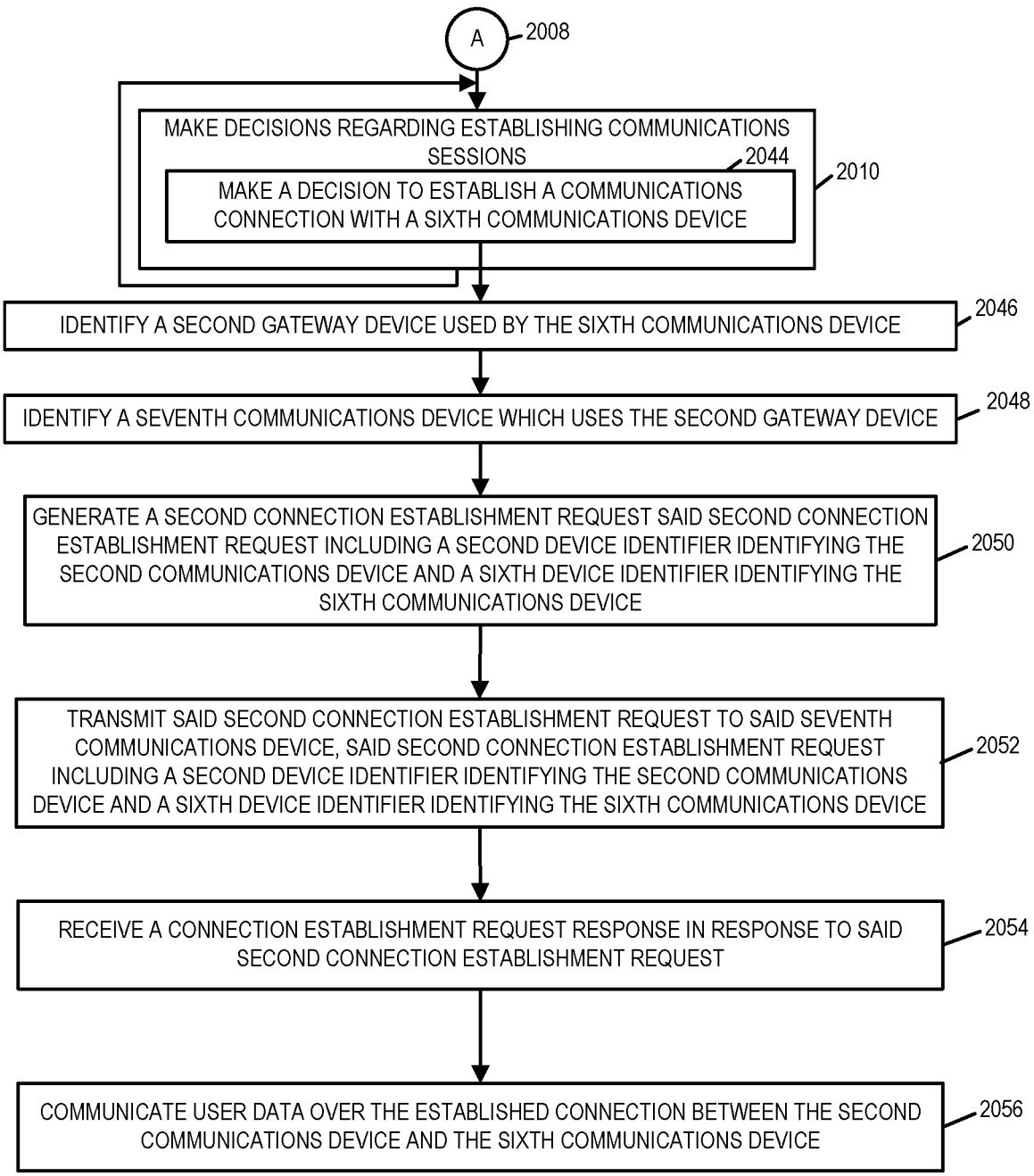
FIG. 20C is a third part of a flowchart of an exemplary method of operating a second communications device in accordance with an exemplary embodiment.

FIG. 20, comprising the combination of FIG. 20A, FIG. 20B and FIG. 20C, is a flowchart 2000 of an exemplary method of operating a second communications device in accordance with an exemplary embodiment. Operation starts in step 2002, in which the second communications device is powered on and initialized. Operation proceeds from start step 2002 to step 2004, to step 2006, and via connecting node A 2008 to step 2010.

In step 2004, which is performed, e.g., repetitively, on an ongoing basis, the second communications device transmits an advertisement indicating that the second communications device uses a first gateway device. In some embodiments, the said advertisement is associated with a segment of a network by including a gateway identifier, e.g., a first gateway device identifier which identifies the first gateway device.

In step 2006, which is performed, e.g., repetitively, on an ongoing basis, the second communications device monitors for connection establishment requests. Step 2006 may, and sometimes does include step 2012. In step 2012 the second communications device receives a first connection establishment request including a first device identifier identifying a first communications device which is the source of the first connection establishment request and a third device identifier identifying a target communications device with which a connection is to be established. In some embodiments, the first connection establishment request is made from a second application which is different from a first application, e.g., the first connection establishment request is made from a secondary purpose application which takes advantage of communications routes formed and/or organized for a first application, e.g., a primary application. Operation proceeds from step 2012 to step 2014.

In step 2014 the second communications device adds the first connection establishment request as a pending connection. In various embodiments, the pending connection includes a fourth device identifier identifying a fourth communications device, i.e., the transmitter of the received first connection establishment request, and a fifth device identifier identifying a fifth communications device, i.e., the receiver of the forwarded first connection establishment request. In some embodiments, the pending connection includes an application identifier identifying the application associated with said first connection establishment request, i.e., the secondary purpose application. Operation proceeds from step 2014 to step 2016.

In step 2016 the second communications device checks to determine if the second communications device is the target communications device. Operation proceeds from step 2016 to step 2018. In step 2018, if the check of step 2016 indicates that the second communications device is not the target, then operation proceeds from step 2016, via connecting node B 2024, to step 2026. However, if the check of step 2106 indicates that the second communications device is the target, then operation proceeds from step 2018 to step 2020 in which the second communications device generate a first session establishment response. Operation proceeds from step 2020 to step 2022 in which the second communications device transmits the generated first session establishment response, e.g., toward the device which sent the first connection establishment request.

Returning to step 2016, in step 2026 the second communications device determines if information on a path to the target communications device, wherein said path does not traverse a first gateway device used by the second communications device and the target communications device, is known to the second communications device. In various embodiments traverse involves passing through the node, i.e., the first gateway device may be the target in which cases the path terminates at the first gateway device rather than passes through the first gateway device.

In some embodiments, said path is part of a communications path between the target communications device and the first gateway device. For example, the target communications device has an ongoing session between the target communications device and the first gateway device which is reflected in the routing table of the intermediate nodes and this existing path information is used to set up session with the target using a portion of the path which does not traverse the first gateway device.

In some embodiments, the second communications device and the target communications device use said first gateway device for a first application, e.g., a SON application which resulted in connections being established with the first gateway device for purposes of first, e.g., primary application communications. In some such embodiments, the first communications device does not use said first gateway device for said first application. In some embodiments, the first application is to obtain connectivity to another network.

Step 2026 includes steps 2028, 2030, 2032 and 2034. In step 2028 the second communications device checks a routing table to determine if said target communications device is included in the routing table as a source device. In various embodiments, if it is determined that the target communications device is included in the routing table as a source device, that implies that the second communications can get to the target device without traversing the first gateway device. Operation proceeds from step 2028 to step 2030. In step 2030, if the determination of step 2030 is that the target communications device is included in said routing table as a source device, e.g., implying that the second communications device can get to the source without traversing the first gateway device, then operation proceeds from step 2030 to step 2034; otherwise operation proceeds from step 2030 to step 2032. In step 2034, the second communications device determines that information on a path to the target communications device is known to the second communications device. In step 2032, the second communications device determines that information on a path to the target communications device is not known to the second communications device.

Operation proceeds from step 2026 to step 2036. In step 2036, the second communications device controls operation as a function of the determination if information on a path to the target communications device is known to the second communications device. If the determination is that information on a path to the target communications device is known to the second communications device, then operation proceeds from step 2036 to step 2038; otherwise operation proceeds from step 2036 to step 2042. In step 2038 the second communications device forwards the first connection establishment request toward the target communications device. In various embodiments, step 2038 includes step 2040 in which the second communications device forwards said first connection establishment request to a previous node in the routing table associated with the target communications device.

Retuning to step 2042, in step 2042 the second communications device forwards the first connection establishment request towards the first gateway device.

Retuning to step 2010, in step 2010, which is performed, e.g., multiple times, on an ongoing basis, the second communications device makes decisions regarding establishing communications sessions. Step 2010 includes step 2044, in which the second communications device makes a decision to establish a communications connection, e.g., set up a path which an application can then use, with a sixth communications device. Operation proceeds from step 2044 to step 2046, in which the second communications device identifies a second gateway device used by the sixth communications device. Operation proceeds from step 2046 to step 2048.

In step 2048 the second communications device identifies a seventh communications device which uses the second gateway device. Operation proceeds from step 2048 to step 2050. In step 2050 the second communications device generates a second connection establishment request, said second connection establish request including a second device identifier identifying the second communications device, e.g., the source of the request, and a sixth device identifier identifying the sixth communications device, e.g., the target destination device. In various embodiments, the second connection establishment request further includes a gateway device identifier, e.g., a second gateway device identifier, which identifies the second gateway device and an application identifier identifying the application for the requested connection, corresponding to the second connection establishment request, is to be used. Operation proceeds from step 2050 to step 2052.

In step 2052 the second communications device transmits the generated second connection establishment request to said seventh communications device, said second connection establish request including a second device identifier identifying the second communications device and a sixth device identifier identifying the sixth communications device. In various embodiments, the second connection establishment request includes an identifier identifying the second gateway device. In various embodiments, the second connection establishment request includes an identifier identifying the application for which the session is to be established.

Operation proceeds from step 2052 to step 2054 in which the second communications device receives a connection establishment request response in response to the said second connection establishment request. Operation proceeds from step 2054 to step 2056 in which the second communication device communicates user data over the established connection between the second communications device and the sixth communications device.

Figure 21:
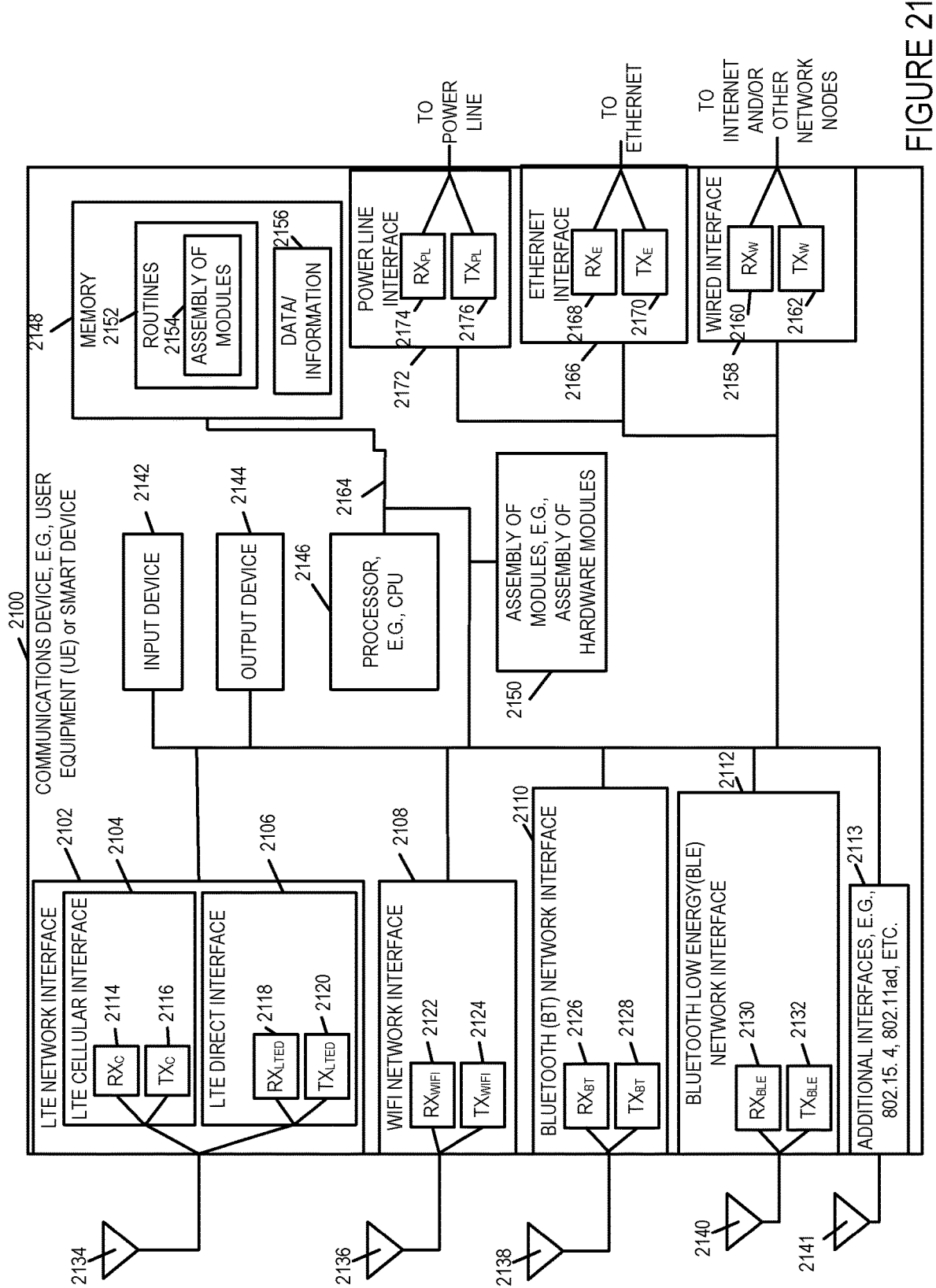
FIG. 21 is a drawing of an exemplary communications device, e.g., a user equipment device or a smart device, in accordance with various exemplary embodiments.

FIG. 21 is a drawing of an exemplary communications device 2100, e.g., a user equipment device or smart device, in accordance with various exemplary embodiments. Exemplary communications device 2100 is, e.g., a first communications device implementing the method of flowchart 1900 of FIG. 19. Exemplary communications device 2100 is, e.g., a second communications device implementing the method of flowchart 2000 of FIG. 20.

Exemplary communications device 2100 includes an LTE network interface 2102 including a LTE cellular interface 2104 and a LTE Direct (LTED) interface 2106, a WIFI network interface 2108, a Bluetooth (BT) network interface 2110, a Bluetooth low energy (BLE) network interface 2112, additional interfaces 2113, e.g., an 802.15.4 interface, an 802.11ad interface, and/or other WPAN interfaces, etc., a wired interface 2158, a Ethernet interface 2166, a Power Line interface 2172, an input device 2142, an output device 2144, a processor 2146, e.g., a CPU, a memory 2148, and an assembly of modules 2150, e.g., an assembly of hardware modules, e.g., circuits, coupled together via a bus 2164 over which the various elements may interchange data and information. LTE cellular interface 2104 includes a cellular receiver ($RX_C$) 2114 and a cellular transmitter ($TX_C$) 2116 coupled to antenna 2134, via which device 2100 may receive and transmit cellular wireless signals, respectively. LTE direct interface 2106 includes a LTE direct receiver ($RX_{LTED}$) 2118 and a LTE direct transmitter ($TX_{LTED}$) 2120 coupled to antenna 2134, via which device 2100 may receive and transmit LTE direct wireless signals, respectively. LTE direct wireless signals include LTED beacons, e.g., an LTED beacon communicating a first device identifier corresponding to first communication device and a gateway identifier corresponding to a gateway used by the first communications device.

WIFI interface 2108 includes a WIFI receiver ($RX_{WIFI}$) 2122 and a WIFI transmitter ($TX_{WIFI}$) 2124 coupled to antenna 2136, via which device 2100 may receive and transmit WIFI wireless signals, respectively. WIFI wireless signals include WIFI beacons, e.g., a WIFI beacon communicating a third device identifier corresponding to a third communications device and a gateway identifier corresponding to a gateway used by the third communications device, and WIFI D2D data signals, e.g., a connection establishment request signal, a connection establishment request response signal, a signal communicating user data corresponding to a second application.

BT interface 2110 includes a BT receiver ($RX_{BT}$) 2126 and a BT transmitter ($TX_{BT}$) 2128 coupled to antenna 2138, via which device 2100 may receive and transmit BT wireless signals, respectively. BT wireless signals include BT beacons, e.g., a BT beacon communicating a third device identifier identifying a third device and a gateway identifier identifying a gateway used by the third device, and BT D2D data signals including, e.g., a connection establishment request signal, a connection establishment request response signal, a signal communicating user data corresponding to a second application. BLE interface 2112 includes a BLE receiver ($RX_{BLE}$) 2130 and a BLE transmitter ($TX_{BLE}$) 2132 coupled to antenna 2140, via which device 2100 may receive and transmit BLE wireless signals, respectively. BLE wireless signals include BLE beacons, e.g., a BLE beacon communicating a BT beacon communicating a third device identifier identifying a third device and a gateway identifier identifying a gateway used by the third device, and BT D2D data signals including, e.g., a connection establishment request signal, a connection establishment request response signal, a signal communicating user data corresponding to a second application. Additional interfaces 2113 includes one or more receivers and one or more transmitters and is coupled to antenna 2141, via which device 2100 may receive and transmit wireless signals including beacon signals. In some embodiments, a different number of antenna are used and/or a different antenna configuration is used, e.g., a different antenna for receive and transmit, multiple antennas for receive and multiple antennas for transmit, the same antenna or same set of antennas for different interfaces, etc.

Wired interface 2158 includes a receiver $RX_W$ 2160 and a transmitter $TX_W$ 2162, via which device 2100 may receive and transmit signals over the Internet and/or to other network nodes, e.g., via a wired and/or fiber optic backhaul link or links.

Ethernet interface 2166 includes a receiver $RX_E$ 2168 and a transmitter $TX_E$ 2170, via which device 2100 may receive and transmit signals over an Ethernet. Power line interface 2172 includes a receiver $RX_{PL}$ 2174 and a transmitter $TX_{PL}$ 2176, via which device 2100 may receive and transmit signals over a power line.

Input device 2142 includes, e.g., touch screen interface, keypad, keyboard, microphone, camera, switches, monitoring sensors, etc., via which a user of device 2100 may input information and/or device 2100 may autonomously or semi autonomously collect data.

Output device 2144 includes, e.g., a display, a speaker, etc., for outputting data/information to a user of device 2100. Memory 2148 includes routines 2152 and data/information 2156. Routines 2152 includes an assembly of modules 2154, e.g., an assembly of software modules. Data/information 2156 includes received discovery information, e.g., information identifying a communications device and the gateway which it uses, routing tables, a one-hop device/gateway table, generated messages, e.g., a generated connection establishment request, a received message, e.g., a received connection establishment request response message, a received connection establishment request message to be routed to another device, device selection criteria, e.g., best neighbor criteria, etc.

Figure 22:
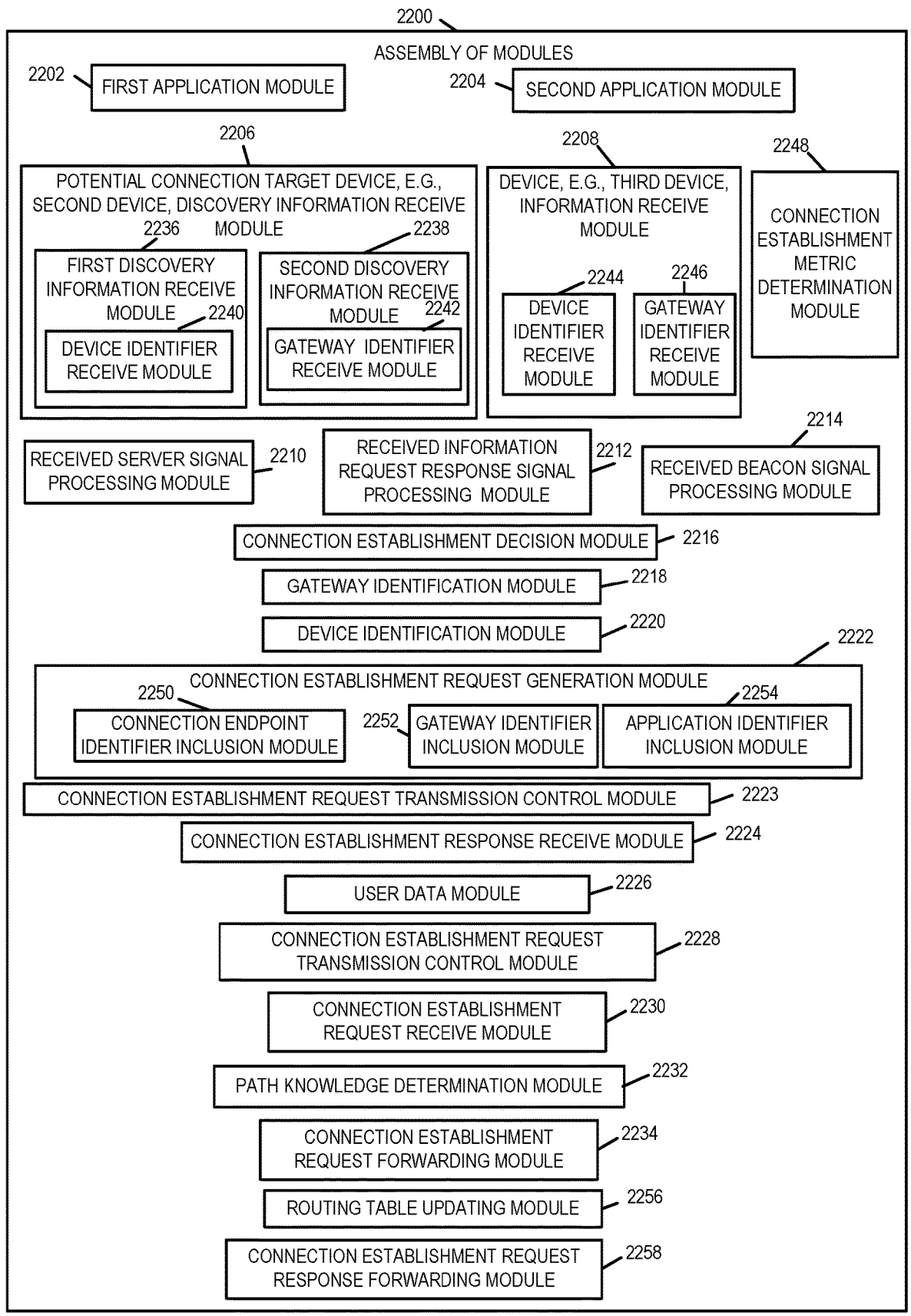
FIG. 22 is a drawing of an assembly of modules, which may be included in an exemplary communications device, e.g., a communications device of FIG. 21 implementing a method in accordance with FIG. 19, in accordance with an exemplary embodiment.

FIG. 22 is a drawing of an assembly of modules 2200, which may be included in an exemplary communications device, e.g., communications device 2100 of FIG. 21, in accordance with an exemplary embodiment. Assembly of modules 2200 can be, and in some embodiments is, used in the communications device 2100. The modules in the assembly of modules 2200 can, and in some embodiments are, implemented fully in hardware within the processor 2146, e.g., as individual circuits. The modules in the assembly of modules 2200 can, and in some embodiments are, implemented fully in hardware within the assembly of modules 2150, e.g., as individual circuits corresponding to the different modules. In other embodiments some of the modules are implemented, e.g., as circuits, within the processor 2146 with other modules being implemented, e.g., as circuits within assembly of modules 2150, external to and coupled to the processor 2146. As should be appreciated the level of integration of modules in the processor and/or with some modules being external to the processor may be one of design choice.

Alternatively, rather than being implemented as circuits, all or some of the modules may be implemented in software and stored in the memory 2148 of the communications device 2100, with the modules controlling operation of communications device 2100 to implement the functions corresponding to the modules when the modules are executed by a processor, e.g., processor 2146. In some such embodiments, the assembly of modules 2200 is included in the memory 2148 as assembly of modules 2154. In still other embodiments, various modules in assembly of modules 2200 are implemented as a combination of hardware and software, e.g., with another circuit external to the processor providing input to the processor 2146 which then under software control operates to perform a portion of a module's function. While shown in the FIG. 21 embodiment as a single processor, e.g., computer, it should be appreciated that the processor 2146 may be implemented as one or more processors, e.g., computers.

When implemented in software the modules include code, which when executed by the processor 2146, configure the processor 2146 to implement the function corresponding to the module. In embodiments where the assembly of modules 2200 is stored in the memory 2148, the memory 2148 is a computer program product comprising a computer readable medium comprising code, e.g., individual code for each module, for causing at least one computer, e.g., processor 2146, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 22 control and/or configure the communications device 2100 or elements therein such as the processor 2146, to perform the functions of corresponding steps illustrated in the method of one or more of the signaling drawings of FIG. 1, 2, 3, 4A, 4B, 4C, 6, 7, 8, 18 and/or one or more of the flowcharts of FIGS. 5, 16, 17, 19 and 20, and/or described with respect to any of the Figures. Thus the assembly of modules 2200 includes various modules that perform functions of corresponding steps of one or more of FIGS. 5, 16, 17, 19 and/or 20.

Assembly of modules 2200 includes a first application module 2202, a second application module 2204, a potential connection target device discovery information receive module 2206, a device information receive module 2208, a received server signal processing module 2210, a received information request response signal processing module 2212, and a received beacon signal processing module 2214. Potential connection target device discovery information received module 2206 includes a first discovery information receive module 2236 and a second discovery information receive module 2238. First discovery information receive module 2236 includes a device identifier receive module 2240. Second discovery information receive module 2238 includes a gateway identifier receive module 2242. Device information receive module 2208 includes a device identifier receive module 2244 and a gateway identifier receive module 2246.

First application module 2202 is, e.g., a SON application module. Second application module 2204 is, e.g., one of a public safety application, a smart home network application, or a social network application.

Potential connection target device, e.g., second communications device, discovery information receive module 2206 is configured to receive discovery information corresponding to potential destination devices, e.g., target devices, for which the first communications device, a source device, including assembly of modules 2200, may decide to send a connection establishment request, e.g., for a second application. In some embodiments, the discovery information received by module 2206 may be received via one or more broadcast or multicast signals, e.g., beacon signals. In one example, the beacon signal(s) are LTED beacon signal (s), e.g., received via LTED receiver $RX_{LTED}$ 2120. For example and exemplary beacon LTED beacon signal from a second communications device includes a device identifier identifying the second communications device and a gateway identifier identifying a gateway used by the second communications device. In some embodiments, the LTED beacon signal may further include information indicating that the second device uses the second application. In some embodiments, the first communications device may already have knowledge that the second communications device uses the second application, e.g., the first and second communications devices may be members of a social network group.

In some embodiments, module 2206 receives discovery information from server signals, e.g., from pushes from a server. For example, with regard to a second application, a server may push out information indicating device/gateway information corresponding to a plurality of communications devices which use the second application, e.g., a second device identifier of a second communications device and a gateway identifier corresponding to a gateway used by the second communications device.

In some embodiments, module 2206 receives discovery information in response to a request for information. For example, with regard to a second application, a first communications device may send out a request for discovery information about devices which use a second application or about a particular device which uses a second application, and the information, e.g., a communications device identifier and corresponding gateway identifier, received by module 2206 may be in response to the request.

First discovery information receive module 2236 is configured to receive first discovery information for the second communications device, said first discovery information including the second device identifier. In various embodiments, the first discovery information for the second communications device is received in one of: i) a signal from a server, e.g. a push signal from a server, ii) a response to a request for information, e.g. from a database lookup, or iii) a broadcast or multicast signal, e.g., a beacon signal such as, e.g. LTED beacon signal. Device identifier receive module 2240 is configured to receive a device identifier, e.g., a second device identifier identifying a second communications device. The second communications device may be a target device regarding connection establishment for a second application.

Second discovery information receive module 2238 is configured to receive second discovery information for the second communications device, said second discovery information including a first gateway identifier which identifies said first gateway device. Gateway identifier receive module 2242 is configured to receive a gateway identifier identifying a gateway used, e.g., a gateway used by the second communications device.

In some embodiments first discovery information and second discovery information are part of multiple beacons, multiple pushes, and or multiple responses. For example, in one embodiment first discovery information is communicated in a first LTED beacon and second discovery information is communicated in a second LTED beacon, wherein said first and second LTED beacons are transmitted at different times by the second communications device. In another example, first discovery information is communicated via a LTED beacon transmitted by the second communications device and second discovery information is communicated from a server or database, e.g., in response to a request from the first communications device.

In some embodiments first discovery information and second discovery information are part of one beacon, and or response. In some embodiments, first discovery information and second discovery information are received in the same message.

Device information receive module 2208 is configured to receive discovery information corresponding to one or more communications devices. In various embodiments, device information receive module 2208 is configured to receive information about the first gateway device, used by the third communications device, from a broadcast or multicast signal, e.g., a beacon signal, transmitted by the third communications device. For example, the third communications device advertises the gateway device which it uses. In some embodiments, the broadcast or multicast signal, e.g. a beacon signal, is associated with a segment of a network by including a gateway identifier of a gateway, e.g., the first gateway device, which is included in the network segment, in said broadcast or multicast signal.

In some embodiments, the discovery information received by module 2208 is received in one or more beacons, e.g., WiFi beacons via WIFI receiver $RX_{WIFI}$ 2122. Device identifier receive module 2244 is configured to receive a device identifier, e.g., a device identifier of a third communications device. Gateway identifier receive module 2246 is configured to receive a gateway identifier, e.g., a gateway identifier identifying a gateway device used by the third communications device.

Received server signal processing module 2210 is configured to recover discovery information from a received signal communicated from a server, e.g., from a received push of discovery information from a server. For example, in some embodiments, information associating communications devices with applications, e.g., a second application, and/or information associating a communications devices with a gateway is stored in a server and pushed out to communications devices, e.g., in accordance with a schedule and/or in response to a communications device entering a network or changing device status, e.g., to active from sleep.

Received information request response signal processing module 2212 is configured to recover discovery information from a received response signal from a database in response to a request from the first communications device. Received beacon signal processing module 2214 is configured to recover discovery information from a received beacon signal, e.g., in accordance with coding and/or formatting used by the beacon signal and protocol via which the beacon was transmitted.

Assembly of modules 2200 further includes a connection establishment metric determination module 2248, a connection establishment decision module 2216, a gateway identification module 2218, a device identification module 2220, a connection establishment request generation module 2222, and a connection establishment request transmission control module 2223. Connection establishment request generation module 2222 includes a connection endpoint identifier inclusion module 2250, a gateway identifier inclusion module 2252, and an application identifier inclusion module 2254. Assembly of modules 2200 further includes a connection establishment response receive module 2224, a user data module 2226, a connection establishment request receive module 2230, a path knowledge determination module 2232, a connection establishment request forwarding module 2234, a routing table updating module 2256, an a connection establish request response forwarding module 2258.

Connection establishment metric determination module 2248 is configured determine connection establishment metrics corresponding to signals received by module 2208 from different communications devices, e.g., based on received signal strength, received signal quality, etc. For example, there may be a plurality of possible alternative devices in the local vicinity of the first communications device, e.g., each using the same gateway, to which a connection establishment request may be wireless transmitted, and the connection establishment metric information is used to select the best one, e.g., the third communications device. The third communications device may serve as an intermediary for forwarding the connection establishment request.

Connection establishment decision module 2216 is configured to make a decision to establish a communications connection with a second communications device. Thus connection establishment decision module 2216 is configured to decide set up a path between the first communications device and the second communications device which an application, e.g., a second application, can use. The first communications device may have identified that the second device, which uses the second application, is in the vicinity based on received first discovery information, e.g., advertised via a LTED beacon or beacons, and may decide to attempt to establish a connection with the second communications device.

In some embodiments, the communications connection uses a wireless interface. In some other embodiments, the communications connection uses an Ethernet interface. In still other embodiments, the communications connection uses a power line interface.

Gateway identification module 2218 is configured to identify a first gateway used by the second communications device, e.g., via received second discovery information. In various embodiments, the first gateway identifier is used by said gateway identification module 2218 to identify said first gateway device, e.g. from among a plurality of possible gateways. In various embodiments different gateways are used in different segments of a network. In various embodiments, the first gateway device is a device which serves as a gateway between one or more peer to peer devices and an infrastructure network node.

Device identification module 2220 is configured to identify a third communications device which uses the first gateway device. Thus device identification module 2220 identifies a third communications device, e.g., in its immediate vicinity, which uses the same first gateway device as the second communications device which is the intended destination target of the connection establishment decision. In one embodiment, in its immediate vicinity is within one-hop WiFi device to device range. In various embodiments, device identification module 2220 identifies the third communications device as one of the devices, detected by device information receive module 2208 and which uses the same gateway, which is the identified first gateway, as the second communications device, the intended session destination target, and which has the best connection establishment metric among the potential candidates as determined by module 2248.

Connection establishment request generation module 2222 is configured to generate connection establishment requests including a first connection establishment request, said first connection establishment including a first device identifier identifying the first communications device, e.g., a source device identifier, and a second device identifier identifying the second communications device, e.g., a destination (target) device identifier. Connection establishment request generation module 2222 is further configured to include a gateway identifier identifying the gateway used by the second communications device, and an application identifier, e.g., identifying a second application, in the first connection establishment request. Connection endpoint identifier inclusion module 2250 is configured to include, in the first connection establishment request message, a device identifier identifying the first communications device as the source device and an identifier identifying second communication device as the destination device. Gateway identifier inclusion module 2252 is configured to include, in the first connection establishment request message, a gateway identifier identifying the first gateway device as the gateway device used by the second communications device. Application identifier inclusion module 2254 is configured to include, in the first connection establishment request message, an application identifier identifying an application, e.g., the second application as the application for the connection which is being requested to be established. In various embodiments, the first connection establishment request is a device to device request.

Connection establishment request transmission control module 2223 is configured to control a first transmitter module of the first communications device to transmit the first connection establishment request to said third communications device, said first connection establishment request including a first device identifier identifying the first communications device and a second device identifier identifying the second communications device. The first transmitter module is a transmitter module of the first communications device supporting device to device signaling, sometimes referred to as peer to peer signaling. In one exemplary embodiment, the first transmitter module is the WiFi transmitter $TX_{WIFI}$ 2124, which is configured to transmit the first connection establishment request to said third communications device, said first connection establishment request including a first device identifier identifying the first communications device and a second device identifier identifying the second communications device. In various embodiments, the first connection establishment request further includes a first gateway identifier identifying the first gateway device. In various embodiments, the first connection establishment request further includes an application identifier identifying the second application, e.g., identifying the application for which the session is being established.

In various embodiments, the first discovery information and the second discovery information are communicated using a first communications protocol, e.g., a LTED protocol or a long range whitespace radio protocol, which is different from a second communication protocol, e.g., a WiFi protocol, used to communicate said first connection establishment request. In some such embodiments, the first receiver module, e.g., $RX_{LTED}$ 2118, is configured to receive wireless signals, e.g., LTED signals, using a first communications protocol, and a second receiver module, e.g., $RX_{WIFI}$ 2122, is configured to receive wireless signals, e.g., WiFi signals, using the second communications protocol. In some embodiments, the first communications protocol has a longer discovery range than the second communications protocol. In some embodiments, the discovery information from the third communications device, is communicated using the second communications protocol, e.g., via a multicast or broadcast signal.

In some embodiments, the first discovery information is communicated using a first frequency band which is different from a second frequency band used to communicate the first connection establishment request. In some such embodiments, the first and second discovery information is communicated in the first communications band.

In some embodiments, the third communications device uses the first gateway device for a first application, e.g., a primary application such as a SON application which resulted in session connections being established with the first gateway device for purposes of primary application communication, and the decision to establish a communications session is performed by a second application, e.g., a secondary purpose application which takes advantage of communications routes formed and/or organized for the primary application, which is different from the first application. In some embodiments, second application module 2204 includes connection establishment decision module 2216.

Connection establishment response receive module 2224 is configured to receive a connection establishment response message which is in response to the first connection establishment request, e.g., a message sourced from the second communication device indicating that the second communication agrees to the connection request. User data module 2226 is configured to communicate user data corresponding to the second application over the established connection between the first communications device and the second communications device.

Connection establishment request receive module 2228 is configured to receive a second connection establishment request including a fourth device identifier identifying a fourth communications device which is the source of the second connection establishment request and a fifth device identifier identifying a target communications device with which a connection is to be established. Path knowledge determination module 2232 is configured to determine if information on a path to the target communications device, wherein the path does not traverse a second gateway device used by the first communications device and the target communications device, is known to the first communications device. Path knowledge determination module 2232 consults its stored routing table or tables to make the determination.

Connection establishment request forwarding module 2234 is configured to forward the second connection establishment request towards the target communications device when the information on the path to the target communications device is determined to be known to the first communications device. Connection establishment request forwarding module 2234 is configured to forward the second connection establishment request towards the second gateway device when the information on the path to the target communications device is determined to not be known to the first communications device.

Figure 23:
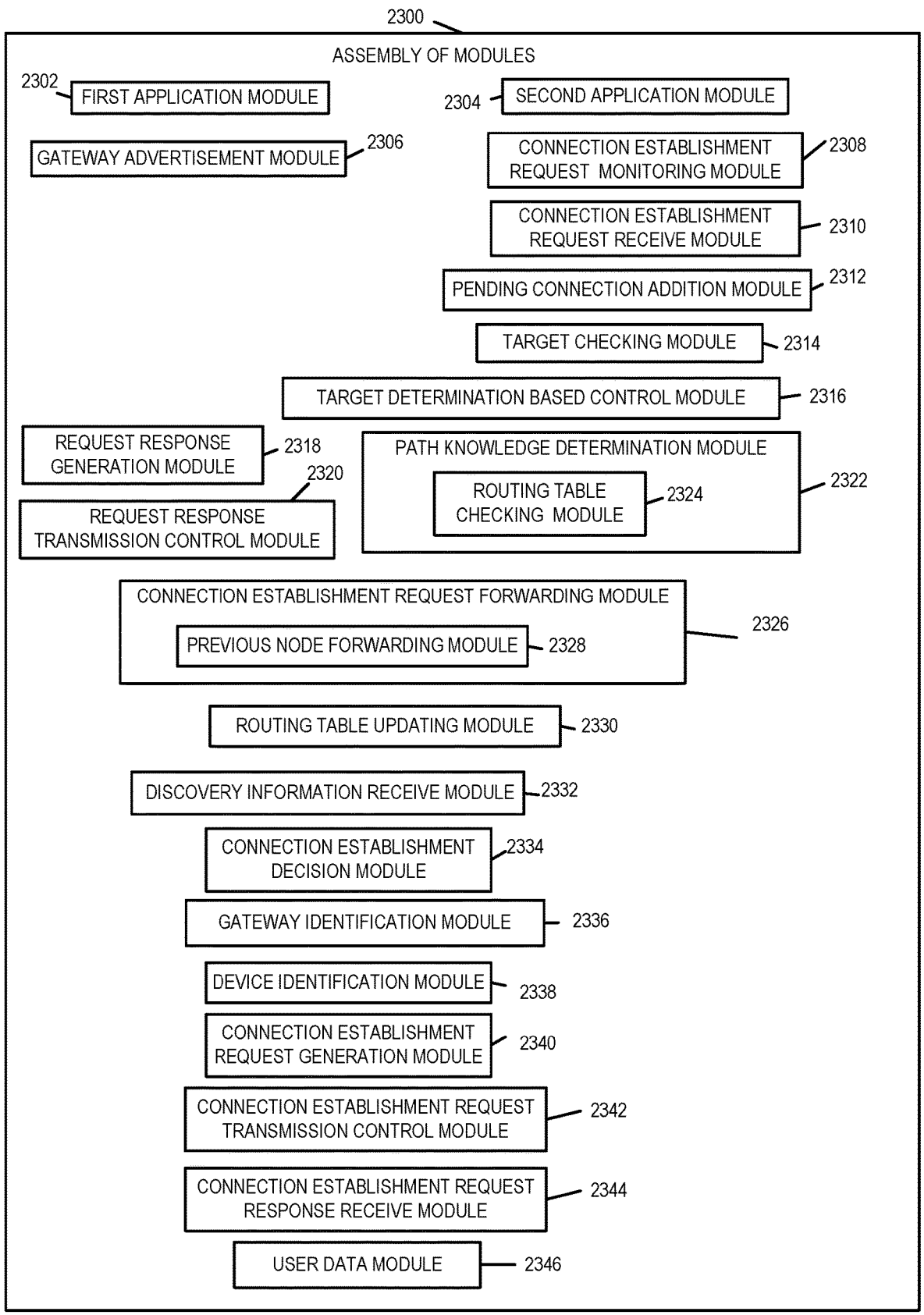
FIG. 23 is a drawing of an assembly of modules, which may be included in an exemplary communications device, e.g., a communications device of FIG. 21 implementing a method in accordance with FIG. 20, in accordance with an exemplary embodiment.

FIG. 23 is a drawing of an assembly of modules 2300, which may be included in an exemplary communications device, e.g., communications device 2100 of FIG. 21, in accordance with an exemplary embodiment. Assembly of modules 2300 can be, and in some embodiments is, used in the communications device 2100. The modules in the assembly of modules 2300 can, and in some embodiments are, implemented fully in hardware within the processor 2146, e.g., as individual circuits. The modules in the assembly of modules 2300 can, and in some embodiments are, implemented fully in hardware within the assembly of modules 2150, e.g., as individual circuits corresponding to the different modules. In other embodiments some of the modules are implemented, e.g., as circuits, within the processor 2146 with other modules being implemented, e.g., as circuits within assembly of modules 2150, external to and coupled to the processor 2146. As should be appreciated the level of integration of modules in the processor and/or with some modules being external to the processor may be one of design choice. Alternatively, rather than being implemented as circuits, all or some of the modules may be implemented in software and stored in the memory 2148 of the communications device 2100, with the modules controlling operation of communications device 2100 to implement the functions corresponding to the modules when the modules are executed by a processor, e.g., processor 2146. In some such embodiments, the assembly of modules 2300 is included in the memory 2148 as assembly of modules 2154. In still other embodiments, various modules in assembly of modules 2300 are implemented as a combination of hardware and software, e.g., with another circuit external to the processor providing input to the processor 2146 which then under software control operates to perform a portion of a module's function. While shown in the FIG. 21 embodiment as a single processor, e.g., computer, it should be appreciated that the processor 2146 may be implemented as one or more processors, e.g., computers.

When implemented in software the modules include code, which when executed by the processor 2146, configure the processor 2146 to implement the function corresponding to the module. In embodiments where the assembly of modules 2300 is stored in the memory 2148, the memory 2148 is a computer program product comprising a computer readable medium comprising code, e.g., individual code for each module, for causing at least one computer, e.g., processor 2146, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 23 control and/or configure the communications device 2100 or elements therein such as the processor 2146, to perform the functions of corresponding steps illustrated in the method of one or more of the signaling drawings of FIGS. 1, 2, 3, 4A, 4B, 4C, 6, 7, 8, and 18 and/or one or more of the flowcharts of FIGS. 5, 16, 17, 19 and 20, and/or described with respect to any of the Figures. Thus the assembly of modules 2300 includes various modules that perform functions of corresponding steps of one or more of FIGS. 5, 16, 17, 19 and/or 20.

Assembly of module 2300 includes a first application module 2302, a second application module 2304, a gateway advertisement module 2306, a connection establishment request monitoring module 2308, a connection establishment request receive module 2310, a pending connection addition module 2312, a target checking module 2314, a target determination based control module 2316, a request response generation module 2318, a request response transmission control module 2320, a path knowledge determination module 2322, and a connection establishment request forwarding module 2326. Path knowledge determination module 2322 includes a routing table checking module 2324. Connection establishment request forwarding module 2326 includes a previous node forwarding module.

First application module 2302 is, e.g., a SON application module. Second application module 2304 is, e.g., one of a public safety application, a smart home network application, or a social network application. Gateway advertisement module 2306 is configured to control the second communications device to transmit an advertisement advertising that the second communications device uses the first gateway device. In some embodiments, the advertisement is via a beacon signal, e.g., a WiFi beacon signal communicating an identifier identifying the first gateway device and an identifier identifying the second communications device which is transmitting the beacon signal. In various embodiments, the advertisement is associated with a segment of a network by including a gateway identifier, e.g., the first gateway device's identifier.

Connection establishment request monitoring module 2308 is configured to monitor for connection establish request from other communications devices. Connection establishment request receive module 2310 is configured to receive connection establishment request from other devices. Connection establishment request receive module 2310 is configured to receive a first connection establishment request, said first connection establishment request including a first device identifier identifying a first communications device which is the source of the first connection establishment request and a third device identifier identifying a target communications device with which a connection is to be established.

Pending connection addition module 2312 is configured to add, e.g., to a list of pending connection, said first connection establishment request as a pending connection after receiving said first connection establishment request. In some embodiments, said pending connection includes a fourth device identifier identifying a fourth communications device, i.e., the transmitter of the received first connection establishment request. In various embodiments, the pending connection In some embodiments, the pending connection may, and sometimes does, include a fifth device identifier identifying a fifth communications device, i.e., the receiver of the forwarded first connection establishment request, e.g., after the second communications device decides to forward the received first connection establishment request to the fifth communications device.

Target checking module 2314 is configured to configured to check to determine if the second communications device is the target communications device, e.g., of the received first connection establishment request. Target determination based control module 2316 is configured to control operation as a function of the determination as to whether or not the second communications device is the target of the received connection establishment request, e.g., first received connection establishment request.

Request response generation module 2318 is configured to generate a connection establishment request response in response, e.g., in response to the received first connection establishment request, when it is determined that the second communications device is the target device. In various embodiments, the connection establishment request response indicates that the second communications device agrees to establishing the requested connection. Request response transmission control module 2320 controls a transmitter, e.g., a WiFi transmitter, to transmit the generated connection establishment request response, e.g., to the fourth communication device to be forwarded to the first communications device.

Path knowledge determination module 2322 is configured to determine if information on a path to the target communications device, wherein said path does not traverse a first gateway device used by the second communications device and the target communications device, is known to the second communications device. \

Routing table checking module 2324 is configured to check a routing table, e.g., in the second communications device, to determine if said target communications device is included in the routing table as a source device. If the routing table checking module 2324 determines that the target device is included in the routing table as a source device, this implies that the second device can get to the to target device without traversing the first gateway device.

Connection establishment request forwarding module 2326 is configured to forward said first connection establishment request towards the target communications device when information on the path to the target communications device is determined to be known to the second communications device. Connection establishment request forwarding module 2326 is further configured to forward said first connection establishment request towards said first gateway device when information on the path to the target communications device is determined to be not known to the second communications device. Previous node forwarding module 2328 is configured to forward said first connection establishment request to a previous node in said routing table associated with said target communications device when said routing table checking module 2324 determines that the target communications device is included in the routing table as a source device.

In various embodiments, said path is part of a communications path between the target communications device and the first gateway device. For example, the target communications device has an ongoing session between the target communications device has an ongoing session between the target communications device and the first gateway device which is reflected in the routing tables of the intermediate nodes and this existing path information is used to set up a session with a target using a portion of the path which does not traverse the first gateway device.

In various embodiments, the second communication device and the target communications device use the first gateway device for a first application, e.g., a SON application which resulted in connections being established with the first gateway device for purposes of the primary application communication. In some such embodiments, the first communications device does not use said first gateway device for said first application. In some embodiments, the first application is used to obtain connectivity to another network.

In some embodiments, the first connection establishment request is made from a second application, e.g., a secondary purpose application which takes advantage of communications routes which were formed and/or organized for the primary application, and the second application is different from the first application.

Routing table updating module 2330 is configured to update routing tables, e.g., adding new entries and updating entries, e.g., based on: received information in connection establishment request, information derived from signals communicating a connection establishment request, received information in connection establishment request responses, information derived from signals communicating a connection establishment request response, and connection establishment request forwarding module decisions.

Assembly of modules 2300 further includes a discovery information receive module 2332, a connection establishment decision module 2334, a gateway identification module 2336, a device identification module 2338, a connection establishment request generation module 2340, a connection establishment request transmission control module 2342, a connection establishment request response receive module 2344 and a user data module 2346. Discovery information receive module 2332 is configured to receive discovery information from other communications devices or about other communications devices, e.g., a sixth communications device, with which the second communications device may want to establish a connection, e.g., for a second application. In some embodiments, discovery information receive module 2332 received information, e.g., a device identifier identifying the sixth communications device and a gateway identifier, e.g., identifying a second gateway device used by the sixth communications device, via a beacon, e.g., a LTED beacon, a push from a server, or from a database in response to a request.

Connection establishment decision module 2334 is configured to make decisions regarding establishing connections with other communications devices, e.g., for a second application. Connection establishment decision module 2334 is configured to make a decision to establish a communications connection, e.g., set up a path which an application can use, with a sixth communications device.

Gateway identification module 2336 is configured to identify a gateway device used by a communications device. Gateway identification module 2336 is configured to identify a second gateway device used by the sixth communications device.

Device identification module 2338 is configured to identify a communications device which uses the same gateway device as a communication device with which the second communications device seeks to establish a connection. Device identification module 2338 is configured to identify a seventh communication device which uses the said second gateway device. In various embodiments device identification module 2338 uses received gateway advertisement information which was recovered from a received signal, e.g., a received WiFi beacon signal, transmitted by the seventh communications device.

Connection establishment request generation module 2342 is configured to generate a connection establishment request, e.g., a second connection establishment request, said second connection establishment request including a second device identifier identifying the second communications device, e.g., the source device, a sixth device identifier identifying the sixth communications device, e.g., the target device, a second gateway identifier identifying the second gateway device, and an application identifier identifying the second application.

Connection establishment request transmission control module 2342 is configured to control a transmitter, e.g., a WiFi transmitter of the second communications device, to transmit a generated connection establishment request, e.g., a second connection establishment request, said second connection establishment request including a second device identifier identifying the second communications device, e.g., the source device, a sixth device identifier identifying the sixth communications device, e.g., the target device, a second gateway identifier identifying the second gateway device, and an application identifier identifying the second application.

Connection establishment request response receive module 2344 is configured to receive a connection establishment request response, e.g. in response to a previously transmitted second connection establishment request signal. User data module 2346 is configured to communications user data, e.g., pertaining to a second application, over the established connection, e.g., between the second communications device and the sixth communications device, corresponding to the requested and granted second connection establishment request.

Figure 25:
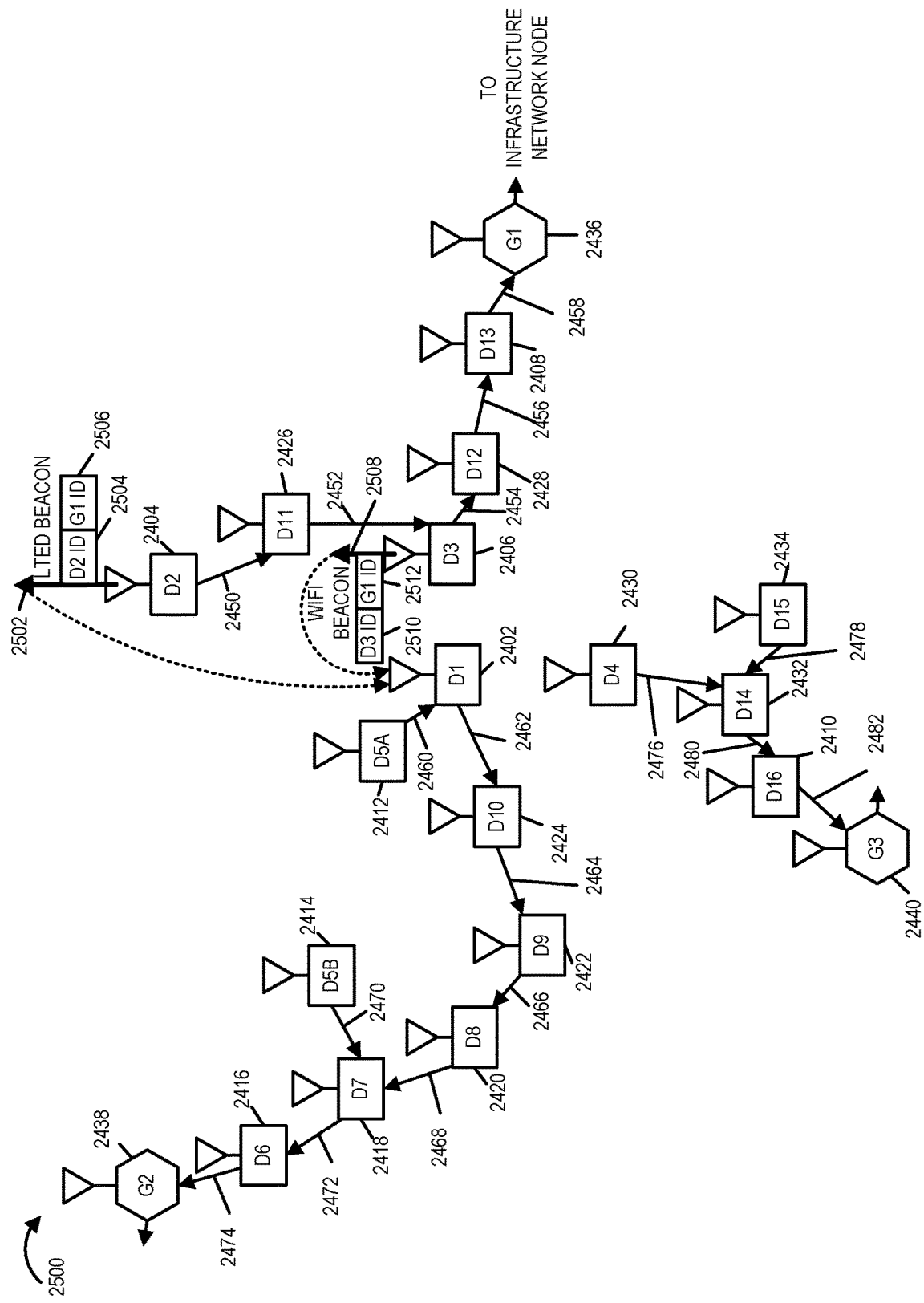
FIG. 25 illustrates exemplary different communication protocol beacon signaling used, in some embodiments, to communicate discovery information including information identifying a gateway used by a communications device.
Figure 26:
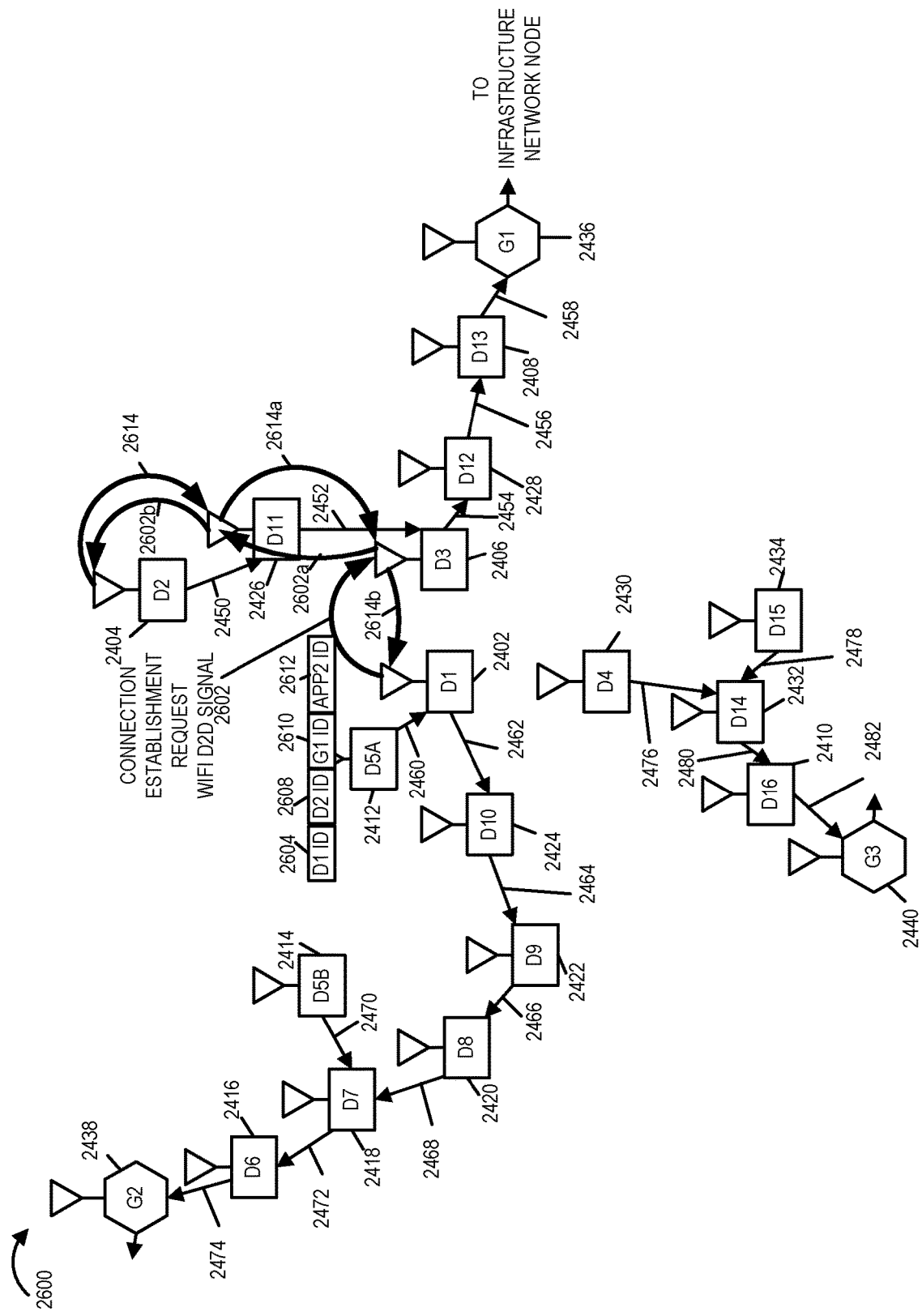
FIG. 26 illustrates communication of a connection establishment request requesting to establish a connection for a second application between two communications devices which use different gateways for a first application, the routing of the connection establishment request being based on routing table information corresponding to the first application.
Figure 27:
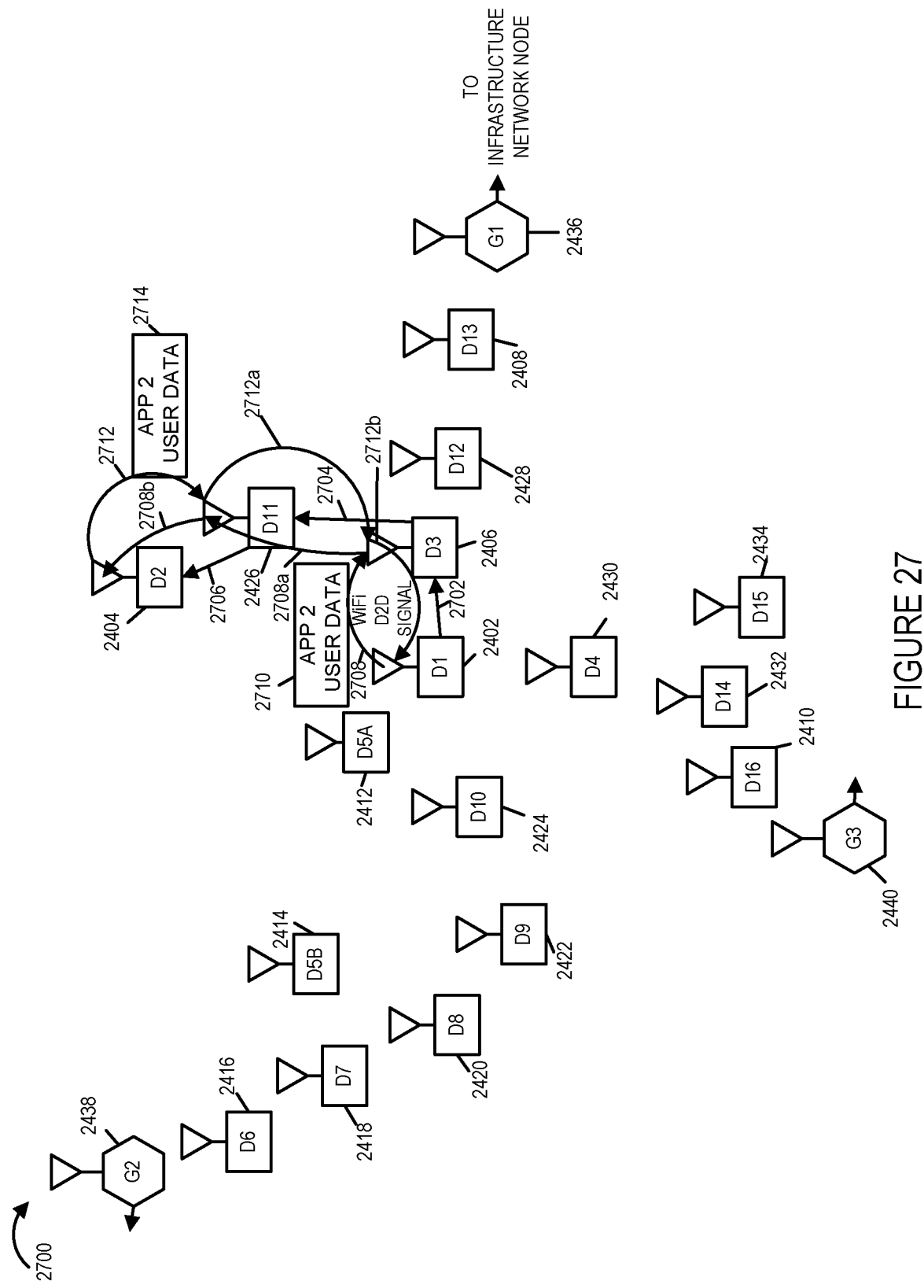
FIG. 27 illustrates that a connection has been established between a first communications device and a second communications device for the second application, identifies a routing path, and illustrates exemplary signaling communicating second application user data.
Figure 28:
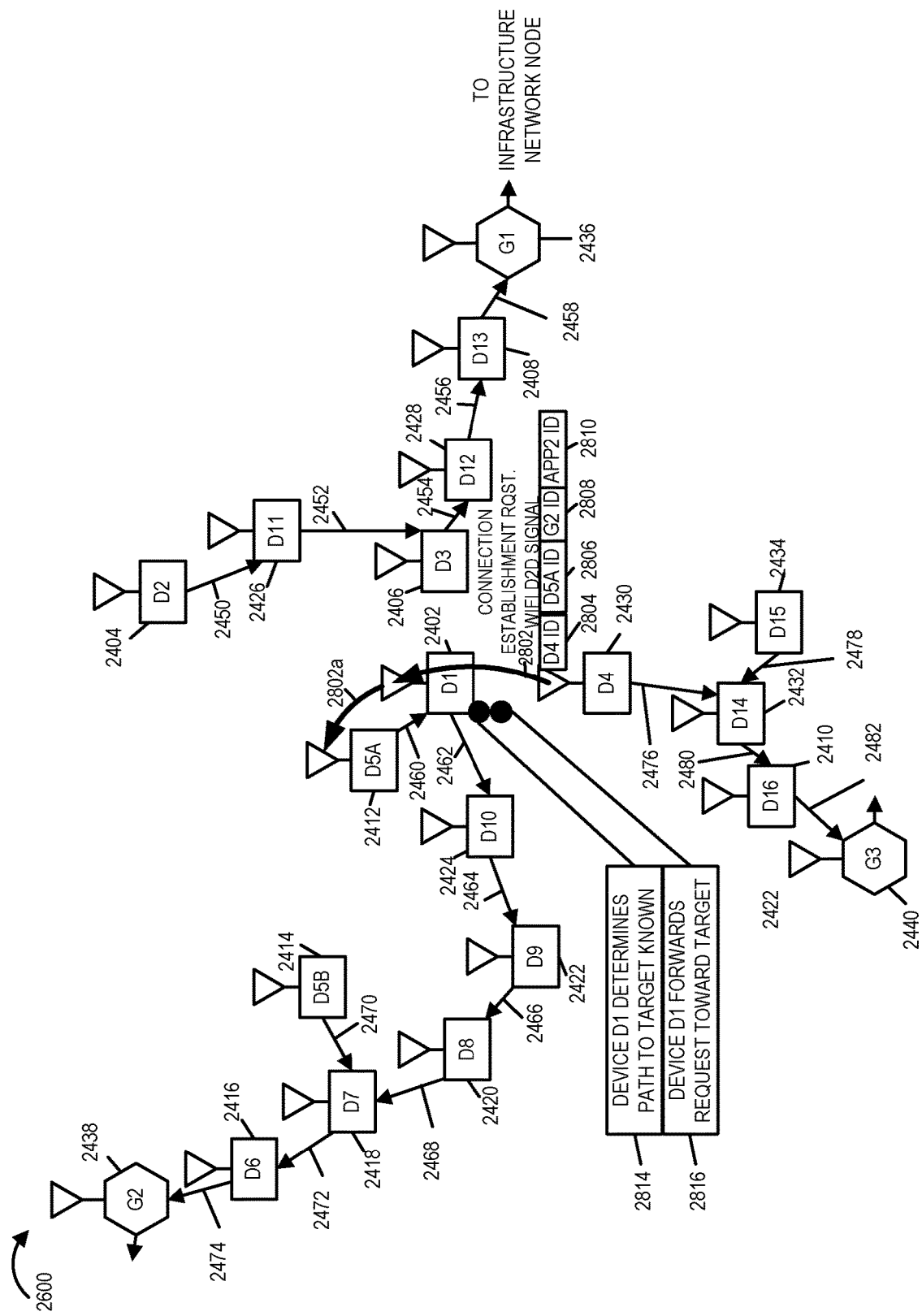
FIG. 28 illustrates an example in which a first communications device receives and processes a connection establishment request in accordance with an exemplary embodiment.

FIGS. 24-29 illustrate an example of an exemplary method of operating a first communications, e.g. communications device D1 2402, in accordance with an exemplary embodiment. The example of FIGS. 24-29 is applicable to the exemplary method of flowchart 1900 of FIG. 19. FIG. 24-27 illustrate exemplary signaling regarding steps shown in FIG. 19A. FIGS. 27-28 illustrate exemplary signaling and steps regarding steps shown in FIG. 19B.

Figure 24:
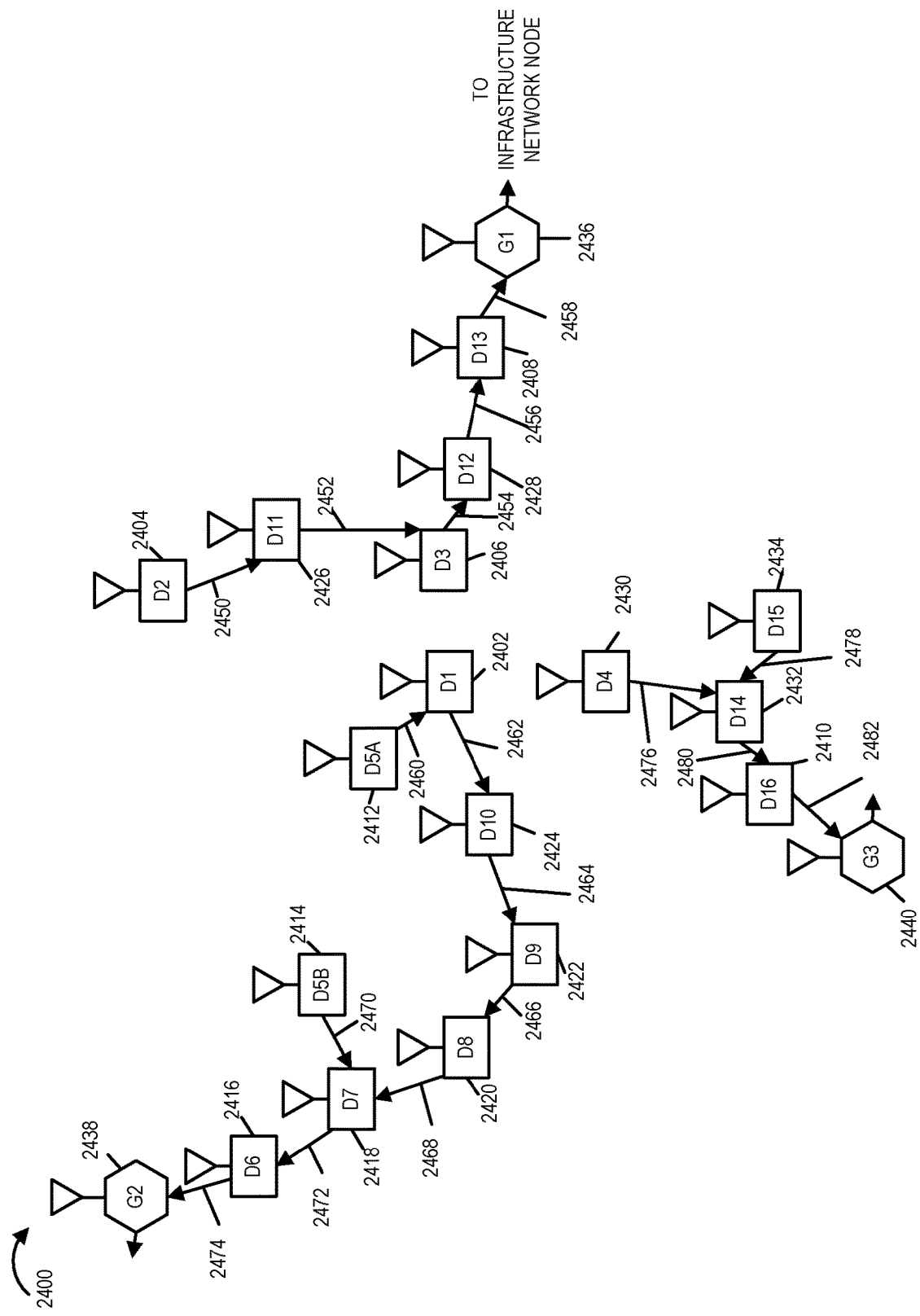
FIG. 24 illustrates an exemplary network including a plurality of network segments and exemplary established paths corresponding to a first application.

Drawing 2400 of FIG. 24 illustrates an exemplary communications network, e.g., a WiFi network, including exemplary communications devices (device D1 2402, device D2 2404, device D3 2406, device D4 2430, device D5A 2412, device 5B 2414, device D6 2416, device D7 2418, device D8 2420, device D9 2422, device D10 2424, device D11 2426, device D12 2428, device D13 2408, device D14 2432, device D15 2434, device D16 2410), and exemplary gateways (gateway G1 2436, gateway G2 2438, and gateway G3 2440). The gateway devices (2436, 2438, 2440) couple the network to a infrastructure network node or nodes. In some embodiments, the infrastructure network node is a cellular base station which is part of a cellular network.

In this example, a first segment of the network uses gateway G1 2436; a second segment of the network uses gateway G2 2438; and a third segment of the network uses gateway G3 2440. In this example, communications paths corresponding to a first application, e.g. a SON application have already been established. There is an existing communications path for the first application from each communications device (device D1 2402, device D2 2404, device D3 2406, device D4 2430, device D5A 2412, device 5B 2414, device D6 2416, device D7 2418, device D8 2420, device D9 2422, device D10 2424, device D11 2426, device D12 2428, device D13 2408, device D14 2432, device D15 2434, device D16 2410) to a gateway device.

Routing tables are stored in each of the communications devices (device D1 2402, device D2 2404, device D3 2406, device D4 2430, device D5A 2412, device 5B 2414, device D6 2416, device D7 2418, device D8 2420, device D9 2422, device D10 2424, device D11 2426, device D12 2428, device D13 2408, device D14 2432, device D15 2434, device D16 2410). A device in a segment knows its own routing path to the gateway that it uses, and may know information relating to the routing path of other devices using the same gateway, depending upon whether or not the path from the other device to the gateway goes through the device.

Some of the paths used by the first application will now be described for each of the segments of the network. The path from device D1 2402 to the gateway G2 2438 includes path portions (2462, 2464, 2466, 2468, 2472, 2474). The path from device D5A 2412 to the gateway G2 2438 includes path portions (2460, 2462, 2464, 2466, 2468, 2472, 2474). The path from device D5B 2414 to the gateway G2 2438 includes path portions (2470, 2472, 2474). The path from device D2 2404 to the gateway G1 2436 includes path portions (2450, 2452, 2454, 2456, 2458). The path from device D15 to gateway G3 2440 includes path portions 2478, 2480, 2482). The path from device D4 to gateway G3 2440 includes path portions 2476, 2480, 2482). Paths between other devices in the network and their respective gateways are subsets of the above described paths.

Drawing 2500 of FIG. 25 illustrates that first communications device D1 2402 receives a LTED beacon signal 2502 from second communications device D2 2402. The beacon 2502 communicates a device D2 identifier 2504 identifying device D2 2404 and a gateway identifier G1 ID 2506, which identifies gateway G1 2436 as the gateway being used by device D 2404. The beacon signal 2404 may also communicate information indicating the device D2 uses application 2, or device D1 2424 may already be aware that device D2 uses application 2. Thus device D1 2502 recovers discovery information about device D2 2504 including a gateway identifier identifying the gateway that device D2 uses.

Consider that device D1 2402 makes a decision to establish a communications connection with second communications device D2 1926. However, device D2 2404 is not in tone-hop device to device WiFi communications range of device D1 2402. D1 2402 identifies that gateway G1 2436 is used by device D2 2402 based on the information recovered from the LTED beacon 2502. Device D1 2402 searches for another device which uses gateway G1 2436 which is in one-hop WiFi device to device communications range.

Device D1 2402 receives WiFi beacon 2508 from a third device, device D3 2406. The beacon 2508 communicates a device D3 identifier 2510 identifying device D3 2406 and a gateway identifier G1 ID 2512, which identifies gateway G1 2436 as the gateway being used by device D 2404. G1 ID 2512 in received WiFi beacon 2508 matches G1 ID 2506 in received LTED beacon 2502. The LTED beacon has a longer discovery range that the WiFi beacon. Received WiFi beacon 2508 may be one of a plurality of WiFi beacons received from devices in the vicinity of device D1 2402. For example, device D1 2402 may have also received a WiFi beacon from device D4 2430 advertising that it uses gateway G3 2440, and a WiFi beacon from device D11 2426 advertising that it uses gateway G1 2436.

Device D1 2402 selects third device D3 2406 as the device, which uses gateway G1 2436, to send a connection establishment request for the purpose of establishing a connection with device D2 2404 for a second application, e.g., from among one or more candidates using gateway G1, e.g., device D3 1406 is the best candidate based on connection establishment metric information, e.g., a stronger WiFi beacon was received from device D3 2406 than from device D11 2426.

Drawing 2600 of FIG. 26 illustrates that device D1 2402 generates a first connection establishment request 2602 and transmits the first connection establishment request 2602, via a WiFi device to device signal to device D3 2406. The first connection establishment request 2602 includes identifier D1 ID2604 identifying device D1 2402 as the source, identifier D2 ID 2608 identifying the target destination device as device D2 2404, a gateway identifier G1 ID identifying gateway G1 2436, and an application identifier APP2 ID 2612 identifying application 2 as the application for the requested connection.

Device D3 2406 receives the connection establishment request 2602, determines that it has stored routing information on a path to the target device D2 2404, and forwards the request, as signal 2602a to device D11 2426. Device D11 2411 receives the connection establishment request 2602a, determines that it has stored routing information on a path to the target device D2 2404, and forwards the request, as signal 2602b to device D2 2402.

Device D2 2404 receives the connection establishment request 2602b, accepts the request, generates and transmits a response 2614. The response is communicated back along the path the request came, in reverse order as forwarded response signals, 2614a, 2614b. Device D1 2402 receives the connection establishment request response in signal 2614b, and the connection has been established. Note devices (2402, 2406, 2426, 2404) along the connection path for the second application, update their routing tables as the request and response are communicated.

Drawing 2700 of FIG. 27 illustrates an a connection has been established between first device D1 2402 and second device D2 2404 for the second application. The exemplary path includes corresponding to the established connection includes path portions (2702, 2704, 2706). Device D1 2402 uses the established connection and transmits WiFi device to device signal 2708 including application 2 user data 2710, to device D3 2406, which forwards the data in signals 2708a to device D11 2426, which forwards, the data in signal 2708b to the intended target, device D2 2404. Similarly device D2 2404 uses the established connection and transmits WiFi device to device signal 2712 including application 2 user data 2714, to device D11 2426, which forwards the data in signals 2712a to device D3 2406, which forwards, the data in signal 2712b to the intended device D2 2404.

Drawing 2800 of FIG. 28 illustrates an example in which a first communications device, device D1 2402 receives and processes a connection establishment request in accordance with an exemplary embodiment. Consider that the network described in FIG. 24 and FIG. 25 exists with established routing tables supporting the first application.

Consider that a fourth device, device D4 2430, would like to establish a communications connection with a fifth device, device D5A 2412, based on received information in a LTED beacon received from device D5A 2412, said beacon including a gateway identified identifying gateway G2 2438 as the gateway used by device D5A 2412. Further consider that the fourth device D4 2430 has selected to send the connection establishment request to device D1 2402, based on a received WiFi beacon from device D1 2402, said WiFi beacon communicating an identifier identifying that device D1 uses gateway G2 2438.

Device D1 2402 receives connection establishment request 2802 in a WiFi device to device signal, which was transmitted from device D4 2430 and sent to device D1 2402. The connection establishment request 2802 includes identifier D4 ID 2804 identifying device D4 2430 as the source, identifier D5A ID 2806 identifying the target destination device as device D5A 2802, a gateway identifier G2 ID 2808 identifying gateway G2 2438, and an application identifier APP2 ID 2610 identifying application 2 as the application for the requested connection.

Device D1 2402 determines that it has stored routing information on a path to the target device D5A 2412 wherein said path does not traverse the second gateway device 2438, as indicated in block 2814, and thus forwards the connection establishment request, as signal 2802a toward the target communications device, device D5A 2412, as indicated in block 2816. Device D5A 2412 receives the connection establishment request and sends a response back along the path that the request was communicated. This results in a established connection between device D4 2430 and device D5A 2412 which may be used to communicate user data for the second application. Note devices (2430, 2402, 2412) along the connection path for the second application, update their routing tables as the request and response are communicated.

Figure 29:
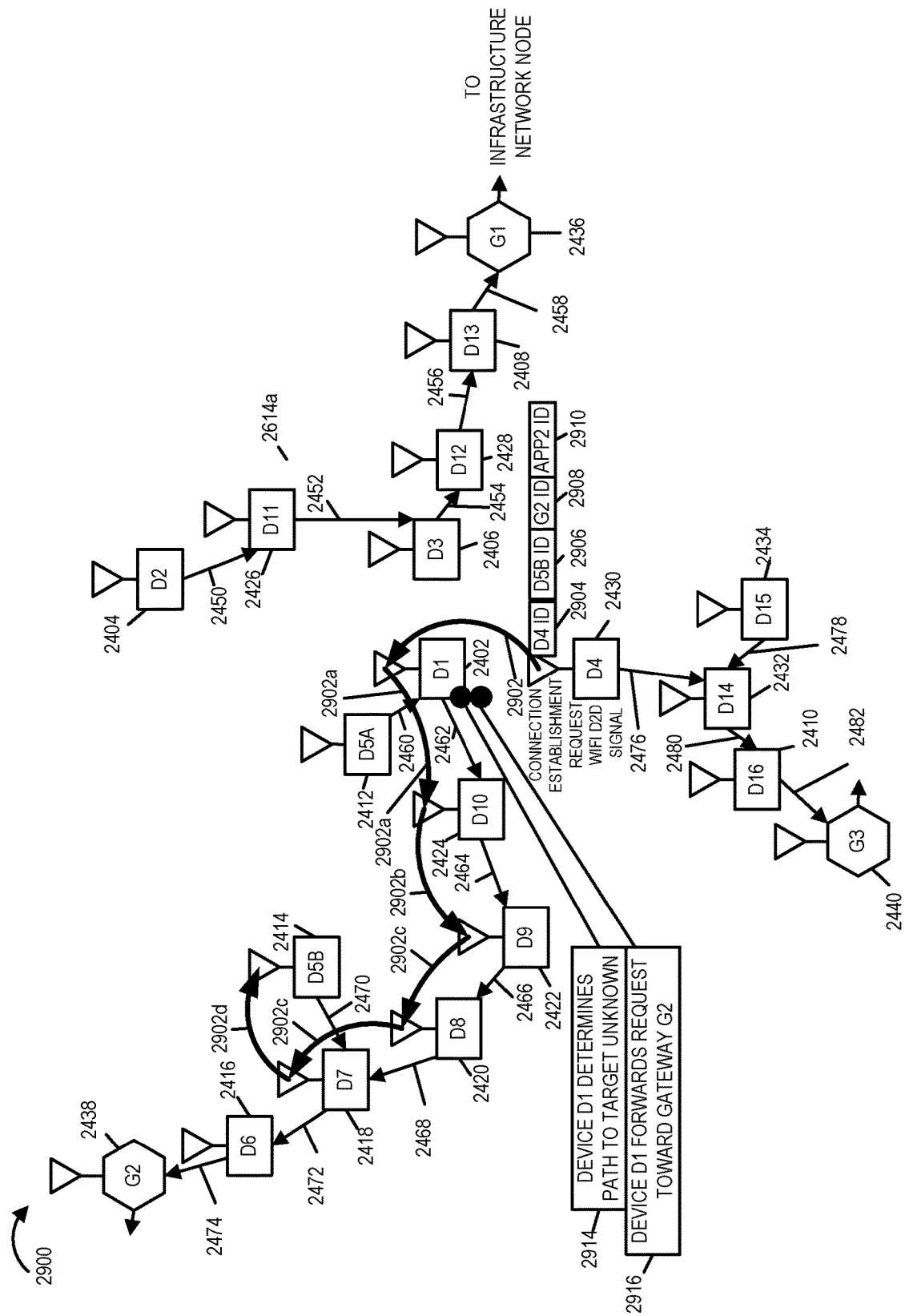
FIG. 29 illustrates another example in which a first communications device receives and processes a connection establishment request in accordance with an exemplary embodiment.

Drawing 2900 of FIG. 29 illustrates an example in which a first communications device, device D1 2402 receives and processes a connection establishment request in accordance with an exemplary embodiment. Consider that the network described in FIG. 24 and FIG. 25 exists with established routing tables supporting the first application.

Consider that a fourth device, device D4 2430, would like to establish a communications connection with a fifth device, device D5B 2414, based on received information in a LTED beacon received from device D5B 2414, said beacon including a gateway identified identifying gateway G2 2438 as the gateway used by device D5B 2414. Further consider that the fourth device D4 2430 has selected to send the connection establishment request to device D1 2402, based on a received WiFi beacon from device D1 2402, said WiFi beacon communicating an identifier identifying that device D1 uses gateway G2 2438.

Device D1 2402 receives connection establishment request 2902 in a WiFi device to device signal, which was transmitted from device D4 2430 and sent to device D1 2402. The connection establishment request 2902 includes identifier D4 ID 2904 identifying device D4 2430 as the source, identifier D5B ID 2906 identifying the target destination device as device D5B 2414, a gateway identifier G2 ID 2908 identifying gateway G2 2438, and an application identifier APP2 ID 2910 identifying application 2 as the application for the requested connection.

Device D1 2402 determines that it does not have stored routing information on a path to the target device D5B 2414 wherein said path does not traverse the second gateway device 2438, as indicated in block 2914, and thus forwards the connection establishment request, as signal 2902a toward the second gateway device G2 2438, as indicated by block 2916. The connection establishment request is propagated toward the gateway, as signals 2902a, 2902b, 2902c. Devices D10 2424, D9 2422, and D8 2420, each make the same determination as device D1 2402, that it does not have information on a path to the target device D5B 2414 wherein said path does not traverse the second gateway device 2438, and thus forward toward the gateway. However, device D7 2418 determines that it has stored routing information on a path to the target device D5B 2414 wherein said path does not traverse the second gateway device 2438 and thus forwards the connection establishment request, as signal 2902d toward the target device D5B 2414.

Device D5B 2414 receives the connection establishment request and sends a response back along the path that the request was communicated. This results in a established connection between device D4 2430 and device D5B 2414 which may be used to communicate user data for the second application, e.g., using WiFi device to device signals.

Note devices (2430, 2402, 2424, 2422, 2420, 2418, 2414) along the connection path for the second application, update their routing tables as the request and response are communicated.

Figure 30:
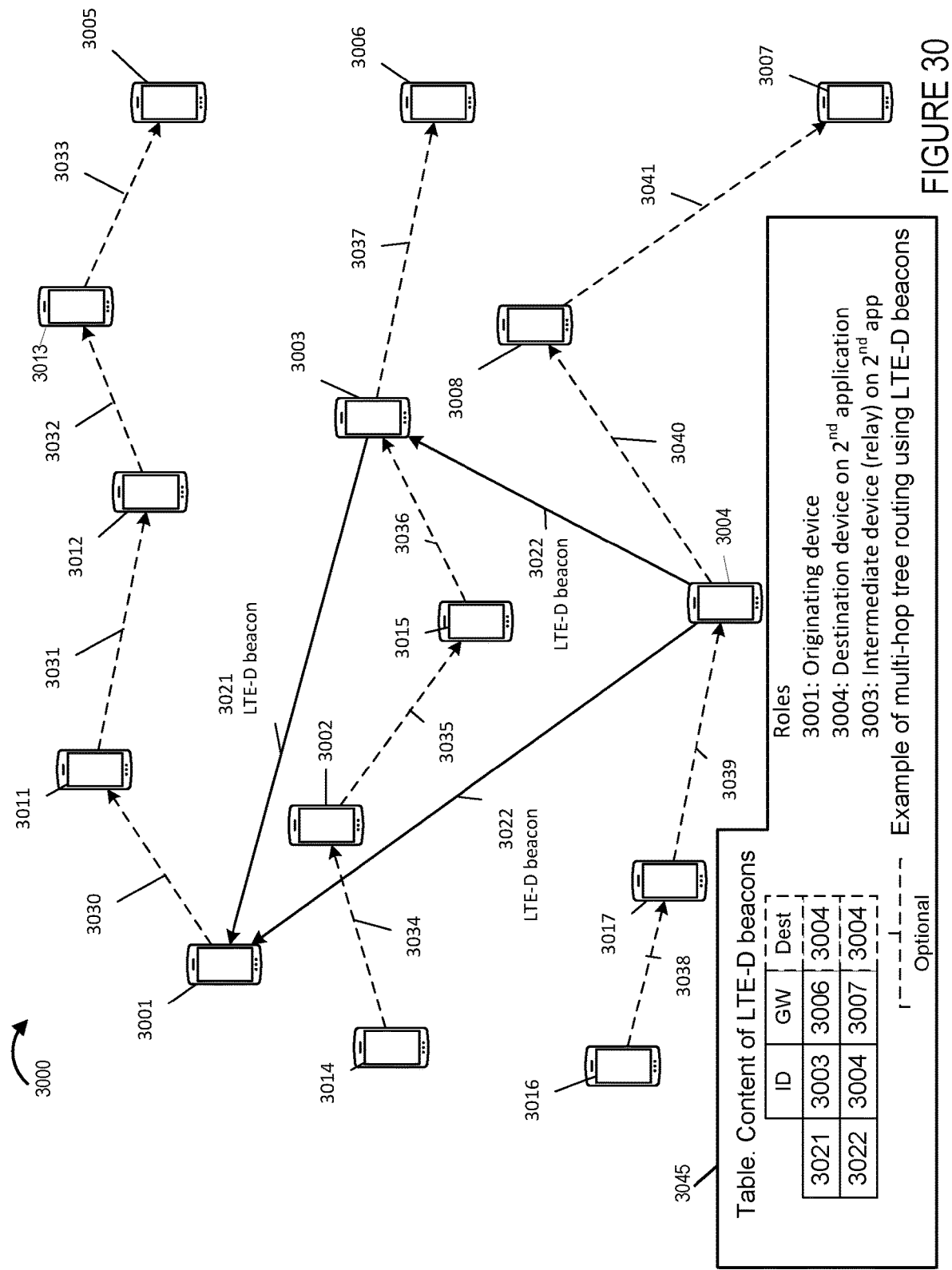
FIG. 30 shows an example of routes created across multiple network segments in accordance with an exemplary embodiment.

Drawing 3000 of FIG. 30 shows an example of routes created across multiple network segments. FIG. 30 shows exemplary routes created in a network by a first application, e.g., a SON application. In one embodiment, the exemplary network includes devices (3001, 3002, 3003, 3004, 3005, 3006, 3008, 3011, 3012, 3013, 3014, 3015, 3016, 3017) each including a wireless interface. The exemplary devices (3001, 3002, 3003, 3004, 3005, 3006, 3008, 3011, 3012, 3013, 3014, 3015, 3016, 3017) are, e.g., smart phones, smart meters, and/or any Internet of Things devices A first route includes connections (3030, 3031, 3032, 3033) between devices (3001, 3011), (3011, 3012), (3012, 3013), and (3013, 3005), respectively. A second route includes connections (3034, 3035, 3036, 3037) between devices (3014, 3002), (3002, 3015), (3015, 3003), and (3003, 3006), respectively. A third route includes connections (3038, 3039, 3040, 3041) between devices (3016, 3017), (3017, 3004), (3004, 3008), and (3008, 3007), respectively The network can be considered to have three segments, branches, or trees, each segment with routing paths ending at a different gateway. In this example each of the communications devices is associated with one segment of the network. Communications devices (3001, 3011, 3012, 3013, 3005) are associated with a first segment of the network, which ends at gateway 3005. Communications devices (3014, 3002, 3015, 3003, 3006) are associated with a second segment of the network, which ends at gateway 3006. Communications devices (3016, 3017, 3004, 3008, 3007) are associated with a third segment of the network, which ends at gateway 3007. Devices with a particular segment of the network have routing information regarding that particular segment. Different devices within a segment of the network have different amounts of routing information, e.g., depending upon the location of the device within the segment FIG. 30 further includes information block 3045 including a table illustrating content included in exemplary LTE-D beacons (3021, 3022) and roles of devices (3001, 3004, 3003) for an example of multi-hop tree routing using LTE-D beacons.

In this example, some communications devices are capable of transmitting and receiving LTE-D beacons, which is different from the protocol used to created the routes by the first application (e.g. WiFi, Bluetooth, or 802.15.4). LTE-D beacons (3022, 3021) are transmitted from devices (3004, 3003), respectively, and received at devices ((3003 and 3001), 3001), respectively. In this example, LTE-D beacons carry information about the transmitting devices and their gateways. For instance, LTE-D beacon 3021 has information, e.g., an ID, about the transmitting device, device 3003, and its gateway, device 3006. LTE-D beacon 3022 includes information, e.g., an ID, about the transmitting device, device 3004, and its gateway, device 3007

On a second application, device 3001, the originating device, discovers device 3004, the destination device, and wants to establish a connection to device 3004. Device 3001 receives LTE-D beacon 3022 from device 3004, and discovers that device 3004 is using gateway 3007. Device 3001 does not have a one-hop neighbor on the first application which uses gateway 3007, therefore it adds device 3004 into an outstanding list of destination devices.

Device 3003 receives LTE-D beacon 3022 from device 3004. Device 3003 checks if it has a route to device 3004 by determining if it is using the same gateway with device 3004, or if one of its one-hop neighbors on the first application is using the same gateway with device 3004. In this example, device 3003 is using a different gateway (device 3006) from device 3004. However, one of device 3003's one-hop neighbors on the first application, device 3008, is using the same gateway (3007) with device 3004. Therefore device 3003 determines that it has a route to device 3004. Device 3003 sends out an LTE-D beacon 3021 advertising its identification and its gateway (device 3006). In some embodiments, the identification of the destination device (3004) on the second application is not transmitted by the intermediate device (3003), e.g. the originating device (3001) only cares about some capability provided by the destination device, and not the specific device. In some other embodiments, device 3003 also advertises that it can be a relay for device 3004 by including device 3004's identification in its LTE-D beacon.

Device 3001 receives LTE-D beacon 3021 from the intermediate device 3003 and discovers device 3003's gateway 3006. Device 3001 determines that one of its one-hop neighbors on the first application, device 3002, is using gateway 3006. Device 3001 sends a connection request to device 3002, which includes the identification of device 3003. In some embodiments in which the destination device 3004's identification is transmitted in the intermediate device 3003's LTE-D beacon (3021), device 3001 checks that device 3004 is in its outstanding list of destination devices before sending the connection request to device 3002.

Various exemplary methods and apparatus will now be described. In a first exemplary method of operating a first communications device, the method comprises making a decision to establish a communications connection (set up a path which an application can then use) with a second communications device; identifying a first gateway device used by said second communications device; identifying a third communications device which uses said first gateway device; and transmitting a first connection establishment request to said third communications device, said first connection establishment request including a first device identifier identifying the first communications device and a second device identifier identifying the second communications device. In a second exemplary method which include the features of the first exemplary method the communications connection uses wireless interface.

In a third exemplary method which includes the features of the first exemplary method the communications connection uses power line interface. In a fourth exemplary method which includes the features of the first exemplary method the communications connection uses Ethernet interface. In a fifth exemplary method which includes the features of the first exemplary method the first connection establishment request further includes a first gateway identifier identifying said first gateway device. In a sixth exemplary method which includes the features of the first exemplary method the third communications device uses said first gateway device for a first application (primary application SON application which resulted in session connections being established with the first gateway device for purposes of primary application communication) and wherein said decision to establish a communications session is performed by a second application (secondary purpose application— which takes advantage of communications routes formed/organized for the primary application) which is different from said first application. In a seventh exemplary method, which includes the features of the sixth exemplary method, the first connection establishment request is a device to device request. In a eight exemplary method which includes the features of the sixth exemplary method, the first gateway device is a device which serves as a gateway between one or more peer to peer devices and an infrastructure network node.

In a ninth exemplary method which includes the features of the sixth exemplary method the first gateway device is a device which serves as a gateway between one or more peer to peer devices and an infrastructure network node. In a tenth exemplary method which includes the features of the sixth exemplary method the first connection establishment request further includes an application identifier identifying the second application (e.g., identifying the application for which the session is being established).

An eleventh exemplary method includes the features of the first exemplary method and further includes receiving (i.e. before the "making a decision" step) first discovery information for said second device including said second device identifier.

In a twelfth exemplary method which includes the features of the eleventh exemplary method the first discovery information for said second device is received in one of: i) a signal from a server (push), ii) a response to a request for information (e.g., database lookup) or iii) a broadcast or multicast, e.g. a beacon, signal. In a thirteenth exemplary method which includes the features of the eleventh exemplary method, the method further includes receiving second discovery information for said second device, said second discovery information including a first gateway identifier which identifies said first gateway device. The first discovery information and second discovery information could be part of one or multiple beacons and/or pushes.

In a fourteenth exemplary method which includes the features of the thirteenth exemplary method, the first discovery information and said second discovery information are received in the same message, e.g., the first discovery information and second discovery information are the same message—beacon and/or push.

In a fifteenth exemplary method which includes the features of the 13th exemplary method, the first gateway identifier is used in said step of identifying said first gateway device to identify said first gateway device.

In a sixteenth exemplary method with includes the features of the thirteenth exemplary method, the first discovery information and said second discovery information are communicated using a first communications protocol, e.g., a LTED protocol or long range whitespace radio protocol, which is different from a second communications protocol, e.g., a WiFi protocol, used to communicate said first connection establishment request.

In a seventeenth exemplary method which includes the features of the thirteenth exemplary method, the first discovery information is communicated using a first frequency band which is different from a second frequency band used to communicate the first connection establishment request.

In an eighteenth exemplary method which includes the features of the sixteenth exemplary method, the first communications protocol has a longer discovery range than the second communications protocol.

A nineteenth exemplary method includes the features of the first exemplary method and further includes: receiving information about the first gateway device, used by the third communications device, from a broadcast or multicast signal, e.g. a beacon signal. For example, the received broadcast/multicast signal is transmitted by the third communications device, and the third communications device advertises the gateway device that it uses.

In a twentieth exemplary method which includes the features of the nineteenth exemplary method, the broadcast or multicast signal, e.g., a beacon signal, is associated with a segment of a network, e.g., a segment of a device to device network, by including a gateway identifier of a gateway included in said network segment in said broadcast or multicast signal.

A 21st exemplary method includes the features of the first exemplary method and further includes: receiving, e.g., at the first communications device, a second connection establishment request including a fourth device identifier identifying a fourth communications device which is the source of the second connection establishment request and a fifth device identifier identifying a target communications device with which a connection is to be established; determining if information on a path to the target communications device, wherein said path does not traverse a second gateway device used by the first communications device and the target communications device, is known to the first communications device; when information on said path to the target communications device is known to the first communications device, forwarding the second connection establishment request towards the target communications device; and when information on said path to the target communications device is not known to the first communications device, forwarding the second connection establishment request towards said second gateway device. Traverse involves passing through the node; the second gateway device may be the target in which case the path terminates at the second gateway device rather than pass through.

A 22nd exemplary embodiment is directed to a first communications device including: a connection establishment decision module configured to make a decision to establish a communications connection (e.g., set up a path which an application can then use) with a second communications device; a gateway identification module configured to identify a first gateway device used by said second communications device; a device identification module configure to identify a third communications device which uses said first gateway device; and a first transmitter module configured to transmit a first connection establishment request to said third communications device, said first connection establishment request including a first device identifier identifying the first communications device and a second device identifier identifying the second communications device.

In a 23rd exemplary embodiment that includes a first communications device of the 22nd exemplary embodiment, the communications connection uses wireless interface.

In a 24th exemplary embodiment that includes a first communications device of the 22nd exemplary embodiment, the communications connection uses power line interface.

In a 25th exemplary embodiment which includes a first communications device of the 22nd embodiment, the communications connection uses Ethernet interface.

In a 26th exemplary embodiment which includes a first communications device of the 22nd exemplary embodiment, the first connection establishment request further includes a first gateway identifier identifying said first gateway device.

In a 27th exemplary embodiment which includes a first communications device of the 22nd exemplary embodiment, the third communications device uses said first gateway device for a first application, e.g., a primary application such as a SON application which resulted in session connections being established with the first gateway device for purposes of primary application communication, and the decision to establish a communications session is performed by a second application. The secondary purpose application maybe and sometimes is an application which takes advantage of communications routes formed/organized for the primary application) which is different from said first application.

In a 28th embodiment which includes the first communications device of the 27th embodiment, the first connection establishment request is a device to device request.

In a 29th embodiment which includes the features of the 27th embodiment the first gateway device is a device which serves as a gateway between one or more peer to peer devices and an infrastructure network node.

In a 30th embodiment which includes the features of the 27th embodiment the first gateway device is a device which serves as a gateway between one or more peer to peer devices and an infrastructure network node.

In a 31st embodiment which includes the features of the 27th embodiment, the first connection establishment request further includes an application identifier identifying the second application, e.g., identifying the application for which the session is being established.

In a 32nd exemplary embodiment which includes the features of the 22nd embodiment, the first communications device further includes a first discovery information receive module configured to receive first discovery information for said second device including said second device identifier. In one such embodiment the first discovery information is received before the "making a decision" step.

In a 33rd exemplary embodiment, in which the first communications device includes the features of the 32nd embodiment, the first discovery information for said second device is received in one of: i) a signal from a server (push), ii) a response to a request for information (e.g., database lookup) or iii) a broadcast or multicast (e.g. a beacon) signal.

In a 34th exemplary embodiment, which includes the features of the 32nd embodiment, the first communications device further includes a second discovery information receive module configured to receive second discovery information for said second device, said second discovery information including a first gateway identifier which identifies said first gateway device. In one such embodiment the first discovery information and second discovery information are part of one or multiple beacons or pushes.

In a 35th exemplary embodiment, in which the first communications device includes the features of the 34th embodiment, the first discovery information and said second discovery information are received in the same message. In one such embodiment, the first discovery information and second discovery information are included in the same message, e.g. the same beacon message or same push message.

In a 36th exemplary embodiment, in which the first communications device includes the features of the 32th embodiment, the first discovery information receive module is further configured to receive second discovery information for said second device, said second discovery information including a first gateway identifier which identifies said first gateway device. In one such embodiment, the first discovery information and second discovery information are part of one or multiple beacons and/or pushes.

In a 37th exemplary embodiment, in which a first communications device includes the features of the 32th embodiment said first gateway identifier is used by said gateway identification module to identify said first gateway device.

In a 38th exemplary embodiment, in which a first communications device includes the features of the 34th embodiment said first discovery information and said second discovery information are communicated using a first communications protocol (e.g., LTED protocol, or long range whitespace radio protocol) which is different from a second communications protocol (e.g., WiFi protocol) used to communicate said first connection establishment request.

In a 39th exemplary embodiment, in which a first communications device includes the features of the 38th embodiment the first communications device further includes: a first receiver module configured to receive wireless signals using a first communications protocol, e.g., LTED signals; and a second receiver module configured to receive wireless signals using said second communications protocol, e.g., WiFi signals.

In a 40th exemplary embodiment, in which a first communications device includes the features of the 34th embodiment, the first discovery information is communicated using a first frequency band which is different from a second frequency band used to communicate the first connection establishment request.

In a 41th exemplary embodiment, in which a first communications device includes the features of the 38th embodiment, said first communications protocol has a longer discovery range than the second communications protocol.

In a 42nd exemplary embodiment, in which a first communications device includes the features of the 22nd embodiment the first communications device further includes: a device information receive module configured to receive information about the first gateway device, used by the third communications device, from a broadcast or multicast signal, e.g., a beacon signal. In one such embodiment, the broadcast or multicast signal is transmitted by the third communications device, and the third communications device advertises the gateway device that it uses.

In a 43rd exemplary embodiment, in which a first communications device includes the features of the 42nd embodiment, said broadcast or multicast signal, e.g., a beacon signal, is associated with a segment of a network, e.g., a segment of a device to device network, by including a gateway identifier of a gateway included in network segment in said broadcast or multicast signal.

In a 44th exemplary embodiment, in which a first communications device includes the features of the 22nd embodiment, the first communications device further includes: a connection establishment request receive module configured to receive, e.g., at the first communications device, a second connection establishment request including a fourth device identifier identifying a fourth communications device which is the source of the second connection establishment request and a fifth device identifier identifying a target communications device with which a connection is to be established; a path knowledge determination module configured to determine if information on a path to the target communications device, wherein said path does not traverse a second gateway device used by the first communications device and the target communications device, is known to the first communications device; and a connection establishment request forwarding module configured to: forward the second connection establishment request towards the target communications device when information on said path to the target communications device is determined to be known to the first communications device; and forward the second connection establishment request towards said second gateway device when information on said path to the target communications device is determined to not be known to the first communications device. Traverse involves pass through the node; the second gateway device may be the target in which case the path terminates at the second gateway device rather than pass through.

In a 45th embodiment anon-transitory machine readable medium is used. In such an embodiment the non-transitory machine readable medium includes processor executable instructions which when executed by a processor of a first communications device, control the first communications device to perform the steps of: making a decision to establish a communications connection, e.g., a decision to set up a path which an application can then use, with a second communications device; identifying a first gateway device used by said second communications device; identifying a third communications device which uses said first gateway device; and transmitting a first connection establishment request to said third communications device, said first connection establishment request including a first device identifier identifying the first communications device and a second device identifier identifying the second communications device.

An exemplary method 46 of operating a second communications device includes: receiving a first connection establishment request including a first device identifier identifying a first communications device which is the source of the first connection establishment request and a third device identifier identifying a target communications device with which a connection is to be established; determining if information on a path to the target communications device, wherein said path does not traverse a first gateway device used by the second communications device and the target communications device, is known to the second communications device; when information on said path to the target communications device is known to the second communications device, forwarding said first connection establishment request towards the target communications device; and when information on said path to the target communications device is not known to the second communications device, forwarding said first connection establishment request towards said first gateway device. In some embodiments traverse involves passing through the node. The first gateway device may be the target in which case the path terminates at the first gateway device rather than passes through.

An exemplary method 47 of operating a second communications device includes the features of exemplary method 46 and in exemplary method 47 determining if information on a path to the target communications device is known includes: checking a routing table to determine if said target communications device is included in the routing table as a source device and when said target communications device is included in the routing table as a source device forwarding said first connection establishment request to a previous node in said routing table associated with said target communications device.

In exemplary method 48 of operating a second communications device, which includes the features of exemplary method 46, said path is part of a communications path between the target communications device and the first gateway device. In one such embodiment a target communications device has an ongoing session between the target communications device and first gateway device which is reflected in the routing table of the intermediate nodes and this existing path information is used to set up session with the target using a portion of the path which does not traverse the first gateway device.

In an exemplary method 49 of operating a second communications device, which includes the features of exemplary method 46, the second communications device and the target communications device use said first gateway device for a first application. In one such embodiment, the first application, is an application, e.g., a SON application, which resulted in connections being established with the first gateway device for purposes of primary application communication.

In an exemplary method 50 of operating a second communications device, which includes the features of exemplary method 49, said first communications device does not use said first gateway device for said first application.

In an exemplary method 51 of operating a second communications device, which includes the features of exemplary method 49, said first application is to obtain connectivity to another network.

In an exemplary method 52 of operating a second communications device, which includes the features of exemplary method 49, said first connection establishment request is made from a second application, wherein said second application is different from said first application. In one such embodiment, the second application is, e.g., a secondary purpose application which takes advantage of communications routes formed and/or organized for the primary application.

An exemplary method 53 of operating a second communications device, includes the features of exemplary method 46 and further includes: prior to determining if information on a path to the target communications device is known to the second communications device, checking to determine if the second communications device is the target communications device; and wherein said determining if information on said path to the target communications device is known to the second communications device is performed after said check determines that the target communications device is not the second communications device.

In an exemplary method 54 of operating a second communications device, which includes the features of exemplary method 46, said second communications device transmits an advertisement that it uses said first gateway device.

In an exemplary method 55 of operating a second communications device, which includes the features of exemplary method 54, said advertisement is associated with a segment of a network by including a gateway identifier.

An exemplary method 56 of operating a second communications device, includes the features of exemplary method 46 and further includes: after receiving said first connection establishment request, adding said first connection establishment request as a pending connection.

In an exemplary method 57 of operating a second communications device, which includes the features of exemplary method 56, said pending connection includes a fourth device identifier identifying a fourth communications device and a fifth device identifier identifying a fifth communications device. In one such embodiment, the fourth identifier identifying the fourth communications device identifies the transmitter of the received first connection establishment request, and the fifth identifier identifying the fifth communications device identifies the receiver of the forwarded first connection establishment request.

In an exemplary method 58 of operating a second communications device, which includes the features of exemplary method 56, said pending connection includes an application identifier identifying an application associated with said first connection establishment request. In one such embodiment, the application identifier identifies the secondary purpose application.

An exemplary method 59 of operating a second communications device, includes the features of exemplary method 46 and further includes: making a decision, e.g., at said second communications device, to establish a communications connection, e.g. set up a path which an application can then use, with a sixth communications device; identifying a second gateway device used by said sixth communications device; identifying a seventh communications device which uses said second gateway device; and transmitting a second connection establishment request to said seventh communications device, said second connection establishment request including a second device identifier identifying the second communications device and a sixth device identifier identifying the sixth communications device.

A 60th exemplary embodiment is directed to a second communications device including: a connection establishment receive module configured to receive a first connection establishment request including a first device identifier identifying a first communications device which is the source of the first connection establishment request and a third device identifier identifying a target communications device with which a connection is to be established; a path knowledge determination module configured to determine if information on a path to the target communications device, wherein said path does not traverse a first gateway device used by the second communications device and the target communications device, is known to the second communications device; and a connection establishment request forwarding module configured to: forward said first connection establishment request towards the target communications device when information on said path to the target communications device is determined to be known to the second communications device; and forward said first connection establishment request towards said first gateway device, when information on said path to the target communications device is determined to be not known to the second communications device. Traverse sometimes involves passing through the node; first gateway device may be the target in which case the path terminates at the first gateway device rather than passes through.

In a 61st exemplary embodiment that includes a second communications device of the 60th exemplary embodiment said path knowledge determination module includes: a routing table checking module configured to check a routing table to determine if said target communications device is included in the routing table as a source device; and the second communications device of the 61st exemplary embodiment further includes: a previous node forwarding module configured to forward said first connection establishment request to a previous node in said routing table associated with said target communications device, when said routing table checking module determines that the target communications device is included in the routing table as a source device.

In a 62nd exemplary embodiment that includes a second communications device of the 60th exemplary embodiment, said path is part of a communications path between the target communications device and the first gateway device. In one such embodiment, the target communications device has an ongoing session between the target communications device and first gateway device which is reflected in the routing table of the intermediate nodes and this existing path information is used to set up session with the target using a portion of the path which does not traverse the first gateway device.

In a 63rd exemplary embodiment, that includes a second communications device of the 60th exemplary embodiment, the second communications device and the target communications device use said first gateway device for a first application. In one such embodiment, the first application is an application, e.g., a SON application, which resulted in connections being established with the first gateway device for purposes of primary application communication.

In a 64th exemplary embodiment, that includes a second communications device of the 63rd exemplary embodiment, said first communications device does not use said first gateway device for said first application.

In a 65th exemplary embodiment, that includes a second communications device of the 63rd exemplary embodiment, said first application is used to obtain connectivity to another network.

In a 66th exemplary embodiment, that includes a second communications device of the 63rd exemplary embodiment, said first connection establishment request is made from a second application, wherein said second application is different from said first application. In one such embodiment, the second application is a secondary purpose application which takes advantage of communications routes formed and/or organized for the primary application.

An exemplary 67th embodiment includes a second communications device of the 60th exemplary embodiment and the second communications device further includes a target checking module configured to check to determine if the second communications device is the target communications device.

An exemplary 68th embodiment includes a second communications device of the 60th exemplary embodiment and the second communications device further includes a gateway advertisement module configured to control the second communications device to transmit an advertisement advertising that the second communications device uses said first gateway device.

In a 69th exemplary embodiment, that includes a second communications device of the 68th exemplary embodiment, said advertisement is associated with a segment of a network by including a gateway identifier.

An exemplary 70th embodiment includes a second communications device of the 60th exemplary embodiment and the second communications device further includes a pending connection addition module configured to add said first connection establishment request as a pending connection after receiving said first connection establishment request.

In a 71th exemplary embodiment, that includes a second communications device of the 70th exemplary embodiment, said pending connection includes a fourth device identifier identifying a fourth communications device and a fifth device identifier identifying a fifth communications device. In one such embodiment the fourth device identifier identifies a fourth communications device which includes the transmitter which transmitted the received first connection establishment request, and the fifth device identifier identifies a fifth communications device, which includes the receiver which received the forwarded first connection establishment request.

In a 72nd exemplary embodiment, that includes a second communications device of the 70th exemplary embodiment, said pending connection includes an application identifier identifying an application associated with said first connection establishment request. In one such embodiment the application associated with said first connection establishment request is the secondary purpose application.

An exemplary 73rd embodiment includes a second communications device of the 60th exemplary embodiment, and the second communications device further includes a connection establishment decision module configured to make a decision, e.g., at said second communications device, to establish a communications connection, e.g., set up a path which an application can then use, with a sixth communications device; a gateway identification module configured to identify a second gateway device used by said sixth communications device; a device identification module configured to identify a seventh communications device which uses said second gateway device; and a connection establishment request transmission control module configured to control a transmitter to transmit a second connection establishment request to said seventh communications device, said second connection establishment request including a second device identifier identifying the second communications device and a sixth device identifier identifying the sixth communications device.

In a 74th embodiment a non-transitory machine readable medium including processor executable instructions is used. In such an embodiment the instructions, when executed by a processor of a second communications device, control the second communications device to perform the steps of: receiving a first connection establishment request including a first device identifier identifying a first communications device which is the source of the first connection establishment request and a third device identifier identifying a target communications device with which a connection is to be established; determining if information on a path to the target communications device, wherein said path does not traverse a first gateway device used by the second communications device and the target communications device, is known to the second communications device; forwarding said first connection establishment request towards the target communications device when information on said path to the target communications device is known to the second communications device; and forwarding said first connection establishment request towards said first gateway device when information on said path to the target communications device is not known to the second communications device.

The techniques of various embodiments may be implemented using software, hardware and/or a combination of software and hardware. Various embodiments are directed to communications devices included in networks, e.g., device to device networks which include gateway devices and support multiple applications. Various embodiments are directed to apparatus, e.g., a communications device such as a wireless device, e.g., a UE, a smart device, Internet of Things device, including a wireless communications interface, a device including an Ethernet switch, a gateway device, a base station, etc. Various embodiments, are well suited for wireless communications systems supporting D2D signaling including beacons and different technologies, e.g., in combination, e.g., LTED and at least one of WIFI, BT, BLE, IEEE 802.15.4, and IEEE 802.11ad. Various embodiments are well suited for use in systems including device to device communications networks which use gateways and may include a plurality of network segments, e.g., disjoint network segments each network segment associated with a gateway. Various embodiments are well suited for communications systems including an Ethernet capable devices and/or power line communications capable devices. Various embodiments are directed to communications systems. Various embodiments are also directed to methods, e.g., a method of operating a communications device. Various embodiments are well suited for embodiments, in which communications devices supports a plurality of communications applications. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, making a connection establishment decision, selecting a communications device, identifying a gateway used by a communications device, making a routing decision, implementing a decision, signal generation, signal transmission, signal reception, signal processing, and/or other steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to an apparatus, e.g., a communications device such as a wireless device, e.g., a UE, including a processor configured to implement one, multiple or all of the steps of one or more methods of the invention.

In some embodiments, the processor or processors, e.g., CPUs, of one or more devices, e.g., of a communications device such as a wireless device, e.g., a UE, smart communications device, a base station, a gateway, etc. are configured to perform the steps of the methods described as being performed by the apparatus. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., such as communications device with a processor which includes a module corresponding to each of the steps of the various described methods performed by the device in which the processor is included. In some but not all embodiments an apparatus, e.g., a communications device includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

Various features are directed to a system including multiple communications devices including, for example, multiple wireless devices, e.g., multiple UEs including multiple interfaces and the capability to send and received two or more different types of beacons, multiple gateways, multiple base station, etc. Some devices may be network nodes, e.g. infrastructure network nodes. Some of the devices may be stationary wireless communications devices; other devices may be mobile wireless devices. Some communications devices may be user communications devices, while other devices may be smart communications devices which operate without user input, e.g., in response to sensor detection. In various embodiments the communications devices and/or network nodes or entities are implemented as hardware, e.g., separate devices each including a communications interface for sending and/or receiving signals communicating data or other information, one or more processors and memory. In some embodiments the memory includes data and/or control routines. In at least some embodiments the one or more processors operate under control instructions in the control routine or routines stored in the node's memory. Thus, when executed by the processor, the instructions in the node or other network entity to perform the functions in accordance with one or more of the methods described herein. In some embodiments the processor or processors of individual nodes are special purposed processors, e.g., ASICs, with hardware circuitry which is configured to implement or control the node or network entity in which the special purpose processor is located to implement one or more steps in accordance with a method or methods described herein. In at least some embodiments, circuits and/or other hardware are used to implement the node or method resulting in a fully hardware implemented embodiment.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a second communications device, the method comprising:
   receiving a first connection establishment request including a first device identifier identifying a first communications device which is a source of the first connection establishment request and a third device identifier identifying a target communications device with which a connection is to be established;
   determining if information on a path to the target communications device, which does not traverse a first gateway device used by the second communications device and the target communications device, is known to the second communications device;
   when information on said path to the target communications device is known to the second communications device, forwarding said first connection establishment request towards the target communications device; and
   when information on said path to the target communications device is not known to the second communications device, forwarding said first connection establishment request towards said first gateway device.

2. The method of claim 1, wherein said determining if information on said path to the target communications device is known includes:
   checking a routing table to determine if said target communications device is included in the routing table as a source device; and
   when said target communications device is included in the routing table as the source device forwarding said first connection establishment request to a previous node in said routing table associated with said target communications device.

3. The method of claim 1, wherein said path is part of a communications path between the target communications device and the first gateway device.

4. The method of claim 1, wherein the second communications device and the target communications device use said first gateway device for a first application.

5. The method of claim 4, wherein said first communications device does not use said first gateway device for said first application.

6. The method of claim 4, wherein said first application is used to connect to another network.

7. The method of claim 4, wherein said first connection establishment request is made from a second application, wherein said second application is different from said first application.

8. The method of claim 1, further comprising:
   prior to said determining if information on said path to the target communications device is known to the second communications device, checking to determine if the second communications device is the target communications device; and
   wherein said determining if information on said path to the target communications device is known to the second communications device is performed after said checking determines that the target communications device is not the second communications device.

9. The method of claim 1, wherein said second communications device transmits an advertisement that said second communications device uses said first gateway device.

10. The method of claim 9, wherein said advertisement is associated with a first network, wherein said first network is used to communicate said first connection establishment request.

11. The method of claim 10 wherein said advertisement is associated with the first network by the advertisement including an SSID of the first network.

12. The method of claim 1, further comprising:
   after receiving said first connection establishment request, adding said first connection establishment request as a pending connection.

13. The method of claim 12, wherein said pending connection includes a fourth device identifier identifying a fourth communications device and a fifth device identifier identifying a fifth communications device.

14. The method of claim 13, wherein the fourth device identifier identifies a transmitter of the received first connection establishment request.

15. The method of claim 14, wherein the first device identifier identifies a receiver of the forwarded first connection establishment request.

16. The method of claim 12, wherein said pending connection includes an application identifier identifying an application associated with said first connection establishment request.

17. The method of claim 1, further comprising:
   making a decision to establish a communications connection with a sixth communications device;
   identifying a second gateway device used by said sixth communications device;
   identifying a seventh communications device which uses said second gateway device; and
   transmitting a second connection establishment request to said seventh communications device, said second connection establishment request including a second device identifier identifying the second communications device and a sixth device identifier identifying the sixth communications device.

18. The method of claim 17, wherein said making the decision to establish the communications connection with the sixth communications device is made at said second communications device.

19. A second communications device, comprising:
   memory; and
   a processor coupled to said memory, said processor being configured to control said second communications device to:
      receive a first connection establishment request including a first device identifier identifying a first communications device which is a source of the first connection establishment request and a third device identifier identifying a target communications device with which a connection is to be established;
      determine if information on a path to the target communications device, which does not traverse a first gateway device used by the second communications device and the target communications device, is known to the second communications device;
      forward said first connection establishment request towards the target communications device when information on said path to the target communications device is known to the second communications device; and
      forward said first connection establishment request towards said first gateway device when information on said path to the target communications device is not known to the second communications device.

20. The second communications device of claim 19, wherein the processor is further configured, as part of controlling the second communications device to determine if information on said path to the target communications device is known to control the second communications device, to:
- check a routing table to determine if said target communications device is included in the routing table as a source device; and
- when said target communications device is included in the routing table as the source device forwarding said first connection establishment request to a previous node in said routing table associated with said target communications device.

21. A method of operating a second communications device, the method comprising:
- receiving a first connection establishment request including information identifying a first communications device and a target communications device, wherein the first communications device is a source of the first connection establishment request, and wherein first connection establishment request is associated with a connection to the target communications device;
- determining that information on a path to the target communications device is unknown to the second communications device, wherein the path to the target communications device does not traverse a first gateway device used by the second communications device and the target communications device; and
- in response to said determining that information on the path to the target communications device is unknown to the second communications device, forwarding the first connection establishment request towards the first gateway device.

22. The method of claim 21, wherein said determining that information on the path to the target communications device is unknown to the second communications device comprises checking whether the target communications device is identified as a source device in a routing table.

23. The method of claim 21, wherein the path is part of a communications path between the target communications device and the first gateway device.

24. The method of claim 21, wherein the second communications device and the target communications device use the first gateway device for a first application.

* * * * *